(12) United States Patent
Brown et al.

(10) Patent No.: US 12,149,558 B1
(45) Date of Patent: Nov. 19, 2024

(54) CYBERSECURITY ARCHITECTURES FOR MULTI-CONTEXTUAL RISK QUANTIFICATION

(71) Applicant: QRShield LLC, Jersey City, NJ (US)

(72) Inventors: Joseph Brown, Jersey City, NJ (US); Anthony Rodriguez, Tuckahoe, NY (US)

(73) Assignee: QRShield LLC, Jersey City, NJ (US)

( * ) Notice: Subject to any disclaimer, the term of this patent is extended or adjusted under 35 U.S.C. 154(b) by 0 days.

(21) Appl. No.: 18/669,528

(22) Filed: May 21, 2024

Related U.S. Application Data

(60) Provisional application No. 63/564,978, filed on Mar. 13, 2024.

(51) Int. Cl.
*H04L 9/40* (2022.01)

(52) U.S. Cl.
CPC ................ *H04L 63/1433* (2013.01)

(58) Field of Classification Search
CPC .................................. H04L 63/1433
See application file for complete search history.

(56) References Cited

U.S. PATENT DOCUMENTS

| | | | |
|---|---|---|---|
| 4,263,503 A | 4/1981 | Bianco | |
| 4,832,341 A | 5/1989 | Muller et al. | |
| 5,298,725 A | 3/1994 | Fischer | |
| 8,296,477 B1 | 10/2012 | Polk | |
| 8,924,712 B2 | 12/2014 | Varadarajan et al. | |
| 10,158,612 B2 | 12/2018 | Xian et al. | |
| 10,430,568 B2 | 10/2019 | Narayan et al. | |
| 10,461,936 B2 | 10/2019 | Tjhai et al. | |
| 10,762,406 B2 | 9/2020 | Singh et al. | |
| 10,972,465 B1 | 4/2021 | Bendersky et al. | |
| 11,777,911 B1 | 10/2023 | Roth et al. | |
| 11,893,569 B2 | 2/2024 | Jamkhedkar et al. | |
| 2006/0101514 A1 | 5/2006 | Milener et al. | |
| 2007/0067847 A1* | 3/2007 | Wiemer | G06F 21/577 726/25 |
| 2015/0035650 A1 | 2/2015 | Lind | |
| 2015/0242634 A1* | 8/2015 | Lietz | G06F 21/577 726/25 |

(Continued)

*Primary Examiner* — Sarah Su

(57) ABSTRACT

The present disclosure relates to cybersecurity architectures and systems for assessing and quantifying security threats and risks associated with machine-readable codes, such as quick response codes, barcodes, data matrix codes, and other types of codes. A security application comprises a multi-context threat assessment system configured to analyze a broad spectrum of risk assessment attributes across multiple contexts. These contexts relate to the machine-readable code itself, target network resources identified by the code, entities affiliated with the code, end-users interacting with the code, and enterprise systems policies. The system can evaluate various risk assessment attributes for each of these contexts to more accurately quantify potential security risks associated with the machine-readable codes. The security application further includes an API for extending its threat assessment capabilities to various digital ecosystems and an AI-powered learning network comprising language models and computer vision systems to enhance threat detection and risk quantification capabilities.

20 Claims, 12 Drawing Sheets

(56) References Cited

U.S. PATENT DOCUMENTS

| | | | |
|---|---|---|---|
| 2016/0057161 A1* | 2/2016 | Li | H04L 63/0236 726/1 |
| 2017/0103674 A1* | 4/2017 | Sadeh-Koniecpol | G06F 21/566 |
| 2019/0199759 A1* | 6/2019 | Anderson | G06Q 50/20 |
| 2019/0260770 A1* | 8/2019 | Sansom | G06F 16/2455 |
| 2021/0176239 A1* | 6/2021 | Rose | H04W 12/72 |
| 2022/0158848 A1* | 5/2022 | Finke | H04L 9/3247 |
| 2022/0303308 A1* | 9/2022 | Gopathy | H04L 63/1408 |
| 2023/0006976 A1* | 1/2023 | Jakobsson | H04L 9/50 |
| 2023/0163981 A1 | 5/2023 | Subramanian | |
| 2023/0419067 A1 | 12/2023 | Wu et al. | |

\* cited by examiner

SCAN RESULTS

THREAT LEVEL: HIGH RISK

<u>Type</u>: QR Code — 145

<u>Affiliated Entities Detected</u>:
- VirusCompany LLC
- John Doe

<u>URLs Detected</u>:
- www.virusweb.com
- www.virusweb.com/virus.exe

<u>Emails Detected</u>:
- hacker@viruswebsite.com

<u>Phone Numbers Detected</u>:
- 555-555-555

401  402  403

<u>Scan Details</u>:
- A website was detected as being on a blacklist known for malware
- A link to an executable file was detected
- The executable file was scanned and detected to include malware
- An email address was detected that was reported by multiple users as being malicious
- A phone number was detected that is listed on phishing list
- Two entities, a company and an individual, were detected as being affiliated with the code. Both are on affiliated with malicious behavior.

SCAN RESULTS

THREAT LEVEL: LOW RISK

<u>Type</u>: Data Matrix Code

<u>URLs Detected</u>:
- www.qrshield.io

<u>Affiliated Entities Detected</u>:
- QRShield LLC

<u>Emails Detected</u>:
- info@qrshield.com

<u>Phone Numbers Detected</u>:
- 123-456-7890

<u>Scan Details</u>:
- No malicious behavior was detected for the website, phone number, or email addresses
- The website was detected as using enhanced security protocols for data communications and data storage, which can serve to protect your data
- The website was detected as being compliant with all applicable data privacy requirements and compliance frameworks
- One entity, a company, was detected as being affiliated with the code. The entity was included on a whitelist identifying legitimate entities.

FIG. 4B

CYBERSECURITY ARCHITECTURES FOR MULTI-CONTEXTUAL RISK QUANTIFICATION

CROSS-REFERENCE TO RELATED APPLICATIONS

This application claims benefit of, and priority to, U.S. Provisional Patent Application No. 63/564,978 filed on Mar. 13, 2024. The content of the above-identified application is herein incorporated by reference in its entirety.

TECHNICAL FIELD

The present disclosure generally relates to the field of cybersecurity, and more specifically, to systems, methods, and apparatuses for assessing and quantifying security threats and risks associated with machine-readable codes and/or other types of digital data.

BACKGROUND

Machine-readable codes, such as quick response (QR) codes, barcodes, and data matrix codes, have become ubiquitous in today's digital age. They provide a convenient and efficient means of encoding and decoding information, enabling quick and easy access to digital content and services. These codes are used in a wide range of applications, from product tracking and inventory management to advertising and marketing. By simply scanning a code with a smart phone or other type of electronic device, users are provided with instant access to various types of digital content (e.g., product details, digital menus, or promotional content), such as by downloading the content on the users' devices or by directing the users' devices to websites that include the content.

The widespread adoption of machine-readable codes introduces a spectrum of security risks. In one example, scanning a code could inadvertently trigger a drive-by-download attack, where malicious software is installed on the user's device, leading to potential data theft or system compromise. Phishing attacks are another risk, where a seemingly innocuous code redirects the user to a fraudulent website designed to harvest personally identifiable information (PII), protected health information (PHI), financial information and/or other types of sensitive information. Along similar lines, machine-readable codes could be weaponized to initiate calls or transmissions of electronic messages (e.g., emails, text messages, etc.) to deceptive third parties, which may result in smishing malware attacks or divulging of sensitive information over the phone or through electronic messages. Furthermore, in some instances, machine-readable codes can be directly embedded with malicious code, which can infect a device upon scanning. These are just a few types of malicious threats that individuals may face when scanning machine-readable codes.

Even in scenarios where there is no malicious intent behind the creation and distribution of machine-readable codes, these codes can still pose a variety of security risks to users. For instance, a machine-readable code may direct a user to a website that lacks robust security measures, thereby exposing the user to potential man-in-the-middle attacks or rendering any data provided to the website vulnerable to interception by unauthorized parties. Additionally, machine-readable codes could contain embedded links to websites that, while not inherently malicious, lack adequate data protection frameworks for collecting, processing, or storing data, again risking exposure of the user's sensitive information and/or violation of the user's data privacy rights. These scenarios underscore the multifaceted nature of security risks associated with machine-readable codes, which may expose users to security risks even in the absence of explicit malicious intent.

Existing cybersecurity security solutions fail to address the security threats or risks that are posed by scanning machine-readable codes. Indeed, the most commonly utilized security software solutions for both personal usage and enterprise usage do not include any functionalities that are specifically designed to address security issues posed by machine-readable codes.

A major technical challenge in detecting security threats and risks associated with machine-readable codes is the extensive range of contextual parameters that require assessment. That is, to adequately shield users from security threats or risks posed by a given machine-readable code, a multitude of contextual risk factors should be considered These risk factors encompass a broad spectrum of parameters, including the nature and type of the code itself, the integrity and content of the encoded data, the security posture of the websites or network resources identified by the code, and the trustworthiness of entities associated with the code's distribution. Additionally, the context in which the end-user interacts with the code and the security features or vulnerabilities of the device used for scanning the code can further contribute to the complexities of assessing security risks corresponding to the code. This multifaceted nature of security risks poses significant technical hurdles with respect to accurately identifying, assessing, and mitigating potential threats and risks arising from interactions with machine-readable codes.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

BRIEF DESCRIPTION OF DRAWINGS

Non-limiting and non-exhaustive embodiments are described with reference to the following figures. To facilitate further description of the embodiments, the following drawings are provided, in which like references are intended to refer to like or corresponding parts:

FIG. 4A is an interface illustrating exemplary risk quantification data that can be generated by the security application according to certain embodiments; and FIG. 4B is another interface illustrating exemplary risk quantification data that can be generated by the security application according to certain embodiments.

Figure 1A:
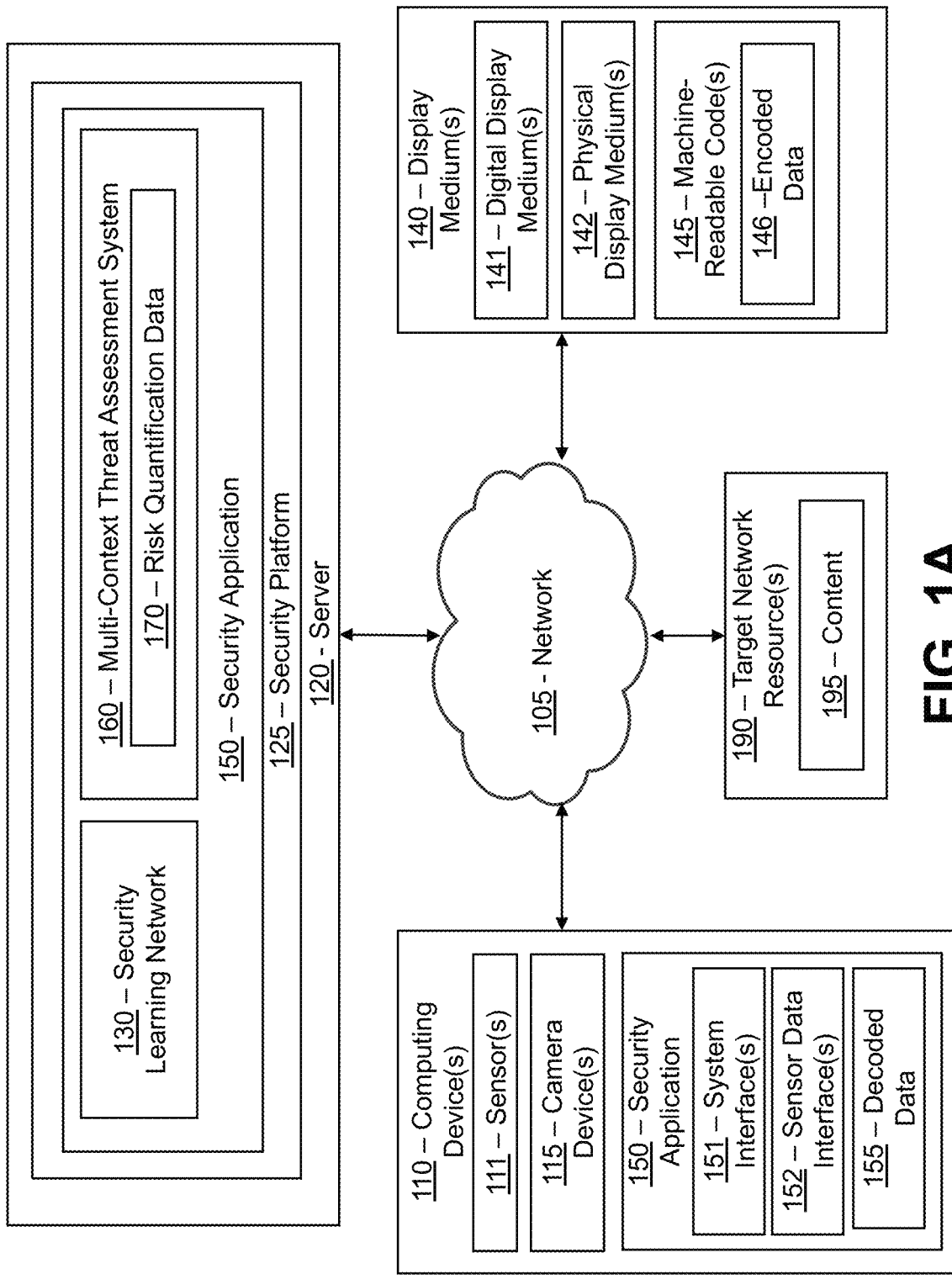
FIG. 1A is a block diagram of a system according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION

The present disclosure relates to cybersecurity systems, methods, apparatuses, and computer program products for assessing and quantifying security threats and risks associated with machine-readable codes. In certain embodiments, a security application includes a multi-context threat assessment system that is configured to analyze a broad spectrum of risk assessment attributes to detect actual or potential security risks corresponding to scanning or inputting machine-readable codes.

The multi-context threat assessment system can be configured to evaluate a multitude of contextual factors, each of which can be used to identify and/or quantify security threats or risks associated with machine-readable codes. In certain embodiments, in evaluating the risk profiles associated with the machine-readable codes, the multi-context threat assessment system can analyze risk assessment attributes, such as code attributes, target network resource attributes, entity attributes, end-user attributes, enterprise system attributes, and/or decoded data attributes described herein. The multi-context threat assessment system also can analyze may other risk assessment attributes described throughout this disclosure.

The multi-context threat assessment system can be configured to detect, classify, and decode various types of machine-readable codes, such as QR codes, barcodes, data matrix codes, and other codes mentioned in this disclosure. Certain types of machine-readable codes may carry a greater risk profile due to factors such as less stringent regulation, ease of acquisition by potential malicious actors, and/or heightened susceptibility to security threats.

The code attributes analyzed by the multi-context threat assessment system can encompass characteristics related to a machine-readable code itself. In some examples, the code attributes may be utilized to assess the type and integrity of the code, as well as its adherence to relevant specifications and standards.

The entity attributes analyzed by the multi-context threat assessment system may correspond to attributes of entities (e.g., individuals, companies, organizations, or governmental bodies) that are detected as being affiliated with the machine-readable codes, and they may include parameters relating to these entities' geographic locations, presence on control lists, authenticity, criminal history, and/or overall reputation. In some scenarios, the entities associated with a machine-readable code can be directly identified by analyzing the decoded data derived from the code and/or can be indirectly identified by correlating content in the decoded data with external sources (e.g., such as websites identified by the decoded data, DNS or registrar information, access control lists, etc.).

User attributes analyzed by the multi-context threat assessment system may correspond to attributes of the end-users who scan the machine-readable codes and/or the computing devices used by those end-users, and they may encompass various characteristics including behavior patterns, device security features, device vulnerabilities, and geographic locations corresponding to the user or computing device operated by the user.

The decoded data attributes analyzed by the multi-context threat assessment system also can encompass a wide array of parameters that are derived directly from the information encoded within the machine-readable codes. Amongst other things, these attributes may include content classifications indicating the type of information that is encoded, such as URLs, contact details, or embedded executable code, as well as sensitive data classifications identifying the presence of personal or confidential information. Additionally, these attributes may indicate if the information encoded within the machine-readable codes comprises information that is subject to regulatory compliance frameworks.

The target network resource attributes analyzed by the multi-context threat assessment system may correspond to attributes of web pages, files, and/or other network resources that are identified by, or detected as being affiliated with, the machine-readable codes. In some examples, the target network resource attributes may encompass a wide range of parameters for detecting security threats or risks associated with the network resources including some or all of the following: a) classification data that identifies a type of resource (e.g., whether it is a web page, document file, or executable file); b) hashing attributes (e.g., which may indicate the security of digital signatures and data storage techniques utilized by the network resources); c) encryption attributes (e.g., which may indicate the strength and implementation of encryption protocols used for data transmission, storage, and authentication); d) cloud attributes (e.g., which may indicate the security configurations of cloud-based services, including access controls, storage settings, and service usage of cloud environments associated with network resources); e) integrity attributes (e.g., which may verify the authenticity and/or unaltered state of content provided by the target network resources); f) vulnerability attributes (e.g., which may identify detected security weaknesses, outdated software, or configurations that may expose the target network resource to potential cyber threats); g) geographic attributes (e.g., which may consider the physical location of the target network resource or its hosting infrastructure, and which may influence the risk profile based on regional cybersecurity threats and legal jurisdictions); h) HTTP attributes (e.g., which may be derived from metadata associated with HTTP requests or provide insights into the security measures employed during data communication); i) data privacy and compliance attributes (e.g., which may identify whether the target network resources adhere to regulatory standards such as HIPAA, GDPR, etc., or indicate if the target network resource is compliant with data privacy frameworks); j) compromise history attributes (e.g., which may draw from historical records to ascertain whether the target network resource has been previously affected by security breaches or data compromises); k) hardware signature attributes (e.g., which may identify and assess the risks associated with the hardware devices hosting the target network resource, including device models, firmware versions, and configurations); and/or j) access control list attributes (e.g., which may indicate whether the network resource is included on known blocklists, blacklists, or whitelists, which can indicate a reputation for either malicious activity or trustworthiness).

The enterprise attributes analyzed by the multi-context threat assessment system also can encompass various parameters related to an organization's enterprise system, including attributes associated with access control policies, user authentication protocols, access control lists (ACLs), role-based access control (RBAC) policies, and attribute-based access control (ABAC) policies. In some cases, the enterprise attributes may be applicable in scenarios where an end-user is employed by an organization that seeks to enhance security or enforce protective measures on its employees or the computing devices utilized by its employees, thereby informing the assessment of potential security threats or risks.

By evaluating these and/or other risk-impacting attributes, the multi-context threat assessment system can generate risk quantification data that accurately and precisely grades or scores the machine-readable codes according to their risk profiles. The risk quantification data can be presented or displayed to end-users via the security application to provide a clear and concise assessment of the potential security threats or risks associated with machine-readable codes, enabling end-users to make informed decisions in connection with scanning, using, or interacting with machine-readable codes.

As explained further below, the multi-context threat assessment system can be configured to store and execute a wide range of functions to ascertain the aforementioned risk assessment attributes and/or other attributes described in this disclosure. The descriptions of the ASM (access and security management) engine, DAIV (data analysis and integrity) engine, and TDR (threat detection and response) engine provided below demonstrate a host of exemplary functions that may be utilized to ascertain and/or analyze these risk assessment attributes and/or other types of attributes. In response to a machine-readable code being scanned or input to the security application, some of these functions can be configured to communicate in real-time with external data sources, such as DNS or domain registrar providers, access control list providers, vulnerability list providers, and/or security feeds, to retrieve information for assessing security threats or risks corresponding to machine-readable codes that are under analysis by the multi-context threat assessment system.

Additionally, in certain embodiments, the security application can include an application programming interface (API), which operates as an interface for external systems, enterprise frameworks, and/or individual end-users to interact with the application's security functionalities. Amongst other things, the API allows for the submission of queries and retrieval of security assessment data, facilitating a range of security assessments beyond the analysis of machine-readable codes. Through the API, external systems or individual end-users can submit queries corresponding to websites, files, entities, and/or other digital resources for real-time security checks and risk assessments. In this manner, the API is able to extend the security application's capabilities to a broader range of cybersecurity challenges, allowing its comprehensive threat detection and risk quantification mechanisms to be applied to various contexts within the digital ecosystems.

In certain embodiments, the security application also may include learning network that is designed to enhance its cybersecurity capabilities through the integration of artificial intelligence (AI) and machine learning technologies. This learning network may include one or more language models and/or one or more computer vision systems that are trained to perform various functions that enhance the ability of the security application in detecting and quantifying security threats and risks.

In some examples, a language model may be trained or fine-tuned on a corpus of security data collected by the security application. The language model may utilize this supplemental security knowledge to enhance various functionalities of the security application, such as functionalities for grading or quantifying risks corresponding machine readable codes. Additionally, the language model may leverage the aggregated data to interpret or detect complex patterns and anomalies associated with cybersecurity threats, and to provide actionable insights and responses to enhance the application's threat detection and response mechanisms. In some embodiments, the language model may be configured to continuously learn from new data that is collected by the security application, enabling it to adapt and evolve its functionalities to address the ever-changing landscape of cybersecurity threats. Additionally, in some embodiments, the language model also can be configured with AI chatbot functionalities, enabling it to be queried by end-users and/or external systems to obtain desired security assessments and information.

The computer vision system can be configured to analyze images, videos, and/or visual content to extend risk assessment capabilities of the security application to visual modalities. In some examples, the computer vision system can be configured to analyze image or video content embedded directly into machine-readable codes and/or included on network resources, such as web pages or files, that are being scrutinized by the security application. In some scenarios, the computer vision system can be configured to detect whether image or video content includes sensitive information and/or information about entities (e.g., individuals, companies, etc.) that are known to be malicious actors. The visual interpretation capabilities also can be applied to enhance analysis of machine-readable codes, such as by classifying or detecting categories corresponding to the codes (e.g., determining whether input codes correspond to QR codes, barcodes, data matrix codes, etc.) and/or detecting whether the codes are compliant with application specifications associated with the code types.

The security application offers a comprehensive suite of advantages designed to enhance cybersecurity measures for both end-users and external systems. One major benefit can be attributed to its multi-contextual risk analysis capabilities, which can detect security threats or risks that arise in many different contexts (e.g., such as threats or risks presented directly within the encoded data of machine-readable codes and threats or risks posed by external factors). By integrating a multitude of contextual parameters into its risk assessment analysis, the security application can deliver a more accurate and precise grading of potential security risks, enabling users to make informed decisions regarding their interactions with machine-readable codes.

Furthermore, the application's API extends its capabilities beyond machine-readable codes, allowing for real-time security assessments of various digital resources such as websites, files, and entities. This flexibility permits that the security application's threat detection and risk quantification mechanisms to be applied across different contexts within various digital ecosystems. Additionally, the inclusion of an AI-powered learning network, comprising language models and/or computer vision systems, further enhances the threat or risk detection capabilities of the security application and bolsters the application's ability to adapt to evolving cybersecurity threats. Many other advantages of the system will be apparent upon review of this disclosure.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

I. Exemplary Systems, Networks, & Architectures

Figure 1B:
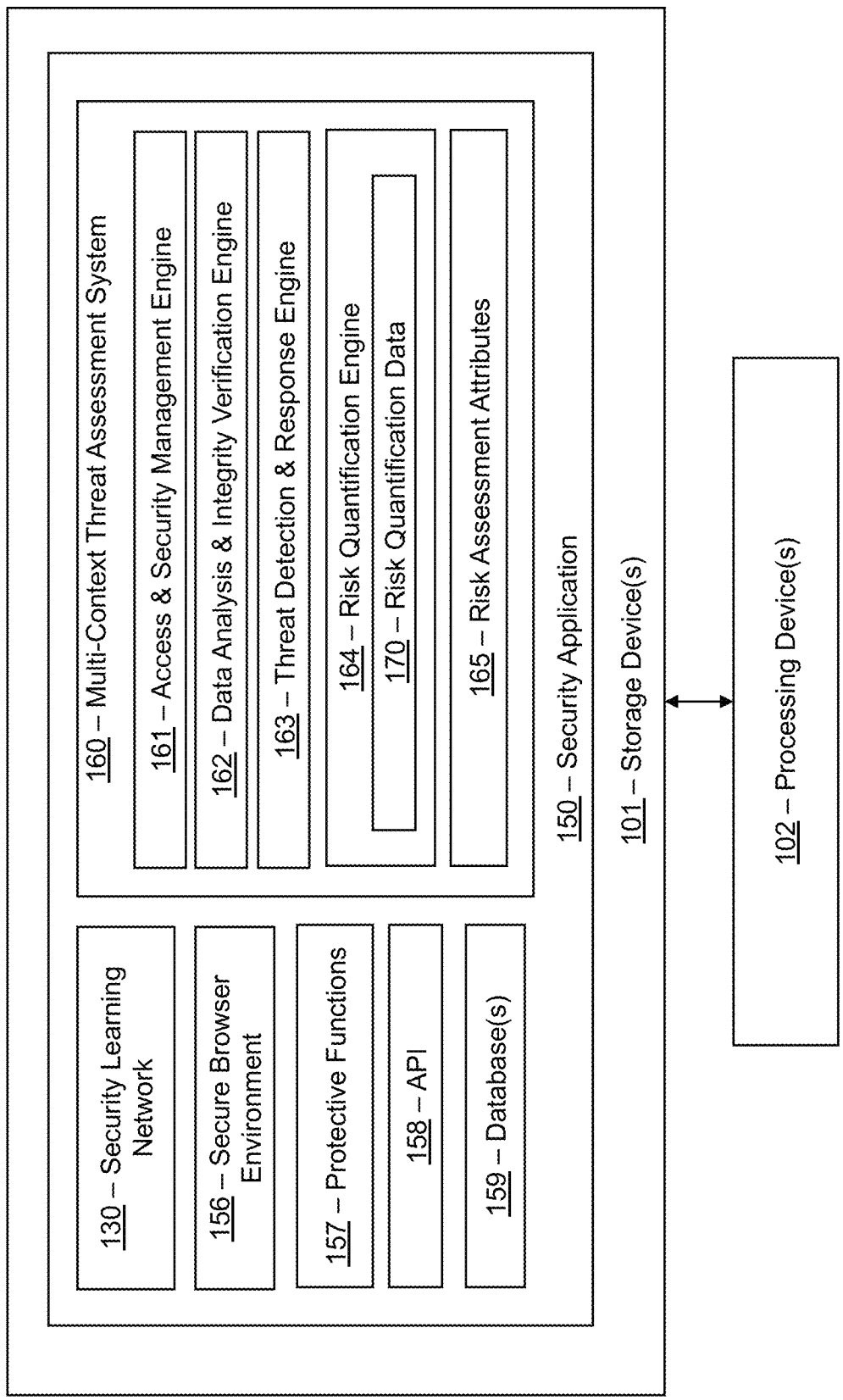
FIG. 1B is a block diagram illustrating exemplary components of a security application according to certain embodiments.

FIG. 1A is a diagram of an exemplary system 100 in accordance with certain embodiments. FIG. 1B is a block diagram illustrating exemplary features and/or functions associated with the security application 150 described herein. FIGS. 1A-1B are jointly discussed below.

The system 100 comprises one or more computing devices 110, one or more servers 120, one or more display mediums 140, and one or more target network resources 190 that are configured to communicate over a network 105. A security application 150 may be stored on and executed by the one or more servers 120 and/or one or more computing devices 110. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

In certain embodiments, the security application 150 may be included on, or made available, via a security platform 125, such as a website, a web application, an online site, and/or other type of platform. In addition to providing access to the security application 150, the security platform 125 may provide access to various types of security-related information, articles, blogs, videos, and/or other content, as well as other types of digital security tools.

The security application 150 may include, inter alia, a security learning network 130, a multi-context threat assessment system 160, a secure browser environment 156, one or more protective functions 157, an application programming interface (API) 158, and/or one or more databases 159. As explained throughout this disclosure, the security application 150 can be configured to execute comprehensive security analyses to assess threats or risks corresponding to various types of machine-readable codes 145. These machine-readable codes 145 can be displayed or presented on display mediums 140, such as digital display mediums 141 and/or physical display mediums 142.

For purposes of simplicity, certain portions of this disclosure may sometimes refer to the components in FIGS. 1A-1B using singular terms. However, it should be understood that the system can include any number (e.g., one or multiple) of these components, including any number of computing devices 110, servers 120, security platforms 125, security learning networks 130, language models 135 (see FIGS. 2E and 3D), display mediums 140, security applications 150, and/or target network resources 190.

All the components illustrated in FIG. 1A, including the computing device 110, server 120, security platform 125, security learning network 130, language model 135, display medium 140, security application 150, and/or target network resources 190 can be configured to communicate directly with each other and/or over the network 105 via wired or wireless communication links, or a combination of the two. Each of the computing devices 110, servers 120, security platforms 125, security learning networks 130, language models 135, display mediums 140, security applications 150, and/or target network resources 190 can include one or more communication devices, one or more storage devices 101, and one or more processing devices 102 that are capable of executing computer program instructions.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices 101 including, but not limited to, instructions associated with the security application 150 (including any functionalities associated with the security learning network 130, the language model 135, and/or the multi-context threat assessment system 160).

The one or more storage devices 101 may include (i) non-volatile memory, such as, for example, read-only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the storage devices 101 may be physical, non-transitory mediums. The one or more storage devices 101 can store instructions associated with the functions executed by the security application 150 (including, but not limited to, any functionalities associated with the security learning network 130, the language model 135, and/or the multi-context threat assessment system 160).

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as Wi-Fi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, server 120, security platform 125, security learning network 130, language model(s) 135, multi-context threat assessment system 160, and/or target network resource(s) 190 to be connected to the Internet and/or another network. The modem devices can permit bi-directional communication between the Internet (and/or other network) and the computing devices 110, server 120, security platform 125, security learning network 130, language model(s) 135, multi-context threat assessment system 160, and/or target network resource(s) 190. In certain embodiments, one or more router devices and/or access points may enable the computing devices 110, server 120, security platform 125, security learning network 130, language model(s) 135, multi-context threat assessment system 160, and/or target network resource(s) 190 to be connected to a LAN and/or other more other networks. In certain embodiments, the computing devices 110, server 120, security platform 125, security learning network 130, language model(s) 135, multi-context threat assessment system 160, and/or target network resource(s) 190 can access the Internet and/or other networks. In certain embodiments, one or more mobile hot spots may be configured to establish a LAN (e.g., a Wi-Fi network) that is linked to another network (e.g., a cellular network). The mobile hot spot may enable the computing devices 110, server 120, security platform 125, security learning network 130, language model(s) 135, multi-context threat assessment system 160, and/or target network resource(s) 190 to access the Internet and/or other networks.

In certain embodiments, the computing devices 110 may represent mobile devices (e.g., smartphones, personal digital assistants, tablet devices, vehicular computing devices, wearable devices, or any other device that is mobile in nature), desktop computers, laptop computers, and/or other types of electronic devices.

In some embodiments, each of the computing devices 110 may comprises one or more sensors 111. In some examples, the sensors 111 can include global positioning system (GPS) sensors, audio sensors (e.g., microphones), gyroscopes, accelerometers, imaging sensors, and/or sensors that are connected to Bluetooth communication modules. As explained in further detail below, the outputs of these sensors 111 and/or other sensors included on end-users' computing devices 110 may be accessed by the security application 150 to enhance its capabilities for detecting or assessing security threats or risks.

In some embodiments, each of the computing devices 110 may comprise one or more camera devices 115. In some examples, the camera devices 115 can be configured to capture still images, video data, and/or other types of visual content. The camera devices 115 can include one or more imaging sensors, one or more optical sensors, and/or other types of visual sensing systems. In various scenarios and environments, the camera devices 115 can be utilized to scan or input the machine-readable codes 145 described herein.

The one or more servers 120 may generally represent any type of computing device, including any of the computing devices 110 mentioned above. In certain embodiments, the one or more servers 120 additionally, or alternatively, can comprise one or more mainframe computing devices, one or more virtual servers, and/or one or more cloud servers (e.g., that are executed in a cloud-computing environment). In some embodiments, the one or more servers 120 can be configured to execute web servers and can communicate with the computing devices 110 and the target network resources 190 over the network 105 (e.g., over the Internet).

In certain embodiments, the security application 150 can be stored on and executed by the one or more servers 120. Additionally, or alternatively, the security application 150 can be stored on and executed by the one or more computing devices 110. Thus, in some embodiments, the security application 150 can be stored as a server application on one or more servers 120 and, in other embodiments, can be stored as a local application on a computing device 110, or integrated with a local application stored on a computing device 110.

Additionally, in some embodiments, security application 150 can be implemented as a combination of a front-end application (e.g., which is stored on a computing device 110) and a back-end application (e.g., which is stored on one or more servers 120). All functionalities of the security application 150 described herein can be executed by the front-end application, back-end application, or a combination of both. In some examples, the front-end of the security application 150 can include the system interfaces 151, sensor data interfaces 152, and/or secure browser environment 156 described herein, while the back-end of the security application 150 can include the multi-context threat assessment system 160 and security learning network 130 described herein. The decoding software or functions described herein can be stored on the front-end and/or back-end of the security application 150.

Additionally, in some embodiments, the security application 150 (or its functionalities) may be integrated into a global software system and/or broader security software solution. In one example, the functionalities associated with analyzing, detecting, and/or quantifying security threats or risks pertaining to machine-readable codes 145 may be included in a security solution that addresses other types of cybersecurity functions (e.g., such as cybersecurity functions relating to network security, identity management, endpoint security, cloud security, database security, etc.). In another example, these functionalities also may be integrated into cybersecurity frameworks that are utilized in connection with enterprise systems and/or ERP (enterprise resource planning) systems. In a further example, these functionalities may be integrated into an operating system running on computing devices 110 and/or servers 120. The security application 150 and/or corresponding functions described herein can be incorporated into many other types of software solutions as well.

In certain embodiments, the one or more computing devices 110 can enable end-users to access the security platform 125 (and security application 150) over the network 105. For example, in some cases, a computing device 110 can access the security platform 125 over the Internet via a web browser application. Additionally, or alternatively, a computing device 110 can store and execute a front-end of a security application 150 that is configured to communicate with a back-end of the security application 150 that is stored and executed by the security platform 125. The front-end of the security application 150 can include a system interface 151 that enables end-users to communicate or interface with the back-end of the security application 150. The back-end of the security application 150 can host or access a security learning network 130 and the multi-context threat assessment system 160 discussed herein.

In certain embodiments, the display mediums (DM) 140 can include any article, item, apparatus, device and/or display that is capable of displaying a machine-readable code 145. The display mediums 140 can include both digital display mediums 141 and physical display mediums 142.

A digital display medium (DDM) 141 may be configured to electronically or digitally display a machine-readable code 145. In some examples, a digital display medium 141 may include a television, computing device, electronic sign, digital advertisement, display monitor device, wearable device, or the like. In some scenarios, the digital display medium 141 may be an electronic or digital display that is external to a computing device 110 and, in other scenarios, the digital display medium 141 may be a display device included on the computing device 110 itself.

A physical display medium (PDM) 142 may correspond to a tangible object, material, or article that displays a machine-readable code 145. In some examples, a physical display medium 142 may include a printed advertisement, printed menu, billboard, business card, magazine, newspaper, or the like.

The machine-readable codes 145 can include various types of optical codes or data intended to be scanned, read, or interpreted by a machine (e.g., an optical scanner device and/or scanning software) and/or which may not be readily interpreted by humans. In many examples, the machine-readable codes 145 can correspond to optical codes, such as QR (quick response) codes, one-dimensional barcodes, two-dimensional barcodes, and/or data matrix codes. Additionally, or alternatively, the machine-readable codes 145 can include dot codes, MaxiCodes, color barcodes, color QR codes, high-capacity color barcodes (HCCBs), color data matrix codes, QuickMark codes, and/or other types of optical codes. The security techniques described in this disclosure can considered "omni-dimensional" in the sense that they can be applied to machine-readable codes 145 having any number of dimensions (e.g., one-dimensional codes, two-dimensional codes, and/or codes with greater numbers of dimensions). The security techniques described in this disclosure also can be considered "color agnostic" in that sense that can be applied to machine-readable codes 145 having black-and-white encodings and/or machine-readable codes 145 having color encodings.

Each machine-readable code 145 may be embedded with, or comprise, encoded data 146. Each type of machine-readable code 145 may be associated with a protocol or specification (e.g., such a specification promulgated by the ISO or other entities) that defines rules and standards identifying how data is encoded into the machine-readable code 145 and decoded from the machine-readable code 145. The encoding techniques or protocols utilized to generate the machine-readable codes 145 can vary. In some examples, the encoded data 146 comprises a series of dark and light elements (e.g., black and white) arranged in a specific pattern to encode information. The dark and light elements may be utilized to represent binary data in some cases. Additionally, or alternatively, the encoded data 146 may use patterns of squares, dots, or other geometric shapes to encode information. Additionally, or alternatively, the encoded data 146 may utilized different color patterns or color arrangements to encode information. Many other encoding schemes also may be utilized to embed or incorporate the encoded data 146 into machine-readable codes 145. The content or information of the encoded data 146 and/or corresponding decoded data 155 can vary significantly.

Figure 2B:
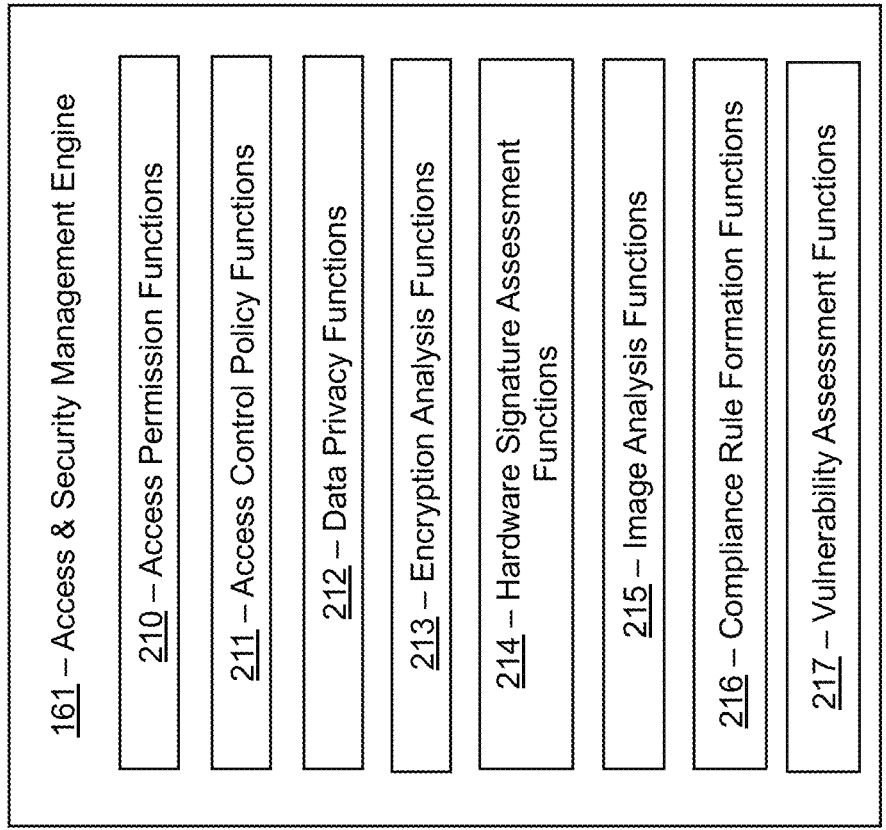
FIG. 2B is a block diagram illustrating exemplary functions associated with an access and security management (ASM) engine according to certain embodiments.
Figure 2A:
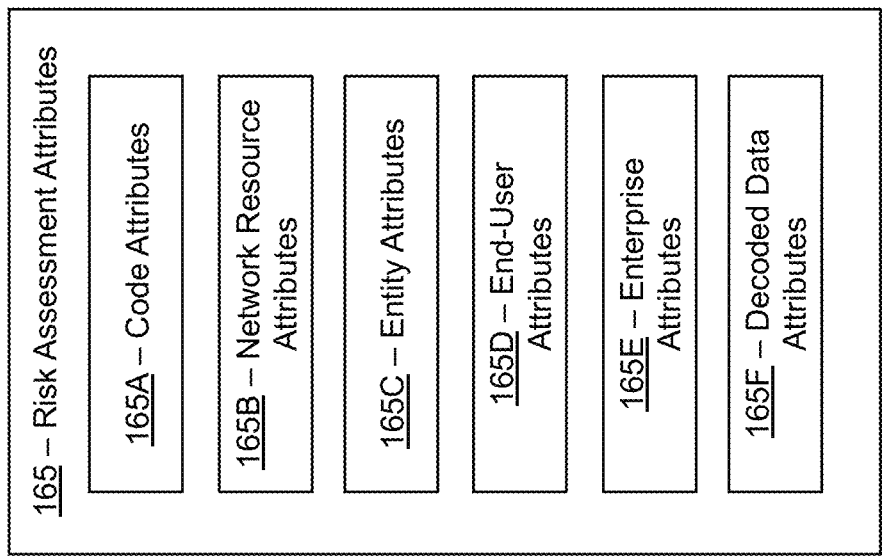
FIG. 2A is a block diagram illustrating exemplary risk assessment attributes according to certain embodiments.
Figure 2C:
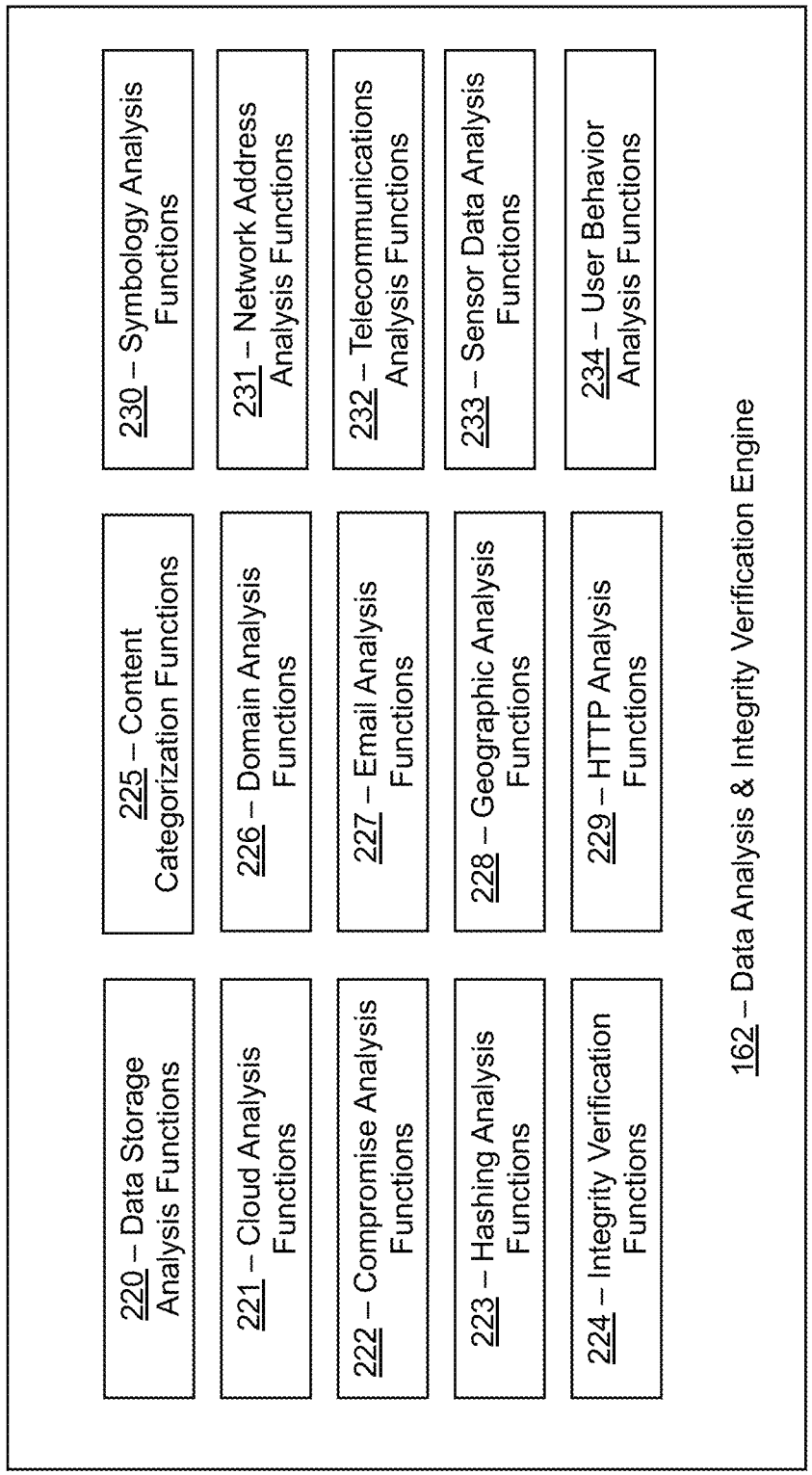
FIG. 2C is a block diagram illustrating exemplary functions associated with a data analysis and integrity verification (DAIV) engine according to certain embodiments.
Figure 2E:
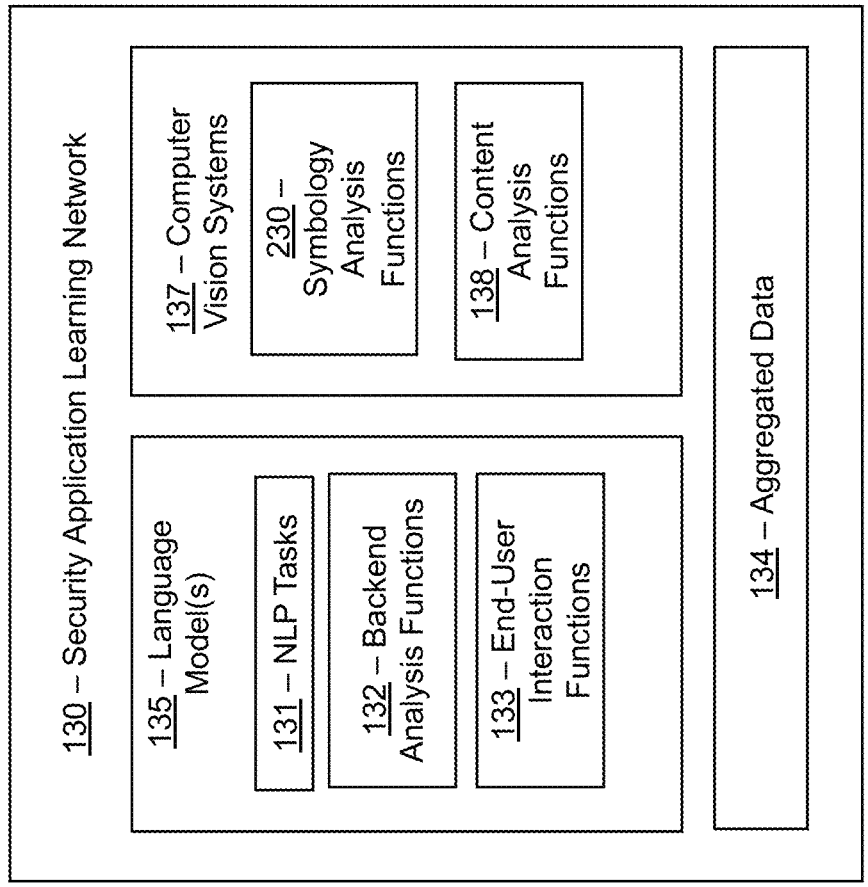
FIG. 2E is a block diagram illustrating exemplary features of a security learning network according to certain embodiments.
Figure 2D:
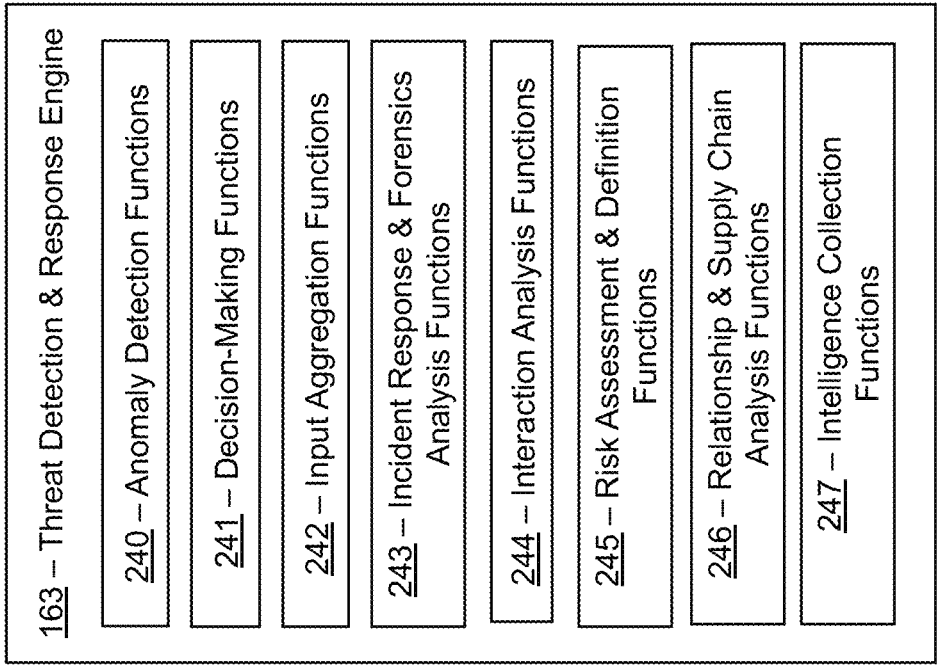
FIG. 2D is a block diagram illustrating exemplary functions associated with a threat detection and response (TDR) engine according to certain embodiments.
Figure 2G:
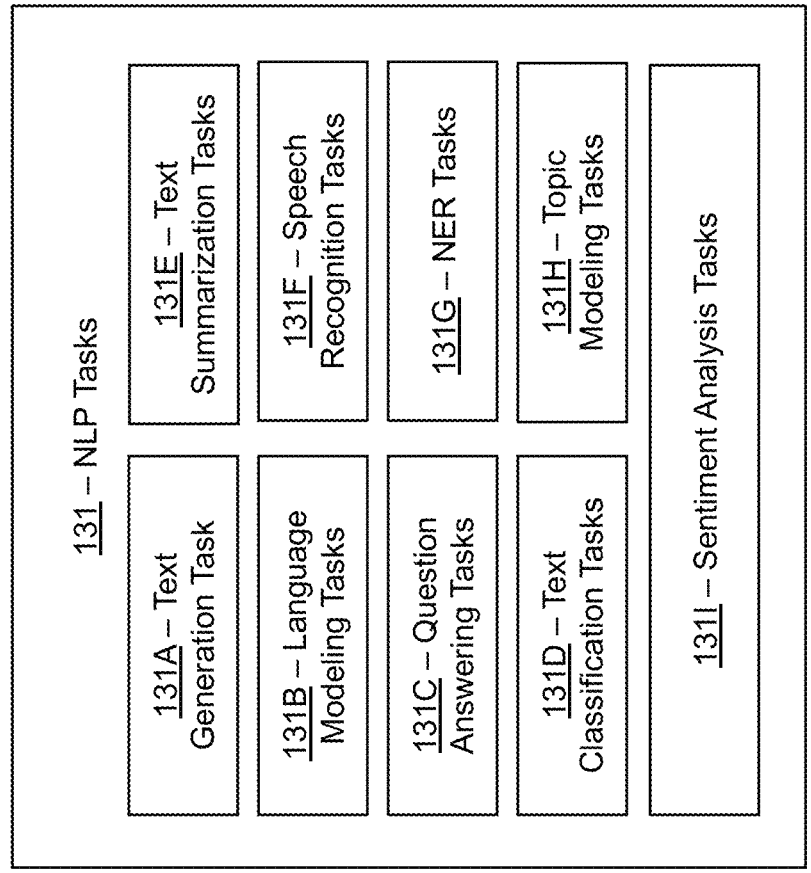
FIG. 2G is a block diagram illustrating exemplary natural language processing (NLP) tasks that can be executed by a language model of the security learning network according to certain embodiments.
Figure 2F:
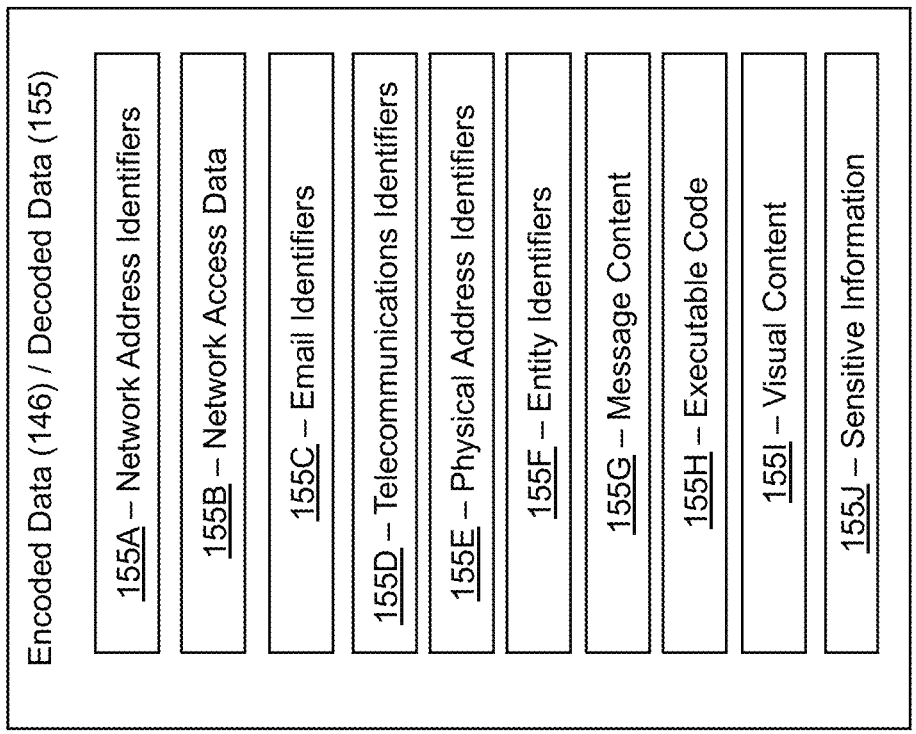
FIG. 2F is a block diagram illustrating exemplary content that can be included within encoded data or decoded data of machine-readable codes according to certain embodiments.

FIG. 2F illustrates exemplary content that be included in the encoded data 146 or decoded data 155 of machine-readable codes 145. In some non-limiting examples, the encoded data 146 may comprise content corresponding to network address identifiers 155A, network access data 155B, email address identifiers 155C, telecommunications identifiers 155D, physical address identifiers 155E, entity identifiers 155F, message content 155G, executable code 155H, visual content 155I, and/or sensitive information 155J. Some or all of this content may be embedded into the machine-readable codes 145 as text strings or textual content.

The network address identifiers 155A can include various types of network addresses. In some examples, the network address identifiers 155A may comprise URLs (uniform resource locators), web addresses, network addresses, MAC (media access control) addresses, and/or the like.

The network access data 155B may identify various types of networks (e.g., LANs, WANs, W-Fi networks, PANs, Bluetooth networks etc.) and/or may include information for accessing the networks, such as SSIDs (service set identifiers), network names, network passwords, login credentials, etc.

The encoded data 146 or decoded data 155 also may include various forms of contact information, such as email address identifiers 155C corresponding to email addresses and/or other types of electronic addresses, telecommunications identifiers 155D corresponding to telephone numbers and/or other telecommunications information, and/or physical address identifiers 155E corresponding to postal addresses and/or physical addresses.

The entity identifiers 155F can include names or identifiers that reference or identify various types of entities, such individuals, companies, businesses, organizations, and/or governmental entities. In some scenarios, the entity identifiers 155F can include text strings and/or visual content (e.g., logos or images) that identify individuals, companies, businesses, organizations, and/or governmental entities.

The message content 155G can include plain text messages and/or alphanumeric content that is included in the machine-readable codes 145. In some examples, the message content 155G may include text strings that include messages, instructions, or notes. In other examples, the message content 155G may include information related to products or services (e.g., such as serial numbers, model numbers, manufacturing dates, and warranty details).

The encoded data 146 or decoded data 155 may further include executable code 155H that is directly embedded into the machine-readable codes 145. The executable code 155H may comprise executable computing instructions, programming logic, and/or program code.

The encoded data 146 or decoded data 155 may further include visual content 155I, such as image, video, and/or animation content that is embedded directly into the machine-readable codes 145.

The encoded data 146 or decoded data 155 may further include sensitive information 155J, such as text strings or messages that include personally identifiable information (PII), protected health information (PHI), financial records, and/or other types of sensitive information.

The encoded data 146 or decoded data 155 may encompass a wide array of other content types, in addition to the types of content explicitly mentioned in this disclosure. These could include, but are not limited to, social media identifiers, user IDs, authentication tokens, digital certificates, license keys, geographic coordinates, transactional data, instructional content, promotional codes, and multimedia elements like audio clips or augmented reality markers. The versatility of machine-readable codes allows them to serve as carriers for diverse data payloads, facilitating a multitude of applications across various domains and industries.

Returning to FIGS. 1A-1B, in various scenarios, the encoded data 146 included in a machine-readable code 145 may comprise a network address identifier 155A that identifies one or more target network resources 190 or locations of one or more target network resources 190. A target network resource 190 may correspond to a web page, website, file, document, application, database, and/or other network resource that is identified by a machine-readable code 145 (or the encoded/decoded data associated with the machine-readable code 145). Each target network resources 190 may comprise various types of content 195.

It should be understood that both the types of target network resources 190 and the content 195 associated with the target network resources 190 can vary significantly. For example, in scenarios where a target network resource 190 corresponds to a file, such as a multi-media file, text file, image file, video file, audio file, archive file, or document, the file may include content 195 corresponding to various types of textual, image, video, and/or audio content. In scenarios where a target network resource 190 corresponds to a web page file, application file, or executable file, these files may include the same types of content 195 previously mentioned, as well as source code and functional content (e.g., such as blog, instant messaging features, data feeds, login portals, etc.).

In various scenarios, end-users may utilize computing devices 110 (e.g., mobile devices or smart phones) to decode machine-readable codes 145. In some examples, the machine-readable codes 145 may be included on external display mediums 140 (e.g., digital display mediums 141 and/or physical display mediums 142) and the end-users may utilize camera devices 115 included on their computing devices 110 to scan or input the machine-readable codes 145. In other examples, the machine-readable codes 145 may be stored on the computing devices 110 and/or displayed directly on display screens of the computing devices 110 (e.g., by accessing a website or application that includes the machine-readable codes 145).

Decoding software, either incorporated within the security application 150 or installed on the computing device 110, can be executed to decode or interpret the machine-readable codes 145. This decoding software is designed to produce decoded data 155, which reflects the content or information included within the encoded data 146 (e.g., such as any URLs, phone numbers, sensitive information, text strings, and/or other content).

As explained above, scanning a machine-readable code 145 can present numerous types of security threats or risks to the end-user and/or the computing device 110 operated by the end-user. In one example, scanning a machine-readable code 145 can result in a drive-by-download attack by directing a web browser or application on the end-user's computer device 110 to a target network resource 190 that downloads viruses, malware, or the like onto the end-user's device. In another example, scanning a machine-readable code 145 can result in a phishing attack by directing a web browser or application on the end-user's computer device to a target network resource 190 that deceives the end-user into divulging sensitive information (e.g., such as usernames, passwords, credit card information, personal information, etc.). Along similar lines, scanning a machine-readable code 145 also can result in a smishing attack by directing an end-user to call a phone number or send an email to a malicious third-party that deceives the end-user into divulging sensitive information and/or which causes malware to be downloaded to the end-user's computing device 110. In a further example, the machine-readable code 145 itself may be embedded with malicious executable code, which can infect the computing device 110 operated by the end-user when it is scanned or decoded.

Scanning or decoding a machine-readable code 145 can present various security threats or risks even in scenarios where the supplier or provider of the machine-readable code 145 does not have malicious intent. In one example, a machine-readable code 145 may direct an end-user's device to a target network resource 190 that lacks proper security settings or protocols. This lack of security could expose the end-user to man-in-the-middle (MITM) attacks or, if the end-user provides data to the target network resource 190, may expose the end-user's data to malicious third parties. In other examples, a machine-readable code 145 may direct an end-user's device to a target network resource 190 that collects, processes, and/or stores data in a manner that is not compliant with applicable regulatory frameworks, such as HIPPA (Health Insurance Portability and Accountability Act) protocols, GDPR (General Data Protection Regulation) protocols, PCI DSS (Payment Card Industry Data Security Standard) protocols, ISO/IEC protocols, etc. Again, this may result in exposure of the end-user's sensitive data and/or violation of the end-user's data privacy rights.

As explained throughout this disclosure, the security application 150 described herein can address these and/or other technical challenges associated with protecting end-users and their computing devices 110 from security threats and risks associated with machine-readable codes 145.

In many embodiments, the security application 150 includes a multi-context threat assessment system 160 that analyzes a multitude of contextual attributes related to machine-readable codes 145 to comprehensively identify security threats or risks associated with the machine-readable codes 145. In some examples, the multi-context threat assessment system 160 can accurately and precisely quantify the threats or risks associated with the machine-readable codes 145 by not only analyzing the decoded data 155 embedded into the machine-readable codes 145, but also analyzing other contextual attributes, such as attributes of the machine-readable codes themselves, attributes of the target network resources 190 identified by decoded data 155, attributes of content 195 included on the target network resources 190, attributes of security protocols associated with the target network resources 190, attributes of entities (e.g., persons or organizations) that are detected as being associated with machine-readable codes 145, attributes associated with end-users that operate the computing devices 110, attributes of the computing devices 110 operated by the end-users, and/or other types of attributes that can provide insights on threats or risks associated with the machine-readable codes 145. The holistic manner in which the multi-context threat assessment system 160 considers these various contextual parameters can significantly improve the threat detection and risk assessment abilities of the security application 150.

As explained below, the multi-context threat assessment system 160 may analyze the aforementioned attributes and/or other attributes described in this disclosure using various analytics engines, such as the access and security management engine 161, data analysis and integrity verification engine 162, and threat detection and response engine 163 illustrated in FIGS. 1B and 2B-2D. In certain embodiments, one or more outputs of these analytics engines may be fed into a risk quantification engine 164, which utilizes the outputs to generate risk quantification data 170 corresponding to machine-readable codes 145. As discussed in further detail below, the risk quantification data 170 may comprise various types of information or data related to identifying or quantifying the threats or risks associated with the machine-readable codes 145.

In certain embodiments, when an end-user scans a machine-readable code 145 using a computing device 110 (e.g., using a system interface 151 or GUI presented via the security application 150), the machine-readable code 145 may be transmitted over the network 105 to the security application 150 (or back-end of the security application 150). In some cases, the decoded data 155 also may be transmitted along with the machine-readable code 145 (if decoding is performed locally on the front-end of the security application 150). Upon receiving this information, multi-context threat assessment system 160 will then execute a multi-contextual risk analysis on the received data (e.g. which considers various categories of threat and risk-related attributes) and generate risk quantification data 170 pertaining to the machine-readable code 145. The risk quantification data 170 can be transmitted over the network 105 to the computing device 110 to inform the end-user of any threats or risks associated with the machine-readable code 145 or, conversely, to inform the end-user that no risks or threats were detected.

Furthermore, in the event that certain types of security threats or risks are detected, the security application 150 can be configured to execute one or more protective functions 157 to protect the end-user, the computing device 110 operated by the end-user, and/or the end-user's data from the detected threats or risks.

The protective functions 157 can include preventive or proactive security functions that are aimed at preventing malicious actions before they occur. In some examples, the preventative or proactive security functions may block an end-user's computer device 110 (or software on the computing device 110) from accessing websites or other target network resources 190 that are suspected or determined to be malicious and/or which lack proper security or data privacy frameworks. Likewise, the preventative or proactive security functions may block calls or electronic messages (e.g., email messages, text messages, instant messages, etc.) from being transmitted to entities that are suspected of being, or determined to be, malicious or which lack proper security frameworks.

The protective functions 157 also can include remedial functions that can be executed to fix or mitigate damage or negative consequences that may be caused by scanning malicious or insecure machine-readable codes 145. In some examples, these remedial functions may include anti-virus software that detects and removes viruses, malware, or other types of malicious code that has been installed or downloaded onto an end-user's computing device 110. In further examples, these remedial functions may include functions that fix or adjust permissions to files, directions or drives that have been changed. In further examples, these remedial functions may include functions that unsend messages (e.g., email messages, text messages, instant messages, etc.) that have been sent by the end-user to suspicious or malicious entities. In further examples, these remedial functions may include data recovery functions, network isolation functions, incident reporting functions, etc.

In certain embodiments, the security application 150 may further include an API 158 that that allows third-party systems, enterprise frameworks, and/or individual end-users to interact with the application's extensive security functionalities. Amongst other things, the API 158 enables external parties to query the application for security assessments of various digital resources, such as websites, files, and entities, by submitting relevant identifiers or data for analysis. In some embodiments, the API 158 may be utilized as an integration point for both automated systems and manual user queries alike. In some scenarios, the API 158 can be leveraged by external systems for performing real-time security checks and risk assessments, ensuring that interactions with external digital resources are continuously monitored and evaluated against the latest security protocols and threat intelligence. By leveraging the API 158, users can extend the capabilities of the security application 150 beyond the analysis of machine-readable codes 145, applying its multitude of threat detection and risk quantification mechanisms to a broader range of cybersecurity challenges. Further details of the API 158 are described below.

Additionally, in some embodiments, the security application 150 may comprise a security learning network 130 that includes one or more AI models and/or one or more machine learning models to enhance various functionalities of security application 150.

In some examples, the security learning network 130 may comprise one or more language models (e.g., one or more large language models or LLMs) that are trained on security data that is aggregated and stored in one or more databases 159 of the security application. As explained in further detail below, the language model 135 can trained to perform various functions, including functions related to enhancing the risk assessments performed by the multi-context threat detection system 160 and functions for detecting patterns or anomalous data points in the security data. Additionally, in some cases, the language models may be configured with AI chatbot functionalities, enabling end-users or external systems to submit natural language prompts for querying the security application in connection with risk assessments.

The security learning network 130 also may be configured with one or more computer visions systems (e.g., one or more trained convolution neural networks) that can extend the risk assessment capabilities of the security application 150 to visual modalities. In some examples, the computer vision system may analyze images, videos, and/or other visual content included on target network resources 190 or in encoded data 146 for various type of risk-impacting attributes.

The systems, networks, and architectures described above are provided as examples to demonstrate environments in which embodiments described herein can be deployed. Numerous modifications and variations to the disclosed embodiments are possible, and the techniques described herein can be implemented in many other contexts and environments.

II. Exemplary Features of a Multi-Context Threat Assessment System

As described throughout this disclosure, the multi-context threat assessment system 160 can be configured to analyze various risk assessment attributes 165 to identify actual or potential security threats or security risks associated with machine-readable codes 145. The risk assessment attributes 165 encompass a variety of attributes that cover different contextual risk categories, and when analyzed collectively, they can offer a more comprehensive understanding of potential threats or risks linked to machine-readable codes 145. In this manner, the multi-context threat assessment system 160 can generate risk quantification data 170 that is more complete and/or which more accurately quantifies such threats or risks.

A. Exemplary Risk Assessment Attributes

FIG. 2A is a block diagram illustrating exemplary categories of risk assessment attributes 165 that may be analyzed and/or considered by the multi-context threat assessment system 160. These categories include code attributes 165A, network resource attributes 165B, entity attributes 165C, end-user attributes 165D, enterprise attributes 165E, and/or decoded data attributes 165F.

The code attributes 165A can generally correspond to attributes that relate to the machine-readable codes 145 themselves. For a given machine-readable code 145 that is under analysis, the multi-context threat assessment system 160 may derive and/or analyze one or more of the following code attributes 165A:

classification attributes identifying a code type associated with the machine-readable code 145 (e.g., indicating if it is a QR code, a barcode, a dot code, etc.)

authenticity attributes indicating whether the machine-readable code 145 is a valid code or invalid code and/or indicating whether the machine-readable code 145 is compliant with a corresponding specification (e.g., such as an ISO standard or other protocol specification) for a code type that the machine-readable code 145 purports to represent; and/or encoding type attributes relating to an encoding technique and/or decoding technique associated with the machine-readable code 145.

The multi-context threat assessment system 160 may analyze these and/or other code attributes 165A in assessing potential security threats or risks relating to machine-readable codes 145.

In certain embodiments, the multi-context threat assessment system 160 may be capable of analyzing a wide variety of code types (e.g., QR codes, barcodes, data matrix codes, etc.), and capable of detecting what type of code a machine-readable code is or purports to be on its face. Certain types of machine-readable codes 145 may carry a greater risk profile due to factors such as less stringent regulation, ease of acquisition by potential malicious actors, and/or heightened susceptibility to security threats. Thus, understanding the type of machine-readable code 145 can be useful to assessing potential threats or risks.

Likewise, understanding whether a machine-readable code 145 is valid or compliant with corresponding protocols or specifications also can be useful in assessing potential threats or risks. Machine-readable codes 145 that are detected as being invalid or non-compliant may considered riskier compared to those which are detected as be valid or compliant.

The network resource attributes 165B can generally correspond to attributes of a target network resource 190 that is identified by decoded data 155 derived from a machine-readable code 145 (and/or otherwise able to be identified using information included in the decoded data 155). Thus, the multi-context threat assessment system 160 may analyze network resource attributes 165B for any target network resource 190 that is explicitly or directly identified in the decoded data 155, as well as any target network resource 190 that is indirectly identified based on the decoded data 155 (e.g., indirectly identified based on correlations with email identifiers 155C, telecommunications identifiers 155D, physical address identifiers 155E, entity identifiers 155F, and/or other content included in the decoded data 155).

For a given machine-readable code 145 that is under analysis, the multi-context threat assessment system 160 may derive and/or analyze one or more of the following network resource attributes 165B for each identified target network resource 190:

- file classification attributes that identify a type of target network resource 190 (e.g., indicating whether it is a web page file, executable file, document file, configuration file, database file, or other type of file or resource);
- content classification attributes that identify one or more content types of the target network resource 190 (e.g., indicating whether the target network resource 190 includes images, videos, blogs, textual articles, source code, input forms, etc.);
- hashing attributes associated with the target network resource 190 (e.g., indicating whether the target network resource 190 uses secure or insecure hashing techniques) including:
  - attributes of hashing techniques used for digital signatures; and/or
  - attributes of hashing techniques used for data storage (e.g., for storage, retrieval, and/or verification of passwords, login credentials, and/or the end-users' data).
- encryption attributes associated with the target network resource 190 (e.g., indicating whether the target network resource 190 uses secure or insecure encryption techniques) including:
  - attributes of encryption techniques used for data transmission;
  - attributes of encryption techniques used for data storage; and/or
  - attributes of encryption techniques used for authentication and/or access control;
- cloud attributes related to the target network resource 190 including:
  - attributes related to the security of cloud environment configurations;
  - attributes related to the security of cloud service usage;
  - attributes related to the security of storage settings (e.g., for cloud databases or data buckets); and/or
  - attributes related to the security of cloud access controls;
- integrity attributes related to the integrity of files and/or content provided by the target network resource 190;
- vulnerability attributes associated with the target network resource 190 (e.g., indicating whether the target network resource 190 is running outdated software, software with known bugs or security issues, etc.);
- geographic attributes related to the target network resource 190 (e.g., indicating whether the target network resource 190, or hardware devices hosting the target network resource 190, is associated with higher risk geographic areas or geographic areas with greater propensities for malicious attacks or, alternatively, lesser risk geographic areas or geographic areas with lesser propensities for malicious attacks);
- HTTP (hypertext transfer protocol) attributes associated with the HTTP or HTTP metadata for the target network resource 190 (e.g., attributes of HTTP metadata included HTTP requests);
- compliance attributes related to various regulatory compliance frameworks (e.g., HIPPA, GDPR, etc.) including:
  - attributes indicating whether the target network resource 190 provides or collects data that is subject to each of these compliance frameworks;
  - attributes identifying whether the target network resource 190 is certified under applicable compliance frameworks; and/or
  - attributes indicating whether a target network resource 190 uses security protocols (e.g., encryption protocols, HTTP protocols, hashing protocols, etc.) that are specified by one or more applicable compliance frameworks;
- compromise history attributes that may be derived from historical records of compromises or data breaches (e.g., indicating whether or not the target network resource 190 was affected by known compromises or data breaches);
- hardware signature attributes associated with the target network resource 190 including:
  - signature attributes identifying device models, manufacturers, serial numbers, firmware versions, and/or hardware configurations of any servers or devices that host the target network resource 190; and
  - risk attributes associated with the device models, manufacturers, serial numbers, firmware versions, and/or hardware configurations (e.g., indicating outdated versions of firmware, risk-prone devices, hardware configurations with unauthorized modifications, etc.);
- data privacy attributes associated with the target network resource 190 (e.g., indicating whether or not the target network resource 190 is compliant with applicable data privacy frameworks);
- access control list attributes associated with the target network resource 190 (e.g., indicating whether the target network resource 190 is identified on any known blocklists, blacklists, whitelists, and/or other types of access control lists); and/or
- reputation attributes indicating a reputation of the target network resource 190 (e.g., indicating whether the target network resource 190 is known to be malicious, known to use insecure security protocols, known to be a legitimate entity, etc.).

The multi-context threat assessment system 160 may assess these and/or other network resource attributes 165B in assessing potential security threats or risks relating to machine-readable codes 145.

The entity attributes 165C can generally correspond to attributes of an entity (e.g., a person, company, organization, and/or government-related entity) that is detected as being affiliated with a given machine readable code 145. In some cases, an entity may be directly identified by decoded data 155 derived from a machine-readable code 145 (e.g., based on entity identifiers 155F included in the decoded data 155). Additionally, the entity may be indirectly identified by correlating or cross-referencing content in the decoded data 155 (e.g., telephone numbers, URLs, email addresses, names, etc.) with third-party data sources (e.g., website registrar information, identity databases, etc.).

For a given machine-readable code 145 that is under analysis, the multi-context threat assessment system 160 may derive and/or analyze one or more of the following entity attributes 165C for each identified entity:

- geographic attributes related to the entity (e.g., indicating whether the entity is associated with higher risk geographic areas or areas with higher propensities for malicious attacks or, conversely, lesser risk geographic areas or areas with lower propensities for malicious attacks);

control list attributes associated with the entity (e.g., indicating whether the entity is identified on any known blocklists, blacklists, whitelists, and/or other types of access control lists);

classification attributes that identify the type of entity (e.g., indicating whether the entity is an individual, company, organization, governmental entity, etc.);

authenticity attributes associated with the entity (e.g., if an entity purports to be a person, company, or organization, attributes indicating whether the person, company, or organization actually exists and/or is properly registered or in good standing);

criminal history attributes associated with the entity (e.g., indicating whether the entity has been convicted of, or accused of, criminal activities in the past); and/or reputation attributes indicating a reputation of the entity (e.g., indicating whether the entity is known to be malicious, known to be a good actor, etc.).

The multi-context threat assessment system 160 may assess these and/or other entity attributes 165C in assessing potential security threats or risks relating to machine-readable codes 145.

The end-user attributes 165D can generally correspond to attributes that relate to an end-user and/or a computing device 110 associated with the end-user. For example, the end-user attributes 165D may correspond to the end-user or the computing device 110 that scanned or input a machine-readable code 145 that is under analysis by the multi-context threat assessment system 160. For a given machine-readable code 145 that is under analysis, the multi-context threat assessment system 160 may derive and/or analyze one or more of the following end-user attributes 165D:

behavior pattern attributes associated with the end-user (or the computing device 110 operated by the end-user) including:
attributes identifying the end-user's behavior patterns across various types of digital environments;
attributes identifying anomalous behaviors of the end-user and/or deviations from normal behaviors;
attributes identifying the end-user's login patterns;
attributes identifying the end-user's purchase or payment patterns;
attributes identifying the end-user's interaction patterns with applications, websites, and/or other digital sources; and/or
attributes identifying the end-user's data access patterns;

geographic attributes related to the end-user or the computing device 110 associated with the end-user (e.g., indicating whether the end-user is currently located in a higher risk geographic area or area with a higher propensity for malicious attacks or, alternatively, a lesser risk geographic area or area with a lower propensity for malicious attacks);

hardware signature attributes associated with the computing device 110 of the end-user;

vulnerability attributes associated with the computing device 110 associated with the end-user (e.g., indicating whether the computing device 110 is running outdated software, software with known bugs or security issues, etc.);

compromise history attributes related to whether the end-user or computing device 110 associated with the end-user has been subjected to previous security compromises or data breaches; and/or identity verification attributes indicating whether or not the end-user has confirmed his or her identity (e.g., by entering security pins, biometric data, login credentials, or other verification information to the security application 150).

The multi-context threat assessment system 160 may assess these and/or other end-user attributes 165D in assessing potential security threats or risks relating to machine-readable codes 145.

In some embodiments, the geographic attributes associated with the end-user can be obtained from one or more sensors 111 integrated into a computing device 110 of the end-user. The security application 150 (or front-end of the security application 150) installed on the computing device 110 of the end-user may include one or more sensor data interfaces 152 that are adapted to access the data from the one or more sensors 111 to determine the location of the end-user.

In one example, a sensor data interface 152 may access the outputs of GPS sensors included on the end-user's computing device 110 to determine a location of the end-user. In another example, a sensor data interface 152 may access Bluetooth location data or Bluetooth sensor data to more precisely determine the location of the end-user (e.g., by triangulating the signals from multiple devices and/or by combining the data with GPS location data, Wi-Fi location data, or other location data). This enhanced location data can be leveraged to ascertain if the end-user is within specific buildings, areas, or locales that may be associated with elevated security threats or risks, either presently or based on historical incidents.

The enterprise attributes 165E can generally correspond to attributes related to an enterprise system (or similar other type of software solution used by an organization) associated with an end-user or a computing device 110 associated with the end-user. In certain embodiments, these enterprise attributes 165E may be applicable in scenarios where an end-user is employed by an organization that wishes to further enhance security or enforce protections on its employees or the computing devices 110 utilized by its employees. These enterprise attributes 165E can include another set of contextual parameters that are considered by the multi-context threat assessment system 160 in assessing potential security threats or risks.

For a given machine-readable code 145 that is under analysis, the multi-context threat assessment system 160 may derive and/or analyze one or more of the following enterprise attributes 165E:

access control policy attributes of an enterprise system (e.g., which govern how access to resources, data, and functionalities within the enterprise is managed and enforced);

user authentication attributes of an enterprise system (e.g., which verify the identity of users accessing the enterprise system);

enterprise ACL (access control lists) attributes of an enterprise system (e.g., which may specify permissions or access rights associated with specific resources, such as files, directories, databases, or network resources);

RBAC (role-based access control) policy attributes of an enterprise system (e.g., which may define access controls based on users' roles within the organization); and/or ABAC (attribute-based access control) policy attributes of an enterprise system (e.g., which may define access controls based on various attributes of users, resources, and environmental conditions).

The multi-context threat assessment system 160 may assess these and/or other enterprise attributes 165E in assessing potential security threats or risks relating to machine-readable codes 145.

The decoded data attributes 165F can generally correspond to attributes that relate to the decoded data 155 derived from the machine-readable codes 145 (or the corresponding encoded data 146 from which the decoded data 155 is derived). Because the content of the decoded data 155 can vary significantly, the multi-context threat assessment system 160 can be configured to assess a wide variety of attributes in this category and the particular types of attributes that are assessed for a given machine-readable code 145 can depend on the types of content detected in the decoded data 155.

For a given machine-readable code 145 that is under analysis, the multi-context threat assessment system 160 may derive and/or analyze one or more of the following decoded data attributes 216:

- content classification attributes related to the decoded data 155 (e.g., indicating whether the decoded data includes any URLs, network addresses, email addresses, phone numbers, entity information, contact information, plain text or alphanumeric messages, etc.);
- sensitive data classification attributes related to the decoded data 155 (e.g., indicating each type of sensitive information, such as PII, HPI, etc., detected in the decoded data 155);
- executable code attributes related to the decoded data 155 (e.g., indicating whether the executable code was detected in the decoded data 155 and/or whether the code is detected or suspected as being malicious);
- compliance classification attributes related to the decoded data 155 (e.g., indicating whether decoded data 155 includes data or information that is subject to regulatory compliance frameworks, such as HIPPA, GDPR, etc.);
- network address attributes related to any network address identifiers 155A (e.g., URLs, network addresses, MAC addresses, web addresses, etc.) and/or email identifiers 155C identified in the decoded data 155 including:
  - address classification attributes indicating the type of each identified address (e.g., whether it is a URL, MAC address, etc.);
  - validity attributes for each identified address (e.g., indicating if the address is in a proper format that is compliant with an address specification and/or indicating if the address actually exists);
  - DNS (domain name service) attributes associated with any identified URLs or web addresses (e.g., which may consider the DNS and/or registrar information associated with certain types of addresses);
  - geographic attributes (e.g., which identify a location associated with each of the identified addresses and/ or which identify a risk-level associated with the location);
  - control list attributes associated with the each of the identified addresses (e.g., indicating whether each address is identified on any known blocklists, blacklists, whitelists, and/or other types of access control lists);
  - content classification attributes indicating the type of content located at or identified by the network address (e.g., whether it is a web page file, document file, application file, executable code file, etc.);
  - email parameter attributes (e.g., which may consider sender addresses, recipient addresses, domain names, email headers, email message content, and/or other parameters); and/or
  - entity attributes identifying any entities known to be affiliated with each of the network addresses;
- telecommunications attributes related to any telecommunications identifiers 155D (e.g., telephone numbers) identified in the decoded data 155 including:
  - authenticity attributes for each phone number (e.g., indicating if the phone number is in a proper format that is compliant with a telecommunications specification and/or indicating if the phone number actually exists);
  - control list attributes associated with each of the telephone numbers (e.g., indicating whether the phone numbers are identified on any known blocklists, blacklists, whitelists, and/or other types of access control lists); and/or
  - geographic attributes (e.g., which identify a location associated each of the telecommunications identifiers 155D and/or which identify a risk-level associated with the location); and/or
  - entity attributes identifying any entities known to be affiliated with each of the telecommunications identifiers 155D;
- physical address attributes corresponding to any physical address identifiers 155E identified in the content of the decoded data 155 (and/or indirectly based on correlations with email addresses, phone numbers, websites, or other content in the decoded data 155) including:
  - authenticity attributes for each physical address identifier 155E (e.g., indicating if the physical address is in a proper format and/or indicating if the physical address actually exists);
  - geographic attributes (e.g., which identify a location associated each of the physical address identifier 155E and/or which identify a risk-level associated with the location); and/or
  - entity attributes identifying any entities known to be affiliated with each of the telecommunications identifiers 155D;
- entity attributes corresponding to any entities (e.g., individuals, companies, organizations, governmental entities, etc.) directly identified in the content of the decoded data 155 and/or indirectly identified based on correlations with email addresses, phone numbers, websites, or other content in the decoded data 155 including:
  - entity attributes identifying any entities explicitly identified in the decoded data;
  - entity attributes identifying any entities known to be affiliated with each of the phone numbers included in the decoded data 155;
  - entity attributes identifying any entities known to be affiliated with each of the physical or postal address included in the decoded data 155;
  - entity attributes identifying any entities known to be affiliated with each of the email addresses included in the decoded data 155; and/or
  - entity attributes identifying any entities known to be affiliated with each of the target network resource 190 included in the decoded data 155;

The multi-context threat assessment system 160 may assess these and/or other decoded data attributes 165F in assessing potential security threats or risks relating to machine-readable codes 145.

The exemplary categories of risk assessment attributes 165 discussed above are intended to illustrate the comprehensive manner in which the multi-context threat assessment system 160 may analyze various contextual parameters to assess potential or actual security risks associated with the machine-readable codes 145. However, the risk assessment attributes 165 are not exhaustive, and the system may analyze additional attributes beyond those specified. Additionally, in some embodiments, the multi-context threat assessment system 160 may selectively analyze some attributes mentioned above while omitting others depending on the desired configuration of the multi-context threat assessment system 160 and/or based on the different types of content that are detected within the decoded data 155.

B. Exemplary Threat and Risk Analysis Functions

The multi-context threat assessment system 160 can store and execute various functions to identify, derive, and/or analyze the aforementioned risk assessment attributes 165 and/or other risk assessment attributes 165 described in this disclosure.

FIGS. 2B-2D are block diagrams illustrating exemplary functions that may be executed to identify and analyze the aforementioned risk assessment attributes 165 and/or other types of risk assessment attributes 165. FIG. 2B is a block diagram illustrating exemplary functions of an access and security management (ASM) engine 161 according to certain embodiments. FIG. 2C is a block diagram illustrating exemplary functions of a data analysis and integrity verification (DAIV) engine 162 according to certain embodiments. FIG. 2D is a block diagram illustrating exemplary functions of a threat detection and response (TDR) engine 163 according to certain embodiments.

The ASM engine 161, DAIV engine 263, and TDR engine 163 can each execute various functions associated with identifying and analyzing risk assessment attributes 165, and each engine (or each function associated with each engine) can generate evaluation data that is useful in assessing or quantifying threats or risks associated with the machine-readable codes 145. The outputs generated by the ASM engine 161, DAIV engine 263, and TDR engine 163 (or their corresponding functions) can be fed into the risk quantification engine 164, which analyzes or utilizes these outputs to generate risk quantification data 170 that reflects the risk-level or threat-level associated with the machine-readable codes 145, or which quantifies the risks or threats in other ways. In some embodiments, the risk quantification data 170 can be generated based on a collective or cumulative consideration of the various outputs received from the ASM engine 161, DAIV engine 263, and/or TDR engine 163.

The functions associated with ASM engine 161, DAIV engine 163, and TDR engine 163 can be leveraged for other purposes, in addition to assessing security threats and risks pertaining to machine-readable codes 145. For example, as explained in further detail below, the security application 150 can include an application programming interface (API) 158, which enables these functionalities of the ASM engine 161, DAIV engine 263, and TDR engine 163 (and any other functionalities of the security application 150) to be queried by third parties or external systems for various purposes. In some examples, an end-user can utilize a computing device 110 to submit a query via the API 158 to assess risks associated with the particular websites, files, email addresses, telephone numbers, physical addresses, etc. In other examples, an enterprise system or security framework associated with a company may submit queries via the API 158 requesting security risk assessments for machine-readable codes 145, websites, files, email addresses, telephone numbers, physical addresses, etc. In response to receiving these queries from end-users, enterprise systems, or other third-parties, the multi-context threat assessment system 160 may generate risk evaluation data 170 corresponding to the queries and return the risk evaluation data 170 via the API 158.

While FIGS. 2B-2D, along with the corresponding description, depict the functions of the ASM engine 161, DAIV engine 263, and TDR engine 163 as distinct components, this delineation is primarily for ease of understanding. In practice, the functionalities of these components can be combined or integrated in any manner, and there may be overlap where specific functions are shared or utilized across multiple components within the multi-context threat assessment system 160. Thus, any component or function described in FIGS. 2B-2D can be combined with any other component or function of the security application 150.

Exemplary ASM Engine Configurations

In general, the ASM engine 161 can be configured to perform various assessment functions related to managing access and security. In some embodiments, the ASM engine 161 may store and execute instructions for implementing access permission functions 210, access control policy functions 211, data privacy functions 212, encryption analysis functions 213, hardware signature assessment functions 214, image analysis functions 215, compliance rule formation functions 216, and/or vulnerability assessment functions 217.

In certain embodiments, the access permission functions 210 can be configured detect security threats and risks based on an analysis of access permissions related to entities. In certain embodiments, the access permission functions 210 can be configured to retrieve and analyze various types of access control lists (ACLs), such as blocklists, blacklists, whitelists, and/or similar data sources. The access permission function 210 can utilize this information to identify risky or malicious entities within digital environments, and execute comprehensive risk assessments and categorizations related to these entities.

In certain scenarios, the access permission function 210 may be utilized detect whether entities and/or target network resources 190 affiliated with machine-readable codes 145 are malicious or legitimate entities. For example, these functions may be executed to analyze entities and/or target network resources 190 explicitly identified in decoded data 155 derived from machine-readable codes 145 (e.g., using entity identifiers 155F or network address identifiers 155A extracted from the decoded data 155) to determine if they are listed on one or more access control lists. These functions also may be applied to entities and/or target network resources 190 that are indirectly identified as being affiliated with the machine-readable codes (e.g., indirectly identified by correlating the content of the decoded data, such as email identifiers, telecommunications identifiers, etc., or content included on target network resources 190 with external data sources).

The access permission functions 210 can execute algorithms to analyze access control lists and other relevant data sources that include information pertaining to user permissions and/or access privileges within digital environments. In these scenarios, the information may be utilized to identify entities with access permissions that may pose security risks or potential vulnerabilities. Additionally, in some embodiments, the access permission control functions 210 can conduct risk assessments of identified entities based on predefined criteria and risk factors. These risk assessments consider various factors, such as the sensitivity of data accessed by the entities, their access frequency, and their historical behavior patterns. By categorizing entities according to their risk profiles, these functions can provide the risk quantification engine 164 with valuable insights into the security implications of their access permissions.

In some examples, the access permission functions 210 may further identify entities having excessive access privileges, entities that engaged in unauthorized access attempts, and/or entities with suspicious behavior patterns (e.g., patterns indicative of potential insider threats). By flagging these entities as potentially risky, these functions can enable the risk quantification engine 164 to implement targeted security controls and access restrictions, as well as monitoring measures to effectively apply risk ratings to different potential security risks.

Moreover, the access permission functions 210 can assist in making informed decisions regarding the security status of identified entities. By categorizing entities as potentially risky or non-risky based on risk assessments, these functions can provide the risk quantification engine 164 with actionable intelligence to prioritize security measures and allocate resources effectively to address identified risks.

The integration of the access permission functions 210 into the security application 150 enhances the effectiveness of security measures by providing comprehensive risk assessments and categorizing entities with access permissions. Additionally, the access permission control function 210 enables the risk quantification engine 164 to proactively identify and apply risk ratings to potential security risks associated with access permissions within digital environments.

The access control policy functions 211 can be configured detect security threats and risks based on configurations of access control policies. In certain embodiments, the access control policy functions 211 can be configured to utilize various access control policies from data sources, such as attribute-based access control (ABAC) policy configurations and role-based access control (RBAC) policy configurations, and conduct risk assessments using algorithms to categorize access policies. In some scenarios, these ABAC and RBAC policies may be established as part of an enterprise system that is affiliated with a computing device 110 that inputs a machine-readable code and/or an end-user that operates the computing device 110.

The access control policy functions 211 can be configured to analyze access control policies derived from both ABAC configurations and RBAC configurations. These policies may govern the access privileges granted to end-users based on various attributes such as user roles, job responsibilities, organizational hierarchy, and other contextual factors.

Furthermore, the access control policy functions 211 can be configured to conduct thorough risk assessments of access control policies by evaluating factors such as the granularity of access permissions, the complexity of policy configurations, and the alignment with security best practices and regulatory requirements. Considering these and/or other factors, the access control policy functions 211 can categorize access policies based on security posture, thereby providing the risk quantification engine 164 with insights into potential security risks and vulnerabilities.

In some examples, the access control policy functions 211 may identify access control policies that grant overly excessive permissions or violate the principle of least privilege, flagging them as potentially risky due to the increased likelihood of unauthorized access or data breaches.

Moreover, the access control policy functions 211 can be configured to distinguish between potentially secure and risky access policies, providing the risk quantification engine 164 with actionable intelligence to inform decision-making processes. By categorizing access policies based on their security posture, the access control policy functions 211 enable the risk quantification engine 164 to implement targeted security controls, policy revisions, or access restrictions in order to apply risk ratings to different potential security risks effectively.

The integration of the access control policy functions 211 into the security application 150 enhances the effectiveness of security measures by providing comprehensive analysis and categorization of access control policies. Additionally, these functions enable the risk quantification engine 164 to proactively identify and apply risk ratings to different potential security risks associated with access control policies.

The data privacy functions 212 can be configured to detect security threats and risks by assessing compliance with one or more data compliance frameworks. In some examples, the data privacy functions 212 can be configured to analyze whether target network resources 190 and/or entities affiliated with target network resources 190 are in compliance with, or adhere to, global data protection regulations including, but not limited to, GDPR (General Data Protection Regulation) and CCPA (California Consumer Privacy Act). The analyses performed by the data privacy functions 212 provide risk-based assessments that inform decisions to safeguard user privacy and ensure compliance with regulatory requirements.

The data privacy functions 212 can execute algorithms to evaluate data privacy practices within digital environments. For example, these functions may be configured to examine various aspects of data handling, including data collection, processing, storage, and/or sharing, to assess compliance with global data protection regulations and industry best practices.

Furthermore, the data privacy functions 212 can provide risk-based assessments of data privacy practices, considering factors such as data sensitivity, the volume of data collected, the purposes for which data is processed, and the mechanisms for data protection and user consent. These functions are able to identify potential privacy risks and vulnerabilities by conducting comprehensive assessments, thereby providing the risk quantification engine 164 with insights to prioritize mitigation efforts effectively.

In some examples, the data privacy functions 212 may identify data privacy practices on target network resources 190 that collect sensitive personal information without appropriate consent mechanisms or fail to implement adequate data protection measures, flagging them as potential high-risk sites for various potential privacy breaches.

Moreover, the data privacy functions 212 can inform decisions to safeguard user privacy by providing actionable insights and recommendations. By categorizing data privacy practices based on risk levels and compliance status, the data privacy functions 212 enable the risk quantification engine 164 to implement targeted remediation measures, update privacy policies, and enhance data protection mechanisms to ensure compliance with global data protection regulations.

The integration of the data privacy functions 212 into the security application 150 can enhance the effectiveness of privacy measures by providing comprehensive assessments and risk-based insights into data privacy practices. Using its algorithms and analytical capabilities, these functions enable the risk quantification engine 164 to safeguard the privacy of end-users, apply risk ratings to different privacy risks, and ensure effective compliance with global data protection regulations.

The encryption analysis functions 213 can be configured to detect security threats and risks by analyzing and classifying encryption techniques. Amongst other things, the encryption analysis functions 213 can execute algorithms to analyze encryption configurations utilized in data transmissions (e.g., such data transmissions by websites and other target network resources 190), categorizing them into risk categories to indicate the security level of data communication. Furthermore, the encryption analysis functions 213 can be configured to differentiate between risky and secure encryption techniques, enabling informed decision-making regarding data communication security.

The encryption analysis functions 213 can execute algorithms to assess encryption configurations in various data stages (e.g., data at rest, data in transit, data in motion, data in use, and/or any other encryption stage). Additionally, these functions can evaluate various aspects of encryption methodologies, including encryption algorithms, key management practices, encryption key lengths, and/or cryptographic protocols that may be employed.

In certain embodiments, the encryption analysis functions 213 can categorize encryption techniques into risk categories based on predefined or dynamic criteria, considering factors such as encryption strength, attack vulnerability, compliance with industry standards, and alignment with cryptographic best practices. These functions can provide the risk quantification engine 164 with insights into the security implications of encryption practices utilized by the target network resources 190.

For example, the encryption analysis functions 213 may classify encryption techniques utilizing weak encryption algorithms or outdated cryptographic protocols as risky, indicating a higher likelihood of data exposure or unauthorized access. Conversely, encryption techniques employing strong encryption algorithms and robust key management practices may be classified as secure, indicating a lower risk of data compromise.

The encryption analysis functions 213 enable informed decision-making on data communication security by differentiating between risky and secure encryption practices. By categorizing encryption techniques based on their security level, these functions enable the risk quantification engine 164 to effectively implement appropriate measures and to apply risk ratings to potential security risks.

The integration of the encryption analysis functions 213 into the security application 150 enhances data communication security effectiveness by providing comprehensive analyses and categorizations of encryption techniques. Additionally, these functions can enable the risk quantification engine 164 to proactively make informed decisions regarding encryption practices and apply risk ratings to potential security risks associated with data transmissions.

The hardware signature assessment functions 214 can be configured detect security threats and risks by identify and analyzing hardware signatures of various devices, such as devices that host or store target network resources 180 and/or computing devices 110 or servers 120 associated with end-users or external systems that communication with the security application 150. In some examples, these hardware signature assessment functions 214 can execute algorithms to identify and analyze hardware signatures and unique identifiers associated with various hardware devices, and categorize devices based on their characteristics to assess risk levels effectively.

The hardware signature assessment functions 214 can execute algorithms to extract and analyze hardware signatures from various device types, including computers, mobile devices, Internet of Things (IoT) devices, and/or networking equipment. These hardware signatures can include attributes, such as device identifiers, manufacturer details, firmware versions, and hardware configurations.

Additionally, the hardware signature assessment functions 214 can categorize devices based on their hardware signatures to accurately assess their risk levels. By considering factors such as known vulnerabilities, outdated firmware versions, or suspicious hardware configurations, the hardware signature assessment functions 214 can provide the risk quantification engine 164 with valuable insights into the security implications of hardware assets associated with machine-readable codes 145.

For example, the hardware signature assessment functions 214 may identify devices with outdated firmware versions or unauthorized modifications to hardware configurations, flagging them as potentially risky due to the increased likelihood of security vulnerabilities or compromised integrity.

Moreover, the hardware signature assessment functions 214 can distinguish between trusted and potentially risky hardware devices, providing the risk quantification engine 164 with actionable intelligence to inform decision-making processes. By categorizing devices based on risk levels, these functions can enable the risk quantification engine 164 to implement targeted security controls, access restrictions, or monitoring measures to effectively apply risk ratings to different potential security risks.

The integration of the hardware signature assessment functions 214 into the security application 150 enhances the effectiveness of security measures by providing comprehensive analysis and categorization of hardware devices based on their unique signatures. Additionally, these functions can enable the risk quantification engine 164 to proactively identify and apply risk ratings to potential security risks associated with hardware assets.

The image analysis functions 215 can be configured to detect security threats and risks based on an analysis of image data, video data and/or other types of visual content. In certain embodiments, these functions may be utilized to analyze image and/or video content associated with target network resources 190, embedded within machine-readable codes 145, and/or other content sources affiliated with the machine-readable codes 145. In certain embodiments, the image analysis functions 215 can be designed to assess image and video data feeds to assist the risk quantification engine 164 with generating risk ratings for these sources.

Additionally, in some embodiments, these image analysis functions 215 can be configured to categorize these content sources based on security and compliance standards, facilitating informed decision-making regarding the usage and management of imaging devices. The image analysis functions 215 can execute algorithms to process and analyze image and/or video data feeds captured by camera devices 115 and other imaging sources deployed within digital environments. These imaging devices may include surveillance cameras, Internet of Things (IoT) cameras, video conferencing systems, and other imaging equipment.

For example, the image analysis functions 215 may categorize target network resources 190 with image and video data based on their adherence to privacy regulations such as GDPR (General Data Protection Regulation) or HIPAA (Health Insurance Portability and Accountability Act). Target network resources 190 that are detected as capturing or transmitting personally identifiable information (PII) and/or other sensitive information without proper encryption or consent may be flagged as potentially risky, prompting additional security measures or compliance checks.

The image analysis functions 215 support decision-making processes by distinguishing between risky and non-risky elements within image and video data feeds. Additionally, these functions provide the risk quantification engine 164 with actionable intelligence to ensure data security and regulatory compliance by categorizing entities based on security and compliance standards.

The integration of the image analysis functions 215 into the security application 150 can enhance the effectiveness of security measures by providing comprehensive analysis and categorization of content within image and video data feeds. Additionally, these functions may enable the risk quantification engine 164 to make informed decisions regarding the usage and management of imaging devices, applying risk ratings to different potential security risks and ensuring compliance with regulatory requirements effectively.

As explained in further detail below, the security learning network 130 of the security application 150 may include one or more computer vision systems (e.g., such computer vision system 137 in FIG. 2E) that can be utilized to perform some or all of the image analysis functions 215.

The compliance rule formation functions 216 can be configured to formulate and enforce rules based on regulatory and compliance frameworks. The compliance rule formation functions 216 can be configured to analyze regulatory and operational data to formulate rules for effectively assessing compliance risks. In certain embodiments, these rules can be applied to categorize target network resources 190 and/or decoded data 155 as being compliant or non-compliant with one or more compliance frameworks.

The compliance rule formation functions 216 can execute algorithms to analyze regulatory requirements and operational data within digital environments. These functions may examine various regulatory standards, industry guidelines, and organizational policies to identify relevant rules and requirements that govern operational activities. For example, these functions may formulate rules that specify the acceptable use of personal data in accordance with GDPR requirements and/or define access control policies to comply with industry-specific regulations such as HIPAA, PCI-DSS (Payment Card Industry Data Security Standard), and/or other regulatory frameworks (including any other frameworks mentioned in this disclosure).

The compliance rule formation functions 216 can enable the risk quantification engine 164 to make informed decisions by categorizing target network resources 190, decoded data 155, and/or other data sources as being compliant or non-compliant based on their alignment with regulatory standards and operational best practices. Furthermore, these functions can enable the risk quantification engine 164 to implement targeted measures to address non-compliant activities and apply risk ratings to different potential regulatory penalties or operational risks by providing actionable insights into compliance risks.

The integration of the compliance rule formation functions 216 into the security application 150 can enhance the effectiveness of compliance management by providing comprehensive rule formulation and risk assessment capabilities. Additionally, these functions can enable decisions by the risk quantification engine 164 to align with regulatory standards, adhere to operational best practices, and effectively apply risk ratings to different compliance risks.

The vulnerability assessment functions 217 can be configured to detect security threats and risks by analyzing vulnerabilities of various sources. In certain embodiments, the vulnerability assessment functions 217 can be configured to analyze data feeds that provide vulnerability information and/or which identify sources affected by known vulnerabilities. In some embodiments, the vulnerability assessment functions 217 can be executed to detect vulnerabilities of target network resources 190 affiliated with machine-readable codes 145 and/or computing devices 110 or servers 120 associated with end-users or external systems that access the security application 150. These functions can facilitate decision-making by categorizing these entities as potentially risky or non-risky (or susceptible or insusceptible to risk), which may enable the risk quantification engine 164 to prioritize remediation efforts in some cases.

The vulnerability assessment functions 217 can execute algorithms to process and analyze data feeds containing information about known vulnerabilities affecting digital environments. These functions can leverage vulnerability databases, threat intelligence feeds, and/or other data sources to identify entities such as software applications, network devices, and system components susceptible to exploitation due to known vulnerabilities.

Furthermore, the vulnerability assessment functions 217 can conduct risk assessments of identified entities affected by known vulnerabilities, considering attributes such as the severity of vulnerabilities, the potential impact on business operations, and/or the likelihood of exploitation by malicious actors. In this manner, the vulnerability assessment functions 217 may categorize these entities as potentially risky or non-risky based on predefined and/or dynamic risk thresholds and criteria.

In some examples, the vulnerability assessment functions 217 may identify software applications running outdated versions with known vulnerabilities and/or network devices with unpatched firmware susceptible to exploitation. Entities categorized as potentially risky indicate a higher likelihood of exploitation and may pose a significant security risk.

Moreover, the vulnerability assessment functions 217 can support decision-making processes by providing actionable insights into identified vulnerabilities and affected entities. By categorizing entities based on risk levels, these functions enable the risk quantification engine 164 to prioritize risk findings, allocate resources effectively, and/or implement targeted security controls to apply risk ratings to potential security risks.

The integration of the vulnerability assessment functions 217 into the security application 150 enhances vulnerability management effectiveness by providing analyses and categorizations of entities affected by known vulnerabilities. Additionally, these functions can enable the risk quantification engine 164 to proactively make informed decisions regarding vulnerability remediation and apply risk ratings to different potential security risks through its algorithms and risk assessment capabilities.

Exemplary DAIV Engine Configurations

In general, the DAIV engine 162 can be configured to perform various functions related to analyzing data and verifying the integrity of data. In some embodiments, the DAIV engine 162 may store and execute instructions for implementing data storage analysis functions 220, cloud analysis functions 221, compromise analysis functions 222, hashing analysis functions 223, integrity verification functions 224, content categorization functions 225, domain analysis functions 226, email analysis functions 227, geographic analysis functions 228, HTTP analysis functions 229, symbology analysis functions 230, network address analysis functions 231, telecommunications analysis functions 232, sensor data analysis functions 233, and/or user behavior analysis functions 234.

The data storage analysis functions 220 can be configured to detect security threats and risks by assessing data storage practices and configurations. In certain embodiments, the data storage analysis functions 220 apply data classification methodologies to categorize stored data based on its sensitivity and/or compliance requirements. In some scenarios, these data storage analysis functions 220 can be executed on the decoded data 155 and target network resources 190 to identify security threats and risks.

The data storage analysis functions 220 can execute data classification methodologies to evaluate stored data within various digital environments. By considering factors such as the nature of the data, its sensitivity, and the regulatory constraints governing its storage, these functions can categorize data into different classes or levels based on its importance and the corresponding security measures that are applicable.

In some examples, the data storage analysis functions 220 can be configured to identify and categorize data that includes personally identifiable information (PII), financial records, health information, and/or other sensitive information, flagging it as high priority for enhanced security measures and compliance adherence. Conversely, less sensitive data may be categorized with lower security requirements, allowing the risk quantification engine 164 to optimize resource allocation and prioritize its security efforts effectively.

Furthermore, the classification results can provide the risk quantification engine 164 with a clear understanding of the distribution of sensitive and compliance-sensitive information across the storage infrastructure of analyzed sources, which can enable the risk quantification engine 164 to make informed decisions regarding implementing targeted security controls, access restrictions, and encryption measures tailored to the specific requirements of each data classification.

Moreover, the data storage analysis functions 220 can assist in establishing and enforcing data storage policies by providing insights into data distribution across different storage systems and repositories. By aligning data storage practices with compliance requirements and policies, the data storage analysis functions 220 aids in creating a robust and effective data management strategy.

The integration of the data storage analysis functions 220 into the security application 150 enhances the effectiveness of security measures by providing detailed insights and classification results related to stored data. Additionally, the data storage analysis functions 220 enable the risk quantification engine 164 to make informed decisions regarding data storage policies, ensuring adherence to compliance requirements and applying risk ratings to different potential security risks effectively.

The cloud analysis functions 221 can be configured to identify security threats or risks based on analyses of cloud service usage and configurations. In some scenarios, the cloud analysis functions 221 can be executed to analyze cloud attributes of target network resources 190 affiliated with the machine-readable codes 145 and/or computing devices 110 or servers 120 of end-users or external systems that access the security application. Amongst other things, the cloud analysis functions 221 can execute algorithms to identify potential misconfigurations of cloud environments and evaluate their associated risk levels, thereby providing valuable insights into the security posture of cloud deployments.

The cloud analysis functions 221 can be configured to systematically scrutinize various aspects of cloud service usage and configurations using stored algorithms and methods. In some examples, the cloud analysis functions 221 can identify misconfigurations, which may include improperly configured access controls, insecure storage settings, and/or inadequately protected data repositories. These misconfigurations pose significant security risks, potentially exposing sensitive data to unauthorized access, data breaches, or other malicious activities. Upon identifying misconfigurations, these functions can categorize cloud environments based on their risk implications, providing the risk quantification engine 164 with additional intelligence to enhance the overall risk ratings.

The compromise analysis functions 222 can be configured to assess security threats or risks based on an analysis of actual or potential compromises. In some embodiments, the compromise analysis functions 222 can be configured to analyze data feeds or databases that identify compromised, or potentially compromised, platforms, websites, and/or devices. In some examples, the compromise analysis functions 222 can be configured to detect whether target network resources 190 and/or computing devices 110 or servers used by end-users or external systems have been compromised. These functions can execute algorithms to categorize data into insights related to security threats, thereby providing the risk quantification engine 164 with additional intelligence to enhance the overall risk ratings.

The hashing analysis functions 223 can be configured to detect and assess security threats or risks based on an analysis of file hashes (e.g., which may be stored or utilized by target network resources 190 and/or computing devices 110 or servers 120 associated with end-users or external systems that access the security application 150). The hashing analysis functions 223 can identify and categorize file hashes according to risk levels, and may further utilize algorithms to detect anomalies and potential security threats. It enables decision-making by assessing the integrity of files based on their hashing strategy, highlighting those with risky or suspicious characteristics.

The integrity verification functions 224 can be configured detect and assess security threats or risks based by analyzing the integrity and/or authenticity of data (e.g., such as data corresponding to one or more target network resources 190, encoded data 146 embedded into machine-readable codes 145, and/or data corresponding to computing devices 110 or servers 120 associated with end-users or external systems that access the security application). In certain embodiments, the integrity verification functions 224 safeguard the integrity and authenticity of data by conducting rigorous data integrity checks using cryptographic hash functions. These cryptographic hash functions generate unique digital signatures, known as hashes, for each piece of data, providing a secure and tamper-evident means of verifying the data's unaltered state.

The integrity verification functions 224 can systematically compare these generated hashes against known secure baselines, which serve as trusted reference points representing the original, unmodified versions of the data. By analyzing the cryptographic hashes, these functions can effectively detect discrepancies or unauthorized alterations to the data that could lead to a breach or unauthorized access attempts.

Cryptographic hash functions can be applied to ensure overall data integrity, making it virtually impossible for malicious actors to tamper with the data without detection. This cryptographic assurance of data integrity gives users confidence in the reliability and trustworthiness of their digital assets, particularly in critical environments where data accuracy and authenticity are paramount.

The content categorization functions 225 can be configured to detect or assess security threats or risks based on classifications or categorizes applied to data (e.g., such as decoded data 155 and/or data associated with target network resources 190). In certain embodiments, the content categorization functions 225 can execute algorithms for performing detailed categorization and analysis of digital content, encompassing a broad spectrum of topics such as copyright compliance, malware detection, and sensitive information identification.

Furthermore, the content categorization functions 225 can assign risk grades to content based on predefined criteria, enabling precise decision-making regarding the handling and management of digital content. By categorizing content according to its associated risks, these functions highlight potential threats and advise on appropriate avoidance measures, thereby aiding the risk quantification engine 164 in effectively applying risk ratings to different security risks.

Moreover, the content categorization functions 225 can assist in identifying sensitive information identification by analyzing digital content for the presence of personally identifiable information (PII), financial data, health information, and/or other types of confidential information. By accurately identifying sensitive content, the content categorization functions 225 assists the risk quantification engine 164 with enforcing data protection policies and ensuring compliance with regulatory requirements, thereby mitigating the risk of data breaches and unauthorized access.

The integration of the content categorization functions 225 into the security application 150 enhances the effectiveness of security measures by providing detailed insights and risk assessments of digital content. Additionally, these functions can enable the risk quantification engine 164 to make informed content management decisions and effectively apply risk ratings to different security risks.

The domain analysis functions 226 can be configured to detect security threats or risks based on an analysis of domain names. In some examples, the domain analysis functions 226 can be executed on domain names associated with target network resources 190, as well as any network address identifiers 155a and email identifiers 155C embedded into machine-readable codes 145). The domain analysis functions 226 can execute algorithms to conduct detailed analysis and categorization of DNS information, thereby identifying potential security threats within digital environments.

In certain embodiments, the domain analysis functions 226 can execute algorithms to analyze and categorize various types of DNS information, considering attributes such as domain reputation, IP addresses, query types, and other relevant data points. Additionally, these functions can categorize DNS activities based on criteria that can be either predefined or dynamically determined, facilitating the decision-making processes by distinguishing between normal and potentially suspicious DNS behaviors. By categorizing DNS activities according to their attributes, such as domain reputation and query patterns, the domain analysis functions 226 provide valuable insights into the nature and characteristics of DNS activities, enabling the risk quantification engine 164 to take appropriate actions to apply risk ratings to different potential security risks.

Moreover, the domain analysis functions 226 can assist in identifying legitimate DNS activities, thereby ensuring the smooth operation of communication networks and compliance with regulatory requirements. By accurately categorizing DNS activities, these functions can aid the risk quantification engine 164 with maintaining transparency and integrity in its DNS infrastructure, thereby mitigating the risk of unauthorized access and data breaches.

The integration of the domain analysis functions 226 enhances the effectiveness of the security application 150 by providing detailed insights and threat assessments of DNS activities. Additionally, these functions enable the risk quantification engine 164 to effectively make decisions regarding DNS security and apply risk ratings to potential security risks.

The email analysis functions 227 can be configured to assess and detect threats or risks based on analysis of email addresses (e.g., such as email addresses included in decoded data 155 and/or included in content associated with target network resources 190). The email analysis functions 227 can be configured to process and categorize email identifiers, adding additional intelligence to the risk quantification engine 164 of potential security risks associated with email communications. These functions can provide valuable insights into email-based threats through detailed analysis and categorization of email data, further enhancing the overall security posture of security application 150.

The email analysis functions 227 can execute algorithms to analyze various components of email identifiers 155C, including sender addresses, recipient addresses, domain names, and email headers. Additionally, these functions can categorize email identifiers 155C based on predefined or dynamic criteria by systematically processing email data and facilitating decision-making processes by distinguishing between legitimate and potentially malicious email communications.

Furthermore, the email analysis functions 227 can be configured to provide risk grading upon detecting email-based threats or risks, enabling the risk quantification engine 164 to assess the severity of potential security risks associated with email communications. By conducting detailed analysis and categorization of email data, the email analysis functions 227 can identify indicators of compromise, suspicious patterns, malicious behaviors, and/or other potential security threats, thereby enabling the risk quantification engine 164 to take proactive measures to apply risk ratings to different email-related risks effectively.

In some examples, the email analysis functions 227 can identify email identifiers associated with known phishing campaigns, malicious domains, and/or suspicious sender addresses indicative of fraudulent activities. By flagging suspicious email communications in real-time, these functions assist the risk quantification engine 164 with assigning a risk rating and preventing phishing attacks, malware distribution, and other email-based threats that may compromise the security of digital environments.

Along similar lines, the email analysis functions 227 can identify legitimate email communications, ensuring the smooth operation of email systems and compliance with regulatory requirements. By accurately categorizing email identifiers, these functions assist the risk quantification engine 164 with maintaining transparency and integrity in email communications, thereby applying risk ratings to the risk of unauthorized access and data breaches.

The integration of the email analysis functions 227 into the security application 150 can enhance the effectiveness of security measures by providing detailed insights and risk assessments of email communications. Using its algorithms and analysis capabilities, these functions enable the risk quantification engine 164 to effectively make informed decisions regarding email security and apply risk ratings to different potential security risks.

The geographic analysis functions 228 can be configured to assess and detect threats or risks based on analysis of geographic location information. In certain embodiments, the geographic analysis functions 228 can identify, detect, and/or analyze geographic locations associated with content included in decoded data 155, geographic locations associated with target network resources 190, geographic locations of entities detected as being affiliated with machine-readable codes 14, and/or geographic locations of end-users (or computing devices 110 operated by end-users. In certain embodiments, this geographic data can be analyzed and used to categorize each of the analyzed entities into risk profiles based on various factors, including security risks, regulatory compliance, and/or operational considerations associated with their geographic locations.

The geographic analysis functions 228 can execute algorithms to analyze geographic data and categorize entities based on location. By considering factors such as geopolitical risks, regulatory environments, and data protection laws applicable to specific regions, the geographic analysis functions 228 provides the risk quantification engine 164 with valuable insights into the security and compliance implications associated with storing client data in different geographic locations.

For example, the geographic analysis functions 228 may be applied to identify entities located in regions with less stringent data protection regulations or heightened geopolitical risks, flagging them as high-risk entities requiring additional security measures or regulatory compliance considerations. Conversely, entities located in regions with favorable regulatory environments and/or low-security concerns may be categorized as low-risk entities.

In some embodiments, the geographic analysis functions 228 can assist the risk quantification engine 164 in evaluating operational considerations for storing client data in specific geographic locations. By considering factors such as data accessibility, network latency, and infrastructure reliability, the geographic analysis functions 228 provide insights into the operational challenges and opportunities associated with different regions, enabling risk quantification engine 164 to optimize data storage and management strategies.

The integration of the geographic analysis functions 228 into the security application 150 enhances the effectiveness of security measures by providing detailed insights and risk assessments related to the geographic locations of entities and/or storage of client data. Additionally, these geographic analysis functions 228 enable the risk quantification engine 164 to make informed decisions regarding the management of entities across different regions, thereby applying risk ratings to different potential security risks and ensuring regulatory compliance effectively.

In some examples, the geographic analysis functions 228 also can be configured to assess and detect threats or risks based on analysis of email addresses (e.g., such as email addresses included decoded content 155 and/or included in content associated with target network resources 190).

The HTTP analysis functions 229 can be configured to assess and detect threats or risks based on analysis of HTTP data including, but not limited to, HTTP metadata associated with HTTP requests. In some scenarios, the HTTP analysis functions 229 can be applied to websites, cloud environments, and/or other target network resources 190 associated with the machine-readable codes 145.

In certain embodiments, the HTTP analysis functions 229 can be configured to thoroughly examine cloud service usage and configurations, employing algorithms to analyze metadata associated with HTTP requests. Additionally, the HTTP analysis functions 229 may execute algorithms to categorize entities based on various metadata attributes in HTTP requests. These attributes may include the request's origin, its destination, the type of content being transmitted, and other relevant contextual information. The HTTP analysis functions 229 can be utilized to generate comprehensive risk profiles for entities within the cloud environment by systematically analyzing these attributes using the risk quantification engine 164. By scrutinizing this metadata, these functions can identify and evaluate potential risks inherent in cloud environments. The evaluation information generated by the HTTP analysis functions 229 can provide the risk quantification engine 164 with additional intelligence to enhance the overall risk ratings. Additionally, it can facilitate proactive risk management by categorizing entities based on their associated risk profiles.

The symbology analysis functions 230 can be configured to detect, identify, classify, and/or interpret various types of inputs, including various types of machine-readable codes 145 (e.g., QR codes, bar codes, data matrix codes, dot codes, etc.). The symbology analysis functions 230 be configured read and/or interpret any type of machine-readable code 145 mentioned in this disclosure, as well as other types of optical codes and inputs not specifically mentioned. These functions can enable various machine-readable codes 145 and/or other data inputs to be seamlessly integrated into the risk evaluation framework of the security application 150, thereby enhancing the efficiency and effectiveness of cybersecurity measures.

The symbology analysis functions 230 can execute various algorithms to analyze and interpret different encoded symbologies, enabling accurate and reliable processing across various formats. By categorizing and processing diverse symbologies, the symbology analysis functions 230 enhances the risk rating abilities of the security application 150 and/or the risk quantification engine 164.

Additionally, in some embodiments, the symbology analysis functions 230 can incorporate data against known cybersecurity, privacy, and security risk frameworks, including but not limited to NIST and ISO standards, to make informed decisions regarding data interpretation and processing. By aligning with established frameworks and standards, the symbology analysis functions 230 may ensure compliance with industry best practices and regulatory requirements, enhancing the security and integrity of data processing operations.

As explained in further detail below, the security learning network 130 of the security application may include one or more computer vision systems that can be configured to perform the symbology analysis functions 230 described herein.

The network address analysis functions 231 can be configured to assess and detect threats or risks based on analysis of network addresses (e.g., such as network addresses included decoded content 155 and/or associated with target network resources 190). The network address analysis functions 231 can be configured to analyze various types of network addresses including, but not limited to, MAC addresses, web addresses, URLs, etc. In certain embodiments, the network address analysis functions 231 can execute algorithms to identify and categorize network addresses, or entities associated with network addresses, based on their attributes and associated risks.

In some examples, these algorithms can scrutinize and classify network addresses into distinct risk categories, such as by assigning trusted, suspicious, or malicious classification labels, based on various attributes and behavioral patterns associated with the network addresses and/or entities affiliated with the network addresses. By categorizing network addresses according to their risk profiles, the network address analysis functions 231 are able to provide valuable intelligence to the risk quantification engine 164.

The telecommunications analysis function 232 can be configured to assess and detect threats or risks based on analysis of telecommunications identifiers. In certain embodiments, the telecommunications analysis function 232 can be configured to detect and analyze telecommunications identifiers included in decoded content 155 and/or included in content associated with target network resources 190.

The telecommunications identifiers can include phone numbers. Additionally, or alternatively, the telecommunications identifiers can include IMSI (international mobile subscriber identity) information, IMEI (international mobile equipment identity) information, MAC (media access control) addresses, SIM (subscriber entity module) information, ESN (electronic serial number) information, and/or other identifiers and information associated with telecommunications devices or communications.

In some examples, these functions can execute algorithms to evaluate phone numbers, their corresponding country origins, and similar data points, enabling a comprehensive analysis of telecommunication identifiers. The telecommunications analysis function 232 facilitate accurate categorization and assessment of telecommunication identifiers, thereby enhancing the overall security posture of digital environments.

The telecommunications analysis function 232 can execute algorithms to conduct detailed evaluations of telecommunication identifiers, considering various attributes such as country codes, number formats, and other relevant data points. The telecommunications analysis function 232 enable the risk quantification engine 164 to gain insights into the legitimacy and potential security implications of telecommunication identifiers within environments.

Furthermore, the telecommunications analysis function 232 can be designed to classify telecommunications identifiers utilizing the risk quantification engine 164, which can incorporate predefined (static) and dynamic attributes. This framework enables the enhancement of decision-making methodologies by effectively differentiating between legitimate attributes and potentially suspicious identifiers. While the classification system may utilize static and/or dynamic attributes in certain embodiments, it is not limited to these criteria alone, thereby allowing for the integration of additional parameters that may further refine the accuracy and efficacy of the classification process.

In some examples, the telecommunications analysis function 232 can be configured to identify telecommunication identifiers associated with known scam or fraud operations by analyzing attributes such as country codes and number formats commonly used in fraudulent activities. By flagging suspicious identifiers, these functions assist the risk quantification engine 164 in detecting and preventing fraudulent activities, thereby safeguarding against potential financial losses and reputational damage.

Along similar lines, the telecommunications analysis function 232 can assist in identifying telecommunication identifiers with legitimate origins, enabling compliance with regulatory requirements and industry standards. By accurately categorizing identifiers, these functions add intelligence to the risk quantification engine 164 for a more enhanced risk rating by identifying unauthorized access and fraudulent activities.

The integration of the telecommunications analysis function 232 into the security application 150 enhances the effectiveness of security measures by providing detailed insights and risk assessments of telecommunication identifiers. Through its algorithms and analysis capabilities, the telecommunications analysis function 232 enables the risk quantification engine 164 to effectively make informed decisions regarding telecommunication security and apply risk ratings to different potential security risks.

The sensor data analysis functions 233 can be configured to assess and detect threats or risks based on analysis of data derived from, or generated by, sensors. In some examples, these functions can be executed on data generated by sensors 111 (e.g., GPS sensors) included on computing devices 110 operated by end-users. In other examples, the functions can be executed on sensor data obtained from external systems, such as sensor data obtained from one or more IoT devices utilized by the external systems. In further examples, the sensor data analysis functions 233 can be executed on sensor data obtained from webpages and/or other target network resources 190.

The sensor data analysis functions 233 can execute algorithms to analyze data collected from sensors, facilitating an examination of various parameters, including environmental conditions, movement patterns, and system health. The sensor data analysis functions 233 can generate analytical results and metrics by applying various analysis techniques to the sensor data, which can enable end-users to make informed decisions and derive actionable insights from sensor data to optimize operations and enhance situational awareness.

In some scenarios, the sensor data analysis functions 233 can analyze data collected from various sensors deployed across digital environments. These sensors may include environmental sensors monitoring temperature, humidity, and air quality, motion sensors detecting movement patterns, and system health sensors monitoring the performance of critical infrastructure components. This sensor data can be processed to produce analytical results and metrics that provide insights into various parameters measured by the sensors. These analytical results may include trends, patterns, anomalies, and/or correlations identified from sensor data, enabling end-users to understand better the operating conditions and performance metrics of their digital environments.

In some examples, the sensor data analysis functions 233 may analyze GPS sensor outputs on computing devices 110 to detect whether end-users are located in high-risk geographic regions. In other examples, the sensor data analysis functions 233 may analyze data from environmental sensors to detect anomalies in temperature or humidity levels, indicating potential environmental hazards or equipment malfunctions. Similarly, analysis of motion sensor data may reveal unusual movement patterns, potentially signaling security breaches or unauthorized access attempts.

The sensor data analysis functions 233 supports decision-making processes by providing actionable insights derived from sensor data. These insights enable users to optimize operations, enhance resource allocation, and improve situational awareness by identifying trends, predicting potential issues, and recommending proactive measures to address emerging challenges.

The integration of the sensor data analysis functions 233 into the security application 150 enhances the effectiveness of security measures by providing comprehensive insights and actionable intelligence derived from sensor data. Additionally, the sensor data analysis functions 233 algorithms and analytical capabilities can enable end-users to optimize operations, apply risk ratings to different security concerns, and enhance situational awareness within digital environments.

The user behavior analysis functions 234 can be configured to assess and detect threats or risks based on analysis of behaviors corresponding to end-users and/or computing devices 110 operated by those end-users. In certain embodiments, the user behavior analysis functions 234 can execute algorithms to conduct a detailed analysis of user behavior patterns, considering various factors such as frequency, duration, and deviation from norms. These functions enable the risk quantification engine 164 to categorize user behavior and gain valuable insights into their actions, and facilitate informed decision-making processes to identify normal behavior and potential anomalies or risks.

The user behavior analysis functions 234 employs algorithms to analyze user behavior patterns across digital environments, including interactions with applications, data access patterns, login activities, and other relevant user actions. By systematically analyzing user behavior, the user behavior analysis functions 234 provides the risk quantification engine 164 with insights into the typical behavior patterns of end-users within their environments.

In certain embodiments, the user behavior analysis functions 234 assists in identifying normal user behavior, enabling risk quantification engine 164 to establish baseline behavior profiles for different end-users (or user roles associated with the end-users) and access levels. By understanding and categorizing user behaviors, these functions assist the risk quantification engine 164 with detecting anomalies and deviations from established norms, facilitating proactive risk management and ensuring the integrity and security of digital environments.

The integration of the user behavior analysis functions 234 into the security application 150 enhances the effectiveness of security measures by providing detailed insights and threat assessments of user behavior patterns. Additionally, the user behavior analysis functions 234 enable the risk quantification engine 164 to make informed decisions regarding user security and effectively apply risk ratings to different potential security risks.

Exemplary TDR Engine Configurations

The threat detection and response (TDR) engine 163 can generally be configured to detect security threats or risks and to execute functions for mitigating those threats or risks. In certain embodiments, the TDR engine 163 can execute anomaly detection functions 240, decision-making functions 241, input aggregation functions 242, incident response and forensics analysis functions 243, interaction analysis functions 244, risk assessment and definition functions 245, relationship and supply chain analysis functions 246, and/or intelligence collection functions 247.

The anomaly detection functions 240 can be configured to assess and detect threats or risks based on an analysis of end-user behavior patterns and/or usage patterns associated with computing devices 110 operated by the end-users. The anomaly detection functions 240 can execute algorithms for anomaly detection and behavioral analysis, enabling the identification of abnormal activities and user behavior patterns within digital environments. Based on an analysis of user behaviors, these functions can categorize behavior based on various metrics and deviations from established norms, facilitating decision-making by effectively distinguishing between normal and potentially risky activities.

In some embodiments, the anomaly detection functions 240 can systematically examine various metrics, including login times, access frequencies, data transfer volumes, and application usage patterns, to establish baseline behavior profiles for different users and entities. Additionally, these functions can categorize user behavior based on deviations from established norms and predefined thresholds. By considering factors such as the frequency, duration, and magnitude of deviations, they provide the risk quantification engine 164 with insights into the nature and characteristics of user activities, facilitating decision-making by distinguishing between normal and potentially risky behavior.

In some examples, the anomaly detection functions 240 may identify anomalies such as unusual login times, access attempts from unfamiliar locations, or excessive data transfer volumes indicative of potential security breaches or insider threats. By categorizing these anomalies as potentially risky, these functions enable the risk quantification engine 164 to prioritize response measures and implement targeted security controls to effectively apply risk ratings to different potential risks.

Moreover, in certain embodiments, the anomaly detection functions 240 support decision-making processes by providing actionable insights into user behavior. By categorizing behavior based on various metrics and deviations, the anomaly detection functions 240 empowers the risk quantification engine 164 to identify and address potential security risks, improve incident response capabilities, and enhance overall security posture within digital environments.

The integration of the anomaly detection functions 240 into the security application 150 enhances the effectiveness of the risk quantification engine 164 by providing comprehensive analysis and categorization of user behavior. Additionally, these functions enable the risk quantification engine 164 to make informed decisions regarding actual or potential security incidents, and to proactively apply risk ratings to different potential risks.

The decision-making functions 241 can execute algorithms to automate decision-making processes based on comprehensive data analyses. By categorizing and analyzing data, the decision-making functions 241 can generate actionable insights that facilitate informed decision-making across various domains within cybersecurity. Furthermore, in some embodiments, these functions can enhance efficiency and accuracy by enabling automated responses to identified patterns and trends, ultimately improving the overall effectiveness of security measures.

In certain embodiments, the decision-making functions 241 may leverage algorithms to systematically analyze vast amounts of data collected from various sources within digital environments. These sources may include, but are not limited to, network logs, security event data, user activity logs, and threat intelligence feeds. The decision-making functions 241 identify patterns, trends, and anomalies that may require attention by processing and categorizing this data.

In some examples, the decision-making functions 241 may automatically detect and categorize emerging threats based on patterns observed in network traffic and/or user behaviors. In certain embodiments, these functions also may be configured to identify trends indicating potential vulnerabilities or compliance issues within the digital infrastructure of the risk quantification engine 164.

In certain embodiments, the decision-making functions 241 can enhance efficiency and accuracy by enabling automated responses to identified patterns and trends. Integrating with other security systems and tools, such as intrusion detection systems (IDS), security information and event management (SIEM) platforms, and automated response mechanisms, the decision-making functions 241 can automatically trigger either predefined or dynamic actions in response to specific security events or alerts.

The integration of the decision-making functions 241 into the security application 150 enhances the effectiveness of the risk quantification engine 164 by automating decision-making processes and generating actionable insights from comprehensive data analysis. Through its algorithms and automated response capabilities, the decision-making functions 241 enable the risk quantification engine 164 to proactively detect and respond to security threats, ultimately improving digital environments' overall security posture and resilience. As explained in further detail below, the security application 150 may include one or more language models (e.g., such as language model 135 in FIG. 2E) that is configured to execute some or all of the decision-making functions 241.

This input aggregation functions 242 can be configured to aggregate input data from multiple sources through collaborative mechanisms, leveraging algorithms and collaborative techniques to categorize and consolidate diverse inputs effectively. By enhancing decision-making processes, the input aggregation functions 242 can provides comprehensive insights derived from collective contributions, promoting synergy and efficiency in analyzing input data to enable more informed and effective decision-making outcomes.

In certain embodiments, the input aggregation functions 242 execute algorithms and collaborative mechanisms to gather input data from various sources within digital environments. These sources may include security analysts, threat intelligence feeds, incident reports, system logs, user feedback, and/or external systems and stakeholders. The input aggregation functions 242 facilitate collecting and aggregating diverse input data by leveraging collaborative techniques such as crowdsourcing, data-sharing platforms, and collaborative workflows.

Additionally, the input aggregation functions 242 can be configured to categorize and consolidate input data to provide comprehensive insights into various aspects of cybersecurity. These functions can systematically analyze input data to identify patterns, trends, anomalies, and emerging threats, providing risk quantification engine 164 with a holistic view of its security landscape.

In some examples, the input aggregation functions 242 may aggregate input data from security analysts reporting suspicious activities, threat intelligence feeds providing information on new malware variants, and/or incident reports detailing past security incidents. By consolidating these inputs from these diverse data sources, the input aggregation functions 242 can enable the risk quantification engine 164 to identify commonalities, correlations, and emerging patterns that may indicate potential security risks or trends.

Moreover, the input aggregation functions 242 promotes synergy and efficiency in analyzing input data by fostering stakeholder collaboration and knowledge sharing. These functions enable security teams to leverage collective expertise, insights, and perspectives to make more informed and effective decisions by providing a centralized platform for aggregating and analyzing input data.

The incident response and forensics analysis (IRFA) functions 243 can be configured to assess and detect threats or risks based on an analysis of breach and incident response data (e.g., such as breach and incident response data associated with target network resources 190, computing devices 110, external systems, and/or enterprise systems).

This IRFA functions 243 can be designed to utilize breach and incident response data to identify and categorize risky entities, leveraging algorithms to analyze patterns within the data effectively. By systematically examining breach and incident response data, the IRFA functions 243 can pinpoint potential risk factors and threats, aiding decision-making processes by categorizing entities based on risk levels.

The IRFA functions 243 can include algorithms to process and analyze breach and incident response data collected from various sources within digital environments. These sources may include security incident reports, forensic analysis results, threat intelligence feeds, system logs, and user activity data. By systematically examining this data, the IRFA functions 243 can identify patterns, trends, and anomalies indicative of potential security risks or threats.

In certain embodiments, the IRFA functions 243 can analyze and/or detect patterns within the data to pinpoint potential risk factors and threats. Additionally, these functions can identify deviations from expected behavior by leveraging analytical techniques, including machine learning algorithms, statistical analysis, and anomaly detection methods. It flags them as potential security risks or indicators of compromise.

In some examples, the IRFA functions 243 may detect unusual access patterns, unauthorized file transfers, and/or suspicious network connections indicative of security breaches and/or insider threats. These functions also can analyze forensic data to identify malware signatures, attack vectors, and other indicators of compromise associated with specific security incidents.

In further examples, the IRFA functions 243 can categorize entities based on risk levels to aid decision-making processes. By categorizing attributes including, but not limited to, end-users, devices, applications, and network segments based on their potential risk levels, the IRFA functions 243 provide valuable insights into the severity and impact of security incidents, enabling risk quantification engine 164 to prioritize response efforts and allocate resources effectively.

The integration of the IRFA functions 243 into the security application 150 can enhance the effectiveness of incident response efforts by providing comprehensive analysis and categorization of breach and incident response data. Through its algorithms and analytical capabilities, the IRFA functions 243 enable the risk quantification engine 164 to effectively identify, prioritize, and apply risk ratings to different security risks and threats, ultimately strengthening digital environments' resilience and security posture.

The interaction analysis functions 244 can be configured to assess and detect threats or risks based on analysis of various interactions within digital environments. In certain embodiments, the interaction analysis functions 244 utilize algorithms to evaluate interactions within digital environments (e.g., such as those related to target network resources 190 and/or external systems that access the security application 150), categorizing and analyzing these interactions to discern patterns and anomalies effectively. By systematically examining interactions, the interaction analysis functions 244 assists decision-making by identifying potentially risky or suspicious behavior, ultimately enhancing system security by providing insights into bot, machine, and similar interactions.

The interaction analysis functions 244 can include algorithms to monitor or assess interactions occurring within digital interfaces, such as web applications, APIs, and communication channels. It systematically categorizes and analyzes these interactions, considering various factors such as the interactions' frequency, nature, and characteristics.

Furthermore, the interaction analysis functions 244 can be configured to discern patterns and anomalies within interactions to identify potentially risky or suspicious behavior. These functions can identify deviations from expected interaction patterns by applying analytical techniques, including machine learning algorithms and statistical analysis, and flag these deviations as potential security risks.

Additionally, the interaction analysis functions 244 can be configured to detect and evaluate a spectrum of activities potentially indicative of unauthorized or automated interactions. This encompasses, without limitation, the analysis of a high volume of repetitive interactions traceable to a singular or an array of digital identifiers, including but not limited to Internet Protocol (IP) addresses (both IPv4 and IPV6), Media Access Control (MAC) addresses, and other network identifiers, suggestive of bot activity or automated attacks. Furthermore, the interaction analysis functions 244 can be configured identify and categorize unusual interaction patterns, such as an abnormal frequency of login attempts or data access requests occurring outside of established normal operating hours, as potentially risky behavior meriting further scrutiny. These mechanisms collectively contribute to the decision-making capabilities of the risk quantification engine 164.

The interaction analysis functions 244 enhances system security by providing insights into various interactions, including those initiated by bots, machines, or automated scripts. By categorizing and analyzing these interactions, the interaction analysis functions 244 enable the risk quantification engine 164 to detect and apply risk ratings to potential security risks associated with automated activities, unauthorized access attempts, or malicious behavior.

The integration of the interaction analysis functions 244 into the security application 150 can enhance the effectiveness of security measures by providing comprehensive analysis and categorization of interactions within digital environments. Additionally, these functions enable risk quantification engine 164 to identify and respond to potential security threats, safeguarding system integrity and ensuring a secure computing environment.

The risk assessment and definition functions 245 can be configured to systematically evaluate various factors to define and categorize risks within a given context. These functions can utilize algorithms to analyze data and effectively assess the likelihood and impact of potential risks. The risk assessment and definition functions 245 facilitate informed decision-making by prioritizing mitigation efforts and guiding risk management strategies by categorizing risks based on severity and probability.

The risk assessment and definition functions 245 can include algorithms to evaluate various attributes contributing to risk within digital environments. These attributes may include external threats, internal vulnerabilities, regulatory requirements, business objectives, and operational constraints. These functions can define and categorize risks by systematically analyzing these factors to provide the risk quantification engine 164 with a comprehensive understanding of the risk landscape.

Furthermore, the risk assessment and definition functions 245 may leverage various analytical techniques, including statistical analysis, machine learning algorithms, and risk modeling methodologies, to assess the likelihood and impact of potential risks. By considering historical data, threat intelligence feeds, and contextual information, these functions are able to generate risk assessments that reflect the current state of the overall risk posture.

In some examples, the risk assessment and definition functions 245 may assess the likelihood of a cybersecurity breach based on historical attack patterns, vulnerability assessments, and threat intelligence data. Additionally, these functions also can evaluate the potential impact of a data breach on business operations, financial stability, regulatory compliance, and reputation.

In certain embodiments, the risk assessment and definition functions 245 categorizes risk based on severity and probability to facilitate informed decision-making. By prioritizing risks according to their potential impact and likelihood, the risk assessment and definition functions 245 can enable the risk quantification engine 164 to distribute resources with enhanced efficacy, propose measures for the mitigation and avoidance of threats, and/or formulate risk management strategies that are not only bespoke to specific operational requisites, but which also adhere to established industry frameworks and incorporate proprietary logic systems.

The integration of the risk assessment and definition functions 245 into the security application 150 enhances the effectiveness of risk management efforts by providing comprehensive risk assessments and categorizations. Through its algorithms and analytical capabilities, the risk assessment and definition functions 245 enable the risk quantification engine 164 to proactively identify and prioritize risks, strengthening its resilience and security posture within digital environments.

The relationship and supply chain analysis (RSCA) functions 246 can be configured to comprehensively evaluate third-party relationships and supply chain elements to detect and assess security threats or risks. The RSCA functions 246 can utilize algorithmic techniques to assess and support informed decision-making regarding potential risks associated with external parties, including, but not limited to, suppliers and vendors.

The RSCA functions 246 can include algorithms to systematically evaluate various factors contributing to risk within third-party relationships and supply chain components. These factors may include, but are not limited to, supplier reliability, vendor security posture, compliance with regulatory requirements, financial stability, and operational resilience.

Furthermore, the RSCA functions 246 can be configured to assess the potential risks associated with external entities by considering attributes such as, but not limited to, reputation, track record, past security incidents, and adherence to security best practices. By analyzing or using risk scoring models, threat intelligence feeds, and/or historical data analysis, the RSCA functions 246 can generate comprehensive risk assessments that reflect the current state of third-party and supply chain risks.

In some examples, the RSCA functions 246 may assess the potential impact of a security breach at a third-party vendor on the organization's operations, data security, and reputation. Additionally, these functions also evaluate the financial stability of suppliers and vendors to identify potential risks related to business continuity and supply chain disruptions.

In certain embodiments, the RSCA functions 246 can categorize risk based on severity and impact to enable informed decision-making. By prioritizing risks according to their potential impact on business operations, financial stability, regulatory compliance, and/or reputation, the RSCA functions 246 enables the risk quantification engine 164 to allocate resources effectively, implement targeted mitigation measures, and/or develop risk management strategies tailored to their specific needs.

The integration of the RSCA functions 246 into the security application 150 enhances the effectiveness of risk management capabilities by providing comprehensive evaluations of third-party relationships and supply chain components. Additionally, the RSCA functions 246 may enable the risk quantification engine 164 to identify and prioritize risks associated with external entities, ultimately strengthening the resilience and security posture within digital environments.

The intelligence collection functions 247 can be configured to systematically collect and analyze threat intelligence data from various sources to detect or assess security threats or risks. In certain embodiments, the intelligence collection functions 247 can include algorithms designed to effectively categorize and evaluate threats based on their relevance, severity, and potential impact. These functions can enable informed decision-making regarding the implementation of threat response strategies and/or proactive security measures by providing actionable insights into emerging threats and vulnerabilities.

The intelligence collection functions 247 can include algorithms to gather threat intelligence data from diverse sources within digital environments. These sources may include, but are not limited to, open-source threat feeds, proprietary threat intelligence platforms, security research reports, dark web monitoring services, and collaborative threat-sharing networks. By systematically aggregating and processing this data, the intelligence collection functions 247 provides the risk quantification engine 164 with a comprehensive view of the current threat landscape.

In certain embodiments, the intelligence collection functions 247 can categorize and evaluate threats based on their relevance, severity, and potential impact on organizational assets and operations. By leveraging various analytical techniques, including threat scoring models, threat attribution analysis, and/or historical data analysis, the intelligence collection functions 247 can identify emerging threats and vulnerabilities that pose a significant risk to the organization.

In some examples, the intelligence collection functions 247 may analyze threat intelligence data to identify new malware variants, exploit kits, phishing campaigns, and/or zero-day vulnerabilities targeting specific industries or geographic regions. Moreover, these functions also can assess the potential impact of these threats on business operations, data security, regulatory compliance, and reputation. In some examples, the intelligence collection functions 247 can be applied to analyze target network resources 190 and/or computing devices 110 or servers 120 associated with end-users or external systems that access the security application.

Additionally, the intelligence collection functions 247 can provide actionable insights into emerging threats and vulnerabilities to facilitate informed decision-making regarding threat response strategies and proactive security measures. By categorizing threats based on relevance and severity, these functions enable the risk quantification engine 164 to prioritize response efforts, allocate resources effectively, and implement targeted security controls to apply risk ratings to different potential risks.

The integration of the intelligence collection functions 247 into the security application 150 enhances the effectiveness of threat intelligence efforts by providing comprehensive analysis and categorization of threat intelligence data. Additionally, the intelligence collection functions 247 can enable the risk quantification engine 164 to effectively identify, prioritize, and highlight emerging threats and vulnerabilities, ultimately strengthening digital environments' resilience and security posture.

The above-described functions associated with the ASM engine 161, DAIV engine 263, and TDR engine 163 are intended to provide examples of the functions that may be executed by the security application 150 to assess various types of security threats or risks. However, the security application 150 can be configured to execute many additional types of functions to assess security threats or risks. Additionally, in some cases, one or more of the above functionalities may be omitted from the security application 150 or may not be applicable to analyzing certain types of decoded data 155 or queries being analyzed by the security application 150.

C. Exemplary Risk Quantification Data and Related Techniques

In certain embodiments, the multi-context threat assessment system 160 can include a risk quantification engine 164 that is configured to generate risk quantification data 170 associated with machine-readable codes 145. The risk quantification data 170 can generally include any information or data associated with identifying, detecting, and/or quantifying security threats or risks corresponding to the machine-readable codes 145 and/or queries submitted via the API 158 of the security application 150. The formats and/or types of risk quantification data 170 generated by the multi-context threat assessment system 160 can vary.

In certain embodiments, the risk quantification data 170 can include grading labels that identifies the risk or threat levels associated with the machine-readable codes 145 (e.g., low risk, medium, high risk, etc.). Additionally, or alternatively, the risk quantification data 170 can include scoring information (e.g., identifying scores in ranges of 1-5, 1-10, or 1-100) that identifies or quantifies the risk or threat levels associated with the machine-readable codes 145. Additionally, or alternatively, the risk quantification data 170 can include threat or risk labels identifying the different types of security threats or risks that were detected and/or the severity of the threats or risks that were detected.

In some examples, the risk quantification data 170 (or labels included therein) may indicate whether or not malicious code was detected, whether or not target network resources 190 (or domains or entities associated therewith) are listed on access controls lists, whether or not target network resources 190 are detected as being compliant with applicable regulatory frameworks, whether or not target network resources 190 are using appropriate security protocols (e.g., appropriate hashing, encryption, communication, and/or data storage protocols), whether or not malicious or legitimate entities were detected as being associated with the machine-readable codes 145, etc. Additionally, or alternatively, the risk quantification data 170 can simply include a binary output indicating whether the machine-readable codes 145 are low-risk or high-risk (or safe or unsafe). The risk quantification data 170 can identify and/or quantify risks or threats associated with the machine-readable codes 145 in many other ways as well.

The techniques utilized to generate the risk quantification data 170 also can vary. In certain embodiments, to generate risk quantification data 170 for a given machine-readable code 145, the risk quantification engine 164 may receive or access values corresponding to one or more of the risk assessment attributes 165 described herein (e.g., such as the code attributes 165A, network resource attributes 165B, entity attributes 165C, end-user attributes 165D, enterprise system attributes 165E, and/or decoded data attributes 165F derived by the ASM engine 161, DAIV engine 263, and/or TDR engine 163). The risk quantification engine 164 may execute an algorithm or process that evaluates or jointly considers the values of the risk assessment attributes 165 to generate the risk quantification data 170 for the machine-readable code 145.

In some examples, in generating the risk quantification data 170, the risk quantification engine 164 may execute an algorithm that scores or quantifies the risk-level for the machine-readable code 145 based on weighting factors that have been applied to the values associated assigned to the risk assessment attributes 165. The weights assigned to the risk assessment attributes 165 may indicate the importance or significance of the risk assessment attributes 165, and may enable certain risk assessment attributes 165 to have a greater or lesser impact on the risk ratings generated for the machine-readable code 145. Certain attributes may be assigned greater weights (e.g., such as those indicating that malicious actors and/or malicious code has been detected), while other attributes may be assigned lesser weights (e.g., such as those indicating that the end-user is located in a risky geographic area or the legitimate target network resources 190 employ less than optimal security frameworks). Other algorithms also may be used that do not involve application of weighting techniques.

In some embodiments, the outputs or attributes generated by each of the functions associated with the ASM engine 161, DAIV engine 263, and/or TDR engine 163 may be directly fed into the risk quantification engine 164 for consideration in generating the risk quantification data 170. In other embodiments, each of the engines-namely the ASM engine 161, DAIV engine 263, and TDR engine 163—may be equipped with its own dedicated risk quantification engine 164. These dedicated risk quantification engines 174 can be configured to generate risk quantification data 170, which is derived from evaluating one or more attributes that are identified or processed by the respective engine's functions. In some scenarios, this distributed approach can allow for a more granular and focused analysis of risks, with each engine contributing its specialized assessment to the overall risk quantification. Thus, while the risk quantification data 170 is illustrated as a single component in FIG. 1B, the functions of the risk quantification data 170 can be integrated into the security application 150 in various ways and, in some cases, can be integrated with other components of the security applications 150 (e.g., integrated with other engines). The risk quantification data 170 can operate to provide global evaluations of risk assessment attributes 165 and/or more granular evaluations (e.g., such as evaluations for specific engines or specific subsets of assessment functions).

FIG. 4A is an exemplary GUI 400A that displays risk quantification data 170 according to certain embodiments. In this example, the risk quantification data 170 is being displayed for a QR code that was scanned using the security application 150. The risk quantification data 170 indicates the symbology analysis functions 230 classified or detected the code as being a valid QR code that is compliance with its applicable QR specification protocols. The risk quantification data 170 further includes a risk-level label indicating the QR code as high-risk. The risk quantification data 170 also includes a summary of content that was detected in the decoded data 155 obtained from the QR code, including two network address identifiers 155A (e.g., URLs), a telecommunications identifier 155D (e.g., a phone number) and an email identifier 155C (e.g., an email address). The risk quantification data 170 further includes a summary of the most relevant assessment results. In this example, the summary explains that one or the network address identifiers 155A was identified on a blacklist that identifies malicious websites, one of the network address identifiers 155A references an executable file that was detected to have malware, the email identifier 155C was reported as being malicious by multiple users, and a telecommunications identifier 155D was detected as being linked to phishing scams.

The risk quantification data 170 further identifies two entities (i.e., a company and an individual) that were detected as being affiliated with the QR code. One of the entities was detected by extracting an entity identifier 155F (e.g., a company name) directly from the decoded data 155 derived from the QR code, while the other (e.g., an individual) was indirectly detected by scanning DNS resources 304 associated with the two network identifiers 155A. The summary also indicates that the two entities were detected as being associated with malicious behavior.

Additionally, the GUI 400A additionally includes three selectable options. A first selectable option 401 enables the URLs to be opened in a secure browser environment 156 of the security application 150. In some embodiments, the secure browser environment 156 can be configured with web browser functionalities and which can operate in a protective mode. In the protective mode, the web browser that receives information about the detected threats and reconfigures the browser settings to prohibit or restrict certain types of functionalities based on the detected threats. For example, the web browser may be prevented from executing executable code and/or downloading files on computing device 110 that is using the security application. In some embodiments, the prohibitions or restrictions applied to the web browser may be based, at least in part, on the particular types of security threats or risks that were detected.

A second selectable option 402 enables the end-user to place a phone call to the phone number identified in the decoded content 155 extracted from the QR code. In scenarios where a phone number is detected as being malicious or suspicious, the option may be deactivated and/or may present warning notifications to the end-user if it is selected.

A third selectable option 403 enables the end-user to dispute the results of the scan. For example, if an end-user believes one or more aspects of the risk quantification data 170 to be inaccurate, the end-user may select this option to dispute the results. In some cases, an input form may be presented that enables the end-user to provide information explaining why the results are believed to be inaccurate.

FIG. 4B is another exemplary GUI 400B that displays risk quantification data 170 according to certain embodiments. In this example, the risk quantification data 170 is being displayed for a data matrix code that was scanned or input to the security application 150. The risk quantification data 170 indicates the symbology analysis functions 230 classified the scanned code as being a valid data matrix code, which is compliant with the corresponding specification or protocols for this code type.

The risk quantification data 170 also identifies an entity (i.e., a company) that was detected as being affiliated with the data matrix code. The risk quantification data 170 further includes a risk-level label indicating the data matrix code as low-risk. The risk quantification data 170 also includes a summary of content that was detected in the decoded data 155 derived from the data matrix code, including a network address identifier 155A (e.g., a URL), a telecommunications identifier 155D (e.g., a phone number) and an email identifier 155C (e.g., an email address). The risk quantification data 170 further includes a summary of the most relevant assessment results. In this case, the summary explains that no malicious behavior was detected as being associated with the URL, the email address, or the phone number included in the decoded data 155 extracted from the data matrix code. Additionally, the summary indicates that the website associated with the URL was detected as being compliant with all applicable data privacy requirements and compliance frameworks, and that the entity was detected as being listed on a whitelist that identifies legitimate entities. The interface 400B further includes the three selectable options (401, 402, 403) described above.

It should be noted that many variations can be made to the exemplary interfaces (400A, 400B) illustrated in FIGS. 4A-4B. In some examples, the interfaces may represent the risk quantification data 170 in other ways (e.g., the risk labels may be replaced with risk scores ranging from 1-10 or 1-100). Moreover, the GUIs can be configured to display additional, or alternative, types of risk quantification data 170 (or corresponding risk assessment attributes 165). For example, the interfaces may indicate specific types of compliance frameworks that are applicable to the URLs, specific encryption and hashing protocols utilized by the websites, specific types of malwares that were detected, etc. Many other modifications or variations also are possible.

III. Exemplary Process Flows

Figure 3A:
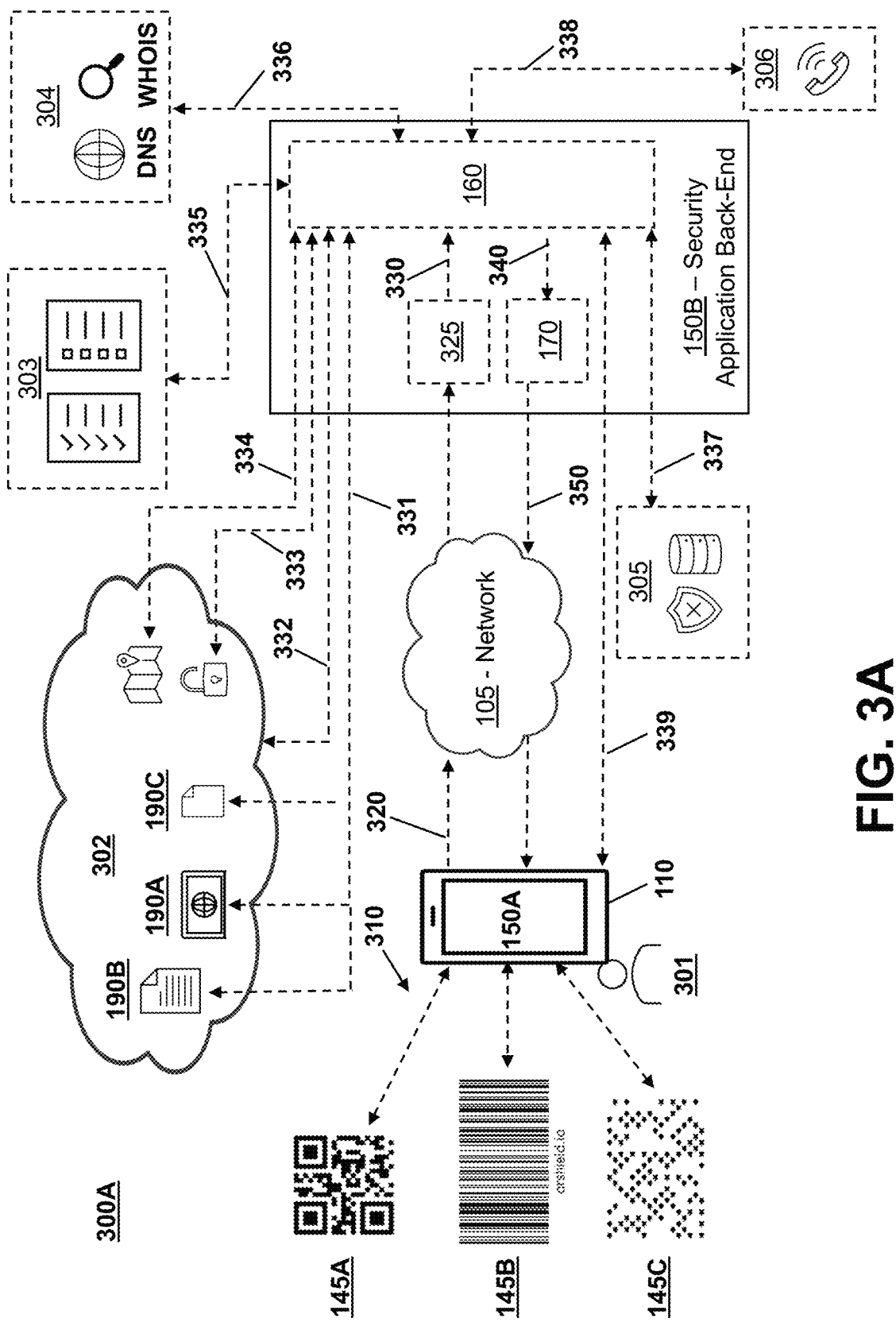
FIG. 3A illustrates an exemplary process flow for evaluating security threats or risks corresponding to machine-readable codes according to certain embodiments.

FIG. 3A illustrates an exemplary process flow 300A according to certain embodiments.

At step 310, an end-user 301 utilizes a computing device 110 (e.g., a smart phone that includes a camera device) to scan or input a machine-readable code 145, such as a QR code 145A, a barcode 145B, or a data matrix code 145C. The machine-readable code 145 includes encoded data 146, which can comprise various types of content (e.g., such as data corresponding to network address identifiers 155A, network access data 155B, email identifiers 155C, telecommunications identifiers 155D, physical address identifiers 155E, entity identifiers 155F, message content 155G, executable code 155H, visual content 155I, sensitive information 155J, and/or other types of content).

A front-end 150A of the security application 150 is installed on the computing device 110. In some embodiments, the end-user 301 may provide permissions or authorization for the front-end 150A to access a camera device 115 on the computing device 110, and the front-end 150A may present a graphical user interface (GUI) that uses the camera device to scan the machine-readable code 145. In other embodiments, the front-end 150A may be an application or function that is integrated with an operating system (OS) running on the computing device 110 and/or integrated with a camera application installed on the computing device 110.

Additionally, in some examples, the machine-readable code 145 may be included on a display medium 140, such as a digital display medium 141 or a physical display medium 142, that is external to the computing device 110. In other examples, the machine-readable code 145 may be presented on an interface that is displayed on the computing device 110. In further examples, machine-readable code 145 may be stored in storage device 101 of the computing device 110 operated by the end-user 301, and accessed by the front end 150A of the security application 150.

At step 320, the front-end 150A of the security application 150 transmits the machine-readable code 145 over a network 105 (e.g., which may include the Internet) to a back-end 150B of the security application 150.

In this exemplary process flow 300A, a decoding function 325 is stored on the back-end 150B of the security application 150. However, in other embodiments, the decoding function 325 described herein can be stored and executed by the front-end 150A of the security application 150 and the decoded data 155 output by the decoding function 325 may be sent with, or in lieu of, the machine-readable code 145 over the network 105 to the back-end 150B of the security application 150. Any content (including the machine-readable code 145 and/or decoded data 155) sent by the front-end 150A to the back-end 150B of the security application 150 may be protected using an encrypted communication protocol (e.g., using HTTPS, HTTP/2, HTTP/3, and/or other secure encryption protocols).

Regardless of where in the decoding function 325 is situated, it can be configured to execute various decoding functions on the machine-readable code 145 and generate decoded data 155.

In some embodiments, the decoding function 325 (or other component of the security application 150) may initially classify the machine-readable code 145 and/or detect the type of machine-readable code 145 that has been scanned or input. For example, the decoding function 325 may detect whether the machine-readable code 145 corresponds to a QR code 145A, a barcode 145B, a data matrix code 145C, and/or other type of machine-readable code 145, and may execute a decoding algorithm or procedure corresponding to the detected type of machine-readable code 145 to derive the decoded data 155.

In some embodiments, the decoding function 325 (or other component of the security application 150) may also determine if the machine-readable code 145 is a valid code and/or is compliant with a code specification corresponding to the type of code the machine-readable code 145 purports to be. This operation can serve as integrity check to verify that the machine-readable code 145, at a minimum, is generated in compliance with proper specifications and/or generated by a service provider that issues particular types of machine-readable codes 145.

Additionally, in some cases, the decoded data 155 may be encrypted. In this scenario, the decoding function 325 (or other component of the security application 150) may classify or detect the encryption technique applied to the decoded data 155, and execute a decryption algorithm or function corresponding to the detected encryption technique to decrypt the decoded data 155.

The content of the decoded data 155 obtained from the decoding and/or decrypting processes may include alphanumeric or textual strings corresponding to network address identifiers 155A, network access data 155B, email identifiers 155C, telecommunications identifiers 155D, physical address identifiers 155E, entity identifiers 155F, message content 155G, executable code 155H, visual content 155I, sensitive information 155J, and/or other types of content.

At step 330, the decoded data 155 is provided to the multi-context threat assessment system 160, which executes various analyzes and/or processes for detecting threats or risks associated with the machine-readable code 145 (or the decoded coded 155 derived from the machine-readable code 145) across multiple contexts. As explained above, the multi-context threat assessment system 160 can analyze various types of risk assessment attributes 165 that provide contextual information pertaining to the machine-readable code itself, decoded data 155 derived from the machine-readable code 145, target network resources 190 detected as being affiliated with the machine-readable code 145, entities detected as being affiliated with a machine-readable code 145, the end-user 301 that input the machine-readable code 145, the computing device 110 that input the machine-readable code 145, and/or enterprise systems associated with the end-user 301 or computing device 110 that input the machine-readable code 145. The multi-context threat assessment system 160 can analyze various risk assessment attributes 165 across these multiple contexts to analyze and detect actual or potential threats and risks associated with the machine-readable code 145.

Steps 331-339 demonstrate exemplary risk assessment attributes 165 (and corresponding analysis functions) that can be considered by the multi-context threat assessment system 160.

In step 331, the multi-context threat assessment system 160 analyzes any target network resources 190 identified by the decoded data 155 derived from the machine-readable code 145. In some scenarios, the decoded data 155 may explicitly or directly identify a single target network resource 190 and/or multiple target network resources 190. In other scenarios, the target network resources 190 may be identified indirectly using other content included in the decoded data 155. For example, if an email address is identified in the decoded data 155, the multi-context threat assessment system 160 may indirectly identify a target network resource 190, such as a web page or website, that is associated with the same domain as the email address. Likewise, if a name, phone number, or physical address is provided in the decoded data 155, the multi-context threat assessment system 160 may indirectly identify a target network resource 190 (e.g., a website) that is associated with the machine-readable code 145 by correlating the name, phone number, or physical address with information from other data sources (e.g., WHOIS information, DNS registrar information, etc.).

Varying types of target network resources 190 can be identified. In some examples, the target network resources 190 may include web pages 190A, content files 190B (e.g., PDFs, spreadsheets, word processing documents, etc.), and/or executable files 190C that are identified by network address identifiers 155A included in the decoded data 155. The multi-context threat assessment system 160 can classify or detect the type of content that each of the network addresses refers to (e.g., whether it is a web page 190A, content file 190B, executable file 190C, or other resource).

The multi-context threat assessment system 160 can analyze the network address identifiers 155A themselves for various attributes. For example, the multi-context threat assessment system 160 analyze whether the network addresses are in valid formats and/or whether any content actually exists at the location identified by the network addresses. As explained below, the multi-context threat assessment system 160 also may access external resources (e.g., databases, data logs, websites, etc.) to detect if the network addresses are identified by on any access control lists and/or compromised lists.

In addition to analyzing the network address identifiers 155A themselves, the multi-context threat assessment system 160 can analyze the content of any target network resources 190 (e.g., web pages 190A, content files 190B, executable files 190C, etc.) and/or affiliated websites to further assess potential threats and risks. For example, the multi-context threat assessment system 160 may scan or analyze the content for malicious software, such as viruses, malware, Trojan horses, worms, ransomware, spyware, adware, key-loggers, etc. Additionally, or alternatively, the multi-context threat assessment system 160 may scan or analyze the content to determine if the content includes various types of sensitive information 155J (e.g., PII, PHI, financial information, etc.) and/or collects various types of sensitive information 155J from end-users. Additionally, or alternatively, the multi-context threat assessment system 160 may utilize a computer vision system (e.g., computer vision system 137 in FIG. 2E) to analyze whether any image or video content associated with the target network resources 190 include sensitive information, offensive content, and/or non-compliant content.

In some examples, the multi-context threat assessment system 160 may scan or analyze the source code associated with an identified web page 190A and/or any textual content included one the webpage 190A. The multi-context threat assessment system 160 also may crawl other web pages associated with the website corresponding to the identified web page 190A, and analyze source code and/or content for other web pages associated with the website. The multi-context threat assessment system 160 may apply other techniques to scan or analyze the content associated with the target network resources 190.

In step 332, the multi-context threat assessment system 160 analyzes any cloud environments 302 that are affiliated with the each of the target network resources 190 identified by the decoded data 155 (e.g., cloud environments 302 which host or store the target network resources 190).

In step 333, the multi-context threat assessment system 160 analyzes security settings associated with the target network resources 190 themselves and/or the cloud environments 302 that are affiliated with the target network resources 190. In some examples, this may include analyzing hashing protocols, communication encryption protocols, data storage protocols, and/or other security-impacting features of the target network resources 190 and/or their associated cloud environments 302.

In step 334, the multi-context threat assessment system 160 analyzes geographic attributes associated with the target network resources 190 and/or a cloud environment 302 that hosts the target network resource 190. In some embodiments, the multi-context threat assessment system 160 also analyzes geographic attributes of any entities (e.g., (e.g., individuals, companies, organizations, governmental entities, etc.) associated with the machine-readable code 145, such as entities explicitly or directly identified in the decoded data 155, entities detected as being affiliated with the target network resources 190, and/or entities indirectly identified based on the decoded data 155 (e.g., based on correlations with email addresses, phone numbers, postal addresses, or other information in the decoded data 155). The geographic attributes may indicate whether the target network resources 190 and/or entities affiliated with the machine-readable code 145 are located in higher risks areas and/or lower risk areas.

In step 335, the multi-context threat assessment system 160 analyzes one or more access control lists 303 for further assessing threats or risks associated with the machine-readable code 145. In some examples, the multi-context threat assessment system 160 can interface with various external databases and security resources to detect malicious or suspicious attributes of the machine-readable code 145, as well as to confirm trusted attributes, by retrieving and cross-referencing both blacklists and whitelists with IP addresses, websites, URLs, entities, telephone numbers, email addresses, entity information, and/or other content affiliated with the machine-readable code 145.

In step 336, the multi-context threat assessment system 160 analyzes one or more DNS resources 304 for further assessing threats or risks associated with the machine-readable code 145. In some examples, the multi-context threat assessment system 160 can interface with external databases and security resources to analyze various DNS attributes and WHOIS attributes of any target network resources 190 and/or domains detected as being affiliated with the machine-readable code 145.

In some examples, analyzing these DNS attributes can include: a) determining an actual location of the servers hosting the target network resources 190; b) analyzing DNS-based reputation services; and/or c) identifying any recent or rapid changes in domain name ownership or hosting location.

Likewise, analyzing the WHOIS attributes may include: a) identifying the registrar of a domain; b) assessing the credibility of the registrar (e.g., to detect whether the domain is associated with a registrar having weak security policies susceptible to malicious behavior); c) analyzing date-related information (e.g., such as the domain's registration date, expiration date, and last update) to assess the legitimacy of the domain; d) detecting whether the domain is a newly registered domain and/or has a short expiration period; e) analyzing the contact information provided in the WHOIS records to identify related entities for cross-referencing with access control lists; f) detecting domains that use privacy protection services to hide or conceal registrant details; and/or g) identifying and/or evaluating individuals or entities listed as administrative or technical contacts for the domain for cross-referencing with access control lists.

In step 337, the multi-context threat assessment system 160 analyzes one or more compromise listing resources 305 for further assessing threats or risks associated with the machine-readable code 145. These compromise listing resources 305 may include records relating to previous or known data breaches and/or security compromises. These records may be cross-referenced with any target network resources 190 detected as being affiliated with the machine-readable code 145.

In step 338, the multi-context threat assessment system 160 analyzes one or more telecommunications resources 304 for further assessing threats or risks associated with the machine-readable code 145. The telecommunications resources 304 may enable the multi-context threat assessment system 160 to analyze the legitimacy (or existence) of phone numbers included directly in the decoded data 155 and/or indirectly identified (e.g., such as phone numbers listed on target network resources 190).

In step 339, the multi-context threat assessment system 160 analyzes attributes of the end-user 301 that input the machine-readable code 145, and/or the computing device 110 utilized by the end-user 301, for further assessing threats or risks associated with the machine-readable code 145. In some examples, the multi-context threat assessment system 160 may consider the geographic location of the end-user 301 to detect whether or not the end-user 301 is located in high-risk area that is prone to malicious attacks. The multi-context threat assessment system 160 may further analyze the end-user behavior patterns to detect anomalous behaviors (e.g., such as anomalous login patterns, location movement patterns, purchase or payment patterns, data access patterns, and/or interaction patterns with applications, websites, and/or other digital sources). The multi-context threat assessment system 160 may further analyze vulnerabilities (e.g., such as outdated or risky software) of the computing device 110.

The attributes and functions discussed in steps 331-339 exemplify the diverse range of security threats or risks that the multi-context threat assessment system 160 can be configured to evaluate in relation to machine-readable codes 145. The capabilities of the multi-context threat assessment system 160 can extend beyond these examples, encompassing a broader spectrum of potential security concerns.

In some cases, one or more of the steps 331-339 may involve real-time, or near real-time, communications between the security application 150 and the different components illustrated in FIG. 3A (e.g., the target network resources 190, cloud environment 302, access control lists 303, DNS resources 304, compromise listing resources 305, telecommunications resources 306, and/or computing device 110). These real-time communications may be initiated in response to the end-user 301 scanning or inputting the machine-readable code 145. Additionally, or alternatively, some or all of the communications between the security application 150 and these components may occur prior to the end-user 301 scanning or inputting the machine-readable code 145. In some examples, the multi-context threat assessment system 160 may periodically retrieve and store data from these components (e.g., such as cloud environment settings, access control lists, DNS information, compromise information, telecommunications information, etc.) for later usage in assessing machine-readable codes 145 input to the system.

The particular set of analysis functions (e.g., associated with steps 331-339) that are executed in response to receiving the machine-readable code 145 may depend on the types of content that is included in the decoded data. For example, step 332 may be unnecessary to analyze cloud attributes if a target network resource 190 is not hosted in a cloud environment 302. Likewise, step 338 may be unnecessary if the decoded content 155 does not include a telecommunications identifier. While the multi-context threat analysis system 160 may include a comprehensive set of analysis functions for analyzing various types of content, the system 160 can be configured to identify or select a subset of analysis functions that are applicable to the types of content detected in the decoded data 155.

In step 340, the multi-context threat assessment system 160 generates or outputs risk quantification data 170 related to the machine-readable code 145, which may quantify or indicate the risk-level or threat-level associated with the machine-readable code 145 in some cases. The risk quantification data 170 also can include various details related to the analyses that were conducting.

In step 350, the risk quantification data 170 is transmitted by the back-end 150B of the security application 150 to the computing device 110 of the end-user 301 (e.g., to the front-end 150A of the security application). One or more GUIs presented on the computing device 110 and/or via the front-end 150A of the security application 150 may present the risk quantification data 170 to the end-user 301, thereby allowing the end-user 301 to make informed decisions with respect to the machine-readable code 145.

The process flow 300A described above serves as an illustrative example of how the multi-context threat assessment system 160 can evaluate security threats or risks associated with machine-readable codes 145. It is to be understood that this process flow 300A is not exhaustive and can be modified to suit various operational requirements and/or various risk assessment attributes 165. Additionally, certain steps may be omitted, additional steps may be introduced, and the sequence of steps can be altered as desired.

Figure 3B:
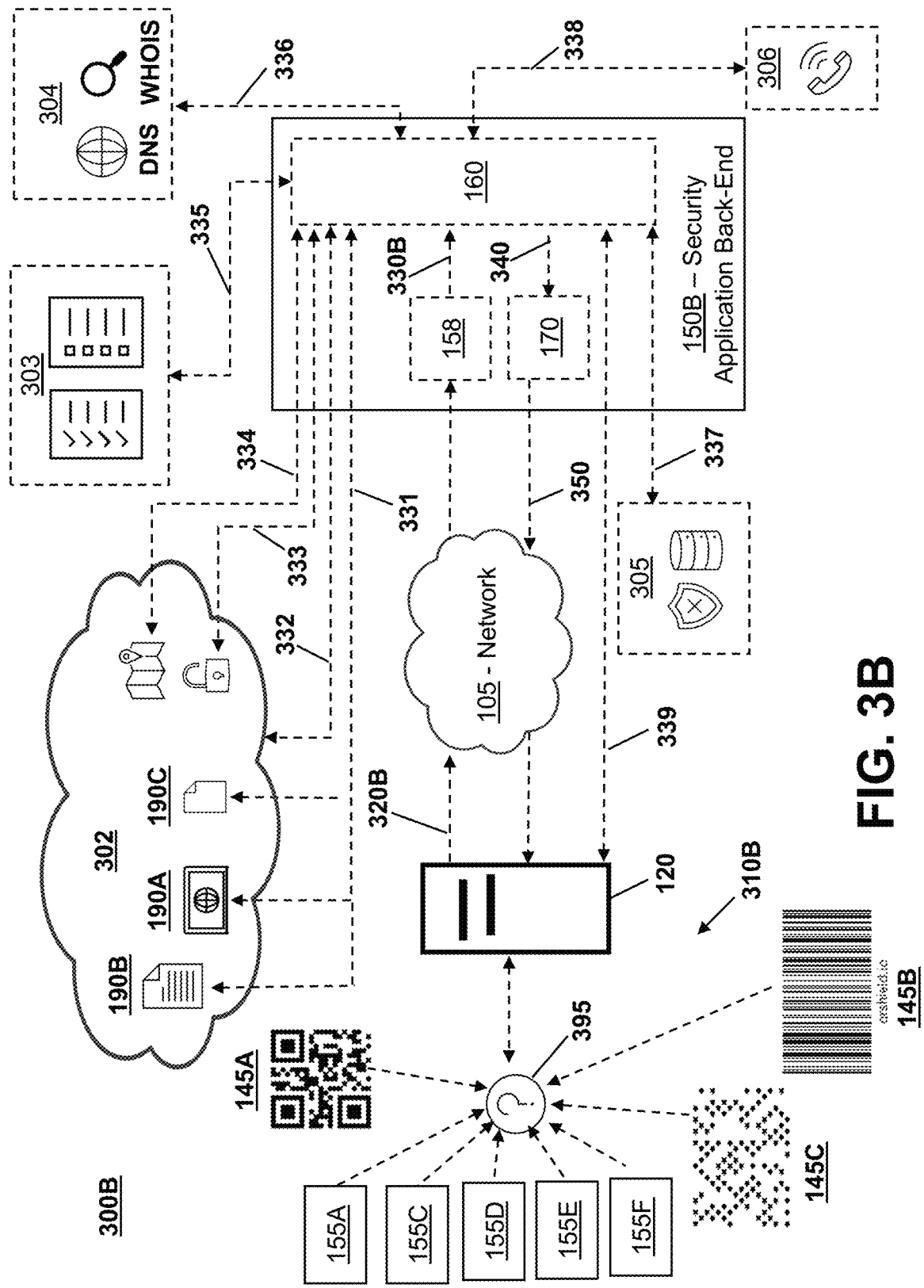
FIG. 3B illustrates an exemplary process flow for evaluating security threats or risks corresponding to queries received via an application programming interface (API) of the security application according to certain embodiments.
Figure 3C:
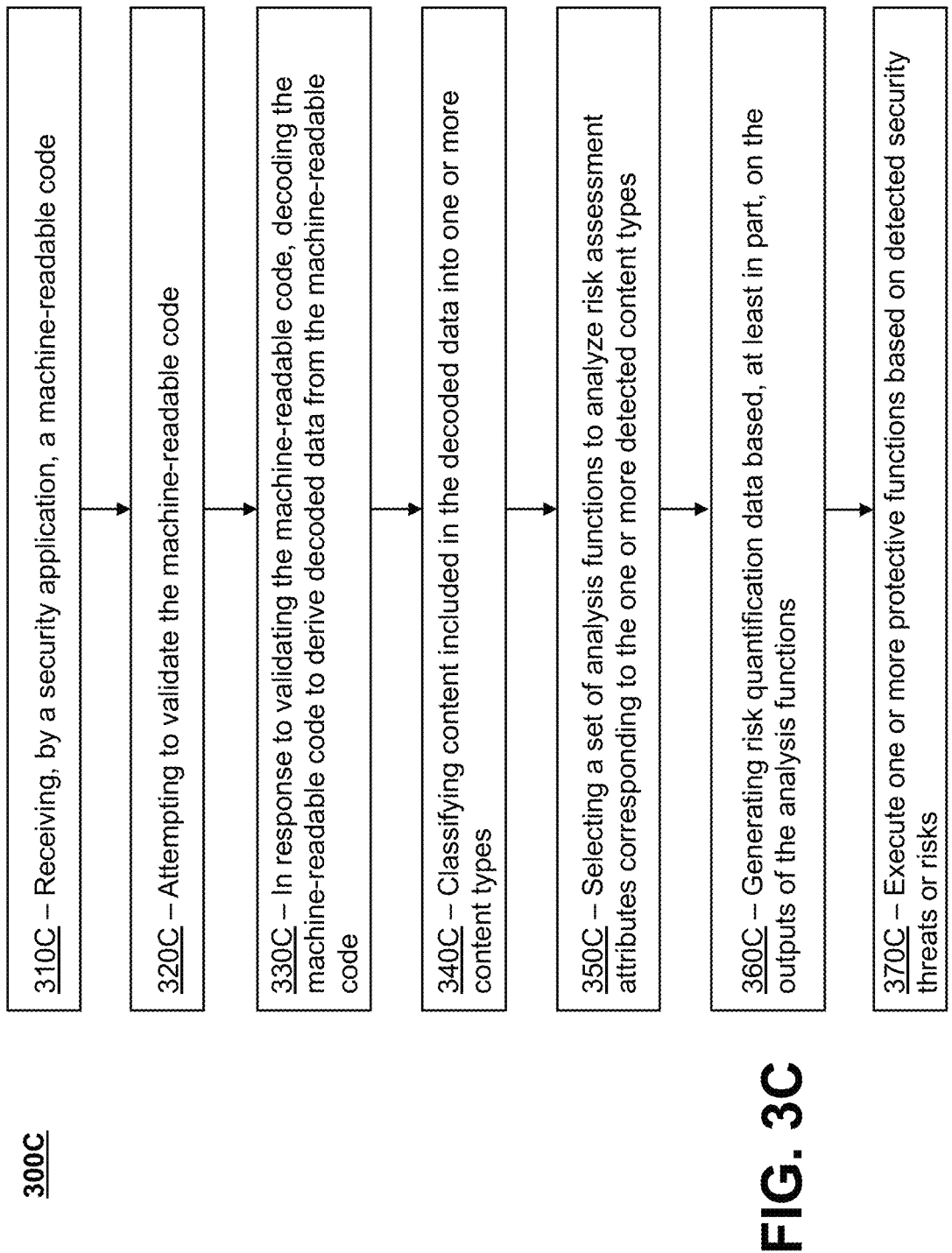
FIG. 3C is a flow chart for an exemplary method according to certain embodiments.

FIG. 3C is a flow diagram illustrating an exemplary method 300C according to certain embodiments. In some cases, one or more steps of the method 300C may be execute by the security application 150 and/or multi-context threat assessment system 160.

In step 310C, the security application 150 receives a machine-readable code 145.

In step 320C, the security attempts to validate the to validate the machine-readable code 145. This may include detecting a code type associated with the machine-readable code 145 and/or determining whether the machine-readable code 145 is a valid code or is compliant with a corresponding specification (e.g., an ISO specification or other standard) associated with the code type.

In step 330C, in response to validating the machine-readable code, the machine-readable code 145 is decoded to derive decoded data 155. In some cases, this may involve performing a decoding function and/or decrypting function on the encoded data 146 embedded into the machine-readable code 145.

In step 340C, the content included in the decoded data 155 is classified into one or more content types. In some cases, this may include detecting whether the decoded data comprises one or more network address identifiers 155A, one or more network access data 155B, one or more email address identifiers 155C, telecommunications identifiers 155D, one or more physical address identifiers 155E, one or more entity identifiers 155F, message content 155G, executable code 155H, visual content 155I, and/or sensitive information 155J. In scenarios where sensitive information 155J is detected, step 340C may further include classifying the sensitive information 155J into one or more content types (e.g., determining whether the sensitive information includes PII, PHI, financial information, etc.).

In step 350C, a set of analysis functions are selected to analyze risk assessment attributes 165 corresponding to the one or more detected content types. The security application 150 can be configured with wide-ranging set of analysis functions, but only some of those functions may be applicable to the particular machine-readable code 145 under analysis. Thus, in step 350C, the security application 150 selects a relevant subset of analysis functions that are applicable to assessing the security threats or risks corresponding to the content types detected in decoded data 155.

In step 360C, the security application 150 generates risk quantification data 170 based, at least in part, on the outputs of the analysis functions. This risk quantification data 170 may be transmitted to an end-user's computing device 110 and/or one or more external systems for usage in evaluating or mitigating any detected security threats or risks.

In step 370C, the security application 150 optionally executes one or more protective functions 157 based on any detected security threats or risks.

IV. Exemplary Features of the Security Application API

In addition to assessing security threats and risks pertaining to machine-readable codes 145, the functions associated with security application 150 can be leveraged for other purposes using an API 158 of the security application 150. The API 158 can enable the functionalities of the security application 150, including the functionalities (functions 210-217, 220-234, and 240-247) associated with the ASM engine 161, DAIV engine 263, and TDR engine 163, and/or risk quantification engine 164, to be queried by third parties for various purposes. Additionally, the API 158 can enable the third parties to submit queries to obtain various data or information (e.g., which may be stored in one or more databases 159) associated with the security application 150.

In one example, an end-user operating a computing device 110 may wish to assess security threats or risks associated with a particular website or file that is accessible over the Internet. In this scenario, the end-user may input a network address identifier 155A for the website or file via an GUI presented by the security application 150. In response to receiving the network address identifier 155A, the multi-context threat analysis system 160 may execute applicable analysis functions (e.g., including one or more functions 210-217, 220-234, and 240-247) on the network identifier and/or the content of the website or file to generate risk quantification data 170 for presentation to the end-user.

In another example, an end-user operating a computing device 110 may wish to assess security threats or risks associated with a particular entity (e.g., a particular individual, company, or organization). In this scenario, the end-user may input an entity identifier 155C (e.g., identifying a name of the entity) via a GUI presented by the security application 150. In response to receiving the entity identifier 115C, the multi-context threat analysis system 160 may execute applicable functions (e.g., including one or more functions 210-217, 220-234, and 240-247) to generate risk quantification data 170 related to the named entity.

An enterprise system and/or other external system can query the API 158 in the same manner as the end-user. In some cases, the enterprise system and/or external system may execute code that automatically communicates with the security application 150 based on predefined conditions (e.g., such as when employees scan machine-readable codes 145 and/or when software associated with the enterprise system and/or external system is attempting to communicate with third-party websites or access resources on third-party systems).

The API 158 of the security application 150 can serve as a versatile interface that enhances the utility and applicability of the application's security features. By providing a means for third-party systems, enterprise frameworks, and end-users to query the application's functionalities and databases, the API 158 facilitates a wide range of security assessments beyond the scope of machine-readable codes 145. For instance, end-users can leverage the API 158 to evaluate the security risks associated with specific websites, files, or entities by submitting relevant identifiers or data for analysis. Similarly, enterprise systems can integrate with the API 158 to automate security checks in real-time, ensuring that employee interactions with external digital resources adhere to organizational security policies. In this manner, the API 158 enables a proactive and dynamic approach to cybersecurity, allowing for the seamless integration of the security application's capabilities into various operational contexts and workflows, thereby extending the protective reach of the security application 150 and contributing to a more secure digital ecosystem.

Many examples described in this disclosure involve an initial decoding of a machine-readable code 145 to obtain decoded data 155, which is then used to trigger various analysis functions for identifying security threats or risks. The API 158 also can be leveraged to submit machine-readable codes 145 for security threat or risk evaluation. However, there are instances where the decoding step can be bypassed, as the API 158 allows for the direct submission of queries using textual content. This textual content could otherwise be obtained from the decoded data 155 in other scenarios. Therefore, any discussions in this disclosure pertaining to the analysis of decoded data 155, or the execution of analysis functions on decoded data 155, are equally applicable to textual queries submitted directly through the API 158. Likewise, while certain portions of this disclosure describe analyzing various risk assessment attributes 165 (e.g., such as code attributes 165A, network resource attributes 165B, entity attributes 165C, end-user attributes 165D, enterprise attributes 165E, and/or decoded data attributes 165F) related to decoded data 155 obtained from machine-readable codes 145, these same risk assessment attributes 165 can be analyzed to assess security threats or risks associated with queries submitted via the API 158. The multi-context threat assessment system 160 can select and execute appropriate functions to analyze the queries and/or content identified by the queries.

FIG. 3B illustrates an alternative process flow 300B that demonstrates how the API 158 can be utilized to process queries 395, such as text queries, in addition to machine-readable codes 145.

In this example, a query 395 can be input to a server 120 at step 310B. The query 395 may include textual content or other content for which a risk evaluation is desired. In some examples, the query 395 may include text or content corresponding to network address identifiers 155A, network access data 155B, email address identifiers 155C, telecommunications identifiers 155D, physical address identifiers 155E, entity identifiers 155F, message content 155G, executable code 155H, visual content 155I, and/or sensitive information 155J, and/or other content. The query 395 also may include machine-readable codes 145.

In some embodiments, the query 395 may be generated automatically by external systems, such as security software associated with an enterprise system and/or third-party system. In other examples, query 395 can be input manually by an end-user via an interface (e.g., system interface 352). Additionally, although a server 120 is depicted as receiving the query 395, the query 395 can also be input via a computing device 110 operated by an end-user.

At step 320B, the query 395 is transmitted to the API 158 located on the back-end 150B of the security application 150. Because the query 395 does not include a machine-readable code in this example, decoding does not need to be performed.

In step 330B, the query 395 is sent from the API 158 to the multi-context threat analysis system 160 for analysis of security threats and risks.

Steps 331-339 are executed in the same manner described above with respect to FIG. 3A. As explained above, the particular analysis functions that are executed in response to receiving the query 395 may depend on the content that is included in the query 395. While the multi-context threat analysis system 160 may include a comprehensive set of analysis functions for analyzing threats or risks associated with various types of content, the system 160 can be configured to identify or select a subset of analysis functions that are applicable to detecting security threats or risks for the types of content detected in the query 395 and/or identified by the query 395.

Likewise, in step 340, risk quantification data 170 is generated based on an analysis of the threat and risks factors corresponding the query 395 and, in step 350, the risk quantification data 170 is returned to the server 120. The risk quantification data 170 may sent directly to the server 120 and/or may be accessed via the API 158.

While certain portions of this disclosure may describe examples in which the API 158 is queried by external systems or end-users, the security application 150 and/or multi-context threat detection system 160 also can utilize the API 158 in connection with analyzing machine-readable codes 145 and/or decoded data 155 and in connection with generating the risk quantification data 170.

The process flow 300B described above serves as an illustrative example of how the multi-context threat assessment system 160 can evaluate security threats or risks associated with queries 395 submitted via the API 158 of the security application 150. It is to be understood that this process flow 300B is not exhaustive and can be modified to suit various operational requirements and/or various risk assessment attributes 165. Additionally, certain steps may be omitted, additional steps may be introduced, and the sequence of steps can be altered as desired.

V. Exemplary Features of the Security Learning Network

In certain embodiments, the security learning network 130 may include one or more artificial intelligence (AI) and/or machine-learning models that can be configured to expand or enhance the functionalities of the security application 150 in various ways.

FIG. 2E is a block diagram illustrating an exemplary configuration of security learning network 130, which includes one or more language models 135 and/or one or more computer vision systems 137.

For purposes of simplicity, certain portions of this disclosure may sometimes refer to the language model 135 or the computer vision system 137 in singular terms. However, it should be understood that the security learning network 130 can include any number (e.g., one or multiple) of language models 135 and/or any number of the computer vision systems 137. Thus, any functions of the language model 135 described in this disclosure can be performed by a single language model 135 or a combination of multiple language models 135. Likewise, any functions of the computer vision system 137 described in this disclosure can be performed by a single computer vision system 137 or a combination of multiple computer vision systems 137.

The type and configuration of the language model(s) 135 described herein can vary. Various types of language models 135 can be utilized by the security learning network 130. In some embodiments, the language model 135 can include a generative pre-trained transformer (GPT) model (e.g., a GPT-1, GPT-2, GPT-3, GPT-4, or subsequently developed GPT model). Additionally, or alternatively, the language model 135 can include a BERT (Bidirectional Encoder Representations from Transformers) model, an XLNet (Extra-Long Transformer Network) model, a ROBERTa (Robustly Optimized BERT pre-training approach) model, a DeBERTa (Decoding-enhanced BERT with disentangled attention) model, a CTRL (Conditional Transformer Language Model) model, and/or a T5 (Text-to-Text Transfer Transformer) model. These or other types of machine learning or AI language models can be used to implement the language model 135. Additionally, as mentioned above, the language model 135 can represent a single model in some embodiments and, in other embodiments, the language model 135 can be comprised of multiple learning models (including any combination of the aforementioned models).

In certain embodiments, the language model 135 can include a transformer neural network architecture that includes a self-attention mechanism, which allows the model to weigh the importance of different parts of a prompt input when generating its output or response. The self-attention mechanism allows the model to selectively focus on different parts of the input when generating its output or response, rather than relying on a fixed context window like other language models. Additionally, the transformer neural network architecture can include a series of layers, each of which applies self-attention and other types of neural network operations on a given input that is received. The layers can be arranged in a stacked configuration, such that the output of one layer is fed as input to the next layer, thereby allowing the model to gradually refine its representation of the input as it is processed through the layers.

Various types of training procedures can be utilized to train the language model 135. In some cases, one or more supervised or semi-supervised training procedures can be utilized to train the language model 135. Additionally, or alternatively, one or more unsupervised training procedures can be utilized to train the language model 135.

In some embodiments, the language model 135 is trained via a self-supervised training procedure that includes both an unsupervised training phase and a supervised training phase. The unsupervised training phase can include a pre-training step in which the learning model 135 is trained on a large corpus of text to learn patterns and relationships between words, phrases, sentences, and/or other human language elements. The supervised training phase can be used for fine-tuning and can train the language model 135 using one or more labeled datasets to facilitate learning of specific natural language processing (NLP) tasks 131, such as language translation, language generation, question answering, text classification, text summarization, etc. Additional types of training procedures also can be utilized to train the language model 135 described herein.

FIG. 2G is a block diagram that illustrates exemplary NLP tasks 131 that can be learned and/or executed by the language model 135 in accordance with certain embodiments. The exemplary NLP tasks 131 can include text generation tasks 131A, language modeling tasks 131B, question answering tasks 131C, text classification tasks 131D, text summarization tasks 131E, speech recognition tasks 131F, named entity recognition (NER) tasks 131G, topic modeling tasks 131H, sentiment analysis tasks 131I and/or other tasks.

The text generation tasks 131A executed by the language model 135 can generally involve generating natural language text (e.g., based on given inputs or prompts received by the language model 135).

The language modeling tasks 131B performed or executed by the language model 135 can generally involve generating outputs that predict a next word or sequence of words in text string based on the context of preceding words. In some cases, the language model 135 can include a statistical language model or deep learning model (e.g., such as recurrent neural networks or RNNs) to execute the language modeling tasks 131B.

The question answering tasks 131C executed by the language model 135 can generally involve generating outputs that answer questions or requests posed in natural language text (e.g., such as when the language model 135 operates as a chatbot and/or operates as a search engine to identify content).

The text classification tasks 131D executed by the language model 135 can generally involve generating outputs that assign labels or categories to portions of text.

The text summarization tasks 131E executed by the language model 135 can generally involve generating outputs that create a summary of a longer piece of text (e.g., using extractive or abstractive summarization techniques).

The speech recognition tasks 131F executed by the language model 135 can generally involve generating outputs that transcribe spoken words into written text.

The NER tasks 131G executed by the language model 135 can generally involve generating outputs that identify and classify named entities (e.g., such as people, organizations, and locations) in a piece of text.

The topic modeling tasks 131H executed by the language model 135 can generally involve generating outputs that identify the topics and themes present in text or a collection of documents.

The sentiment analysis tasks 131I executed by the language model 135 can generally involve generating outputs that identify or classify sentiment, emotions, and/or opinions included in textual content. In some examples, the sentiment analysis tasks 131I can be configured to classify textual content as being positive, negative, and/or neutral, and these classifications can be utilized to identify security threats or risks in the textual content.

In certain embodiments, the language model 135 can execute one or more the aforementioned NLP tasks 131 (and/or other NLP tasks 131) to generate responses corresponding to the security threat or risk assessments described herein.

The language model 135 described herein can be configured to execute any or all of the NLP tasks 131 mentioned above, as well as other types of NLP tasks 131. Various training datasets can enable the language model 135 to perform these and other NPL tasks 131.

In certain embodiments, the language model 135 may be fine-tuned or further trained on various types of information and data that is aggregated and stored by the security application 150.

As illustrated in FIG. 2E, the security application 150 can collect and store aggregated data 134 in one or more databases 159. This aggregated data 134 can comprise, inter alia, any information or data that generated in connection with fulfilling requests to analyze security threats or risks associated with machine-readable codes 145 that are input to the security application and/or fulfilling requests associated with queries 395 received via the API 158. In some examples, the aggregated data 134 can store the machine-readable codes 145 and/or queries 395, as well as any risks assessments attributes 165 that were generated in response to receiving the requests, any outputs that were generated by the analysis functions (e.g., including one or more functions 210-217, 220-234, and 240-247) in response to receiving the requests, and/or any risk quantification data 170 that was generated in response to receiving these requests. The aggregated data 134 may further include various types of metadata related to these requests, such as metadata identifying individuals or entities that submitted the requests, dates and time when the requests were submitted, device types associated with the requests, geographic locations where the requests were submitted, etc.

Additionally, the aggregated data 134 may comprise information that was retrieved or derived from various third-party sources including, but not limited to, any data retrieved or derived from target network resources 190, any data retrieved or derived from any cloud environments 302, any access control lists 303 (e.g., blacklists, whitelists, enterprise ACLs, etc.), any data retrieved or derived from DNS resources 304, any data retrieved or derived from compromised listing resources 305, any data retrieved or derived from telecommunications resources 306, any data retrieved or derived from computing devices 110, any data retrieved or derived from end-users, any data retrieved or derived from security logs or feeds. The aggregated data 134 may further include various types of metadata related to this information obtained from third-party sources, such as metadata identifying individuals or entities where the data was obtained, dates and time when the data was obtained, etc.

Some or all of the aggregated data 134 collected and stored by the security application 150 may be utilized to fine-tune or train the one or more language models 135 to perform or execute various functions including, but limited to, back-end analysis functions 132 and/or end-user interaction functions 133.

In certain embodiments, the back-end analysis functions 132 of the security learning network 130 can be designed to leverage the power of artificial intelligence and machine learning to enhance the security capabilities of the security application 150. These functions can be configured to analyze vast amounts of aggregated data 134 to detect patterns, anomalies, and trends associated with security threats or risks. By utilizing various algorithms and computational techniques, the back-end analysis functions 132 can provide deep insights into the nature and potential impact of various cybersecurity threats.

One example of the back-end analysis functions 132 may include a threat pattern recognition function. This function can be configured to sift through historical security data to identify common characteristics of past cybersecurity incidents. By recognizing these patterns, the function can predict and flag potential future threats, enabling proactive measures to be taken before an actual breach or incident occurs.

Another example may include an anomaly detection function, which continuously monitors network traffic, end-user behaviors, and/or interactions with end-users to identify deviations from established norms. This function can be trained on the aggregated data 134 to distinguish between benign anomalies and those that may signify a security threat, such as a potential intrusion or data exfiltration attempts.

In other examples, the back-end analysis functions 132 may encompass a predictive analytics function that uses statistical models and/or machine learning models to forecast future security trends based on current data. This function can help organizations prepare for emerging threats and adapt their security strategies accordingly.

Additionally, in various scenarios, the back-end analysis functions 132 can be utilized by the multi-context threat assessment system 160 to enhance real-time capabilities related to identifying potential threats or risks and/or generating risk quantification data 170. By leveraging machine learning model capabilities, these functions can process and analyze the aggregated data 134 to identify intricate patterns and correlations across different analysis functions (e.g., such as functions 210-217, 220-234, and 240-247) that may not be apparent or easily detectable using standard programmatic or algorithmic techniques. This deep analysis may enable the detection of nuanced threat indicators, contributing to a more granular and accurate risk assessment. The functions can also adapt and evolve over time through continuous learning mechanisms built into the language model 135, thereby generating risk quantification data 170 in a manner that reflects the latest threat landscape and cybersecurity trends. By incorporating the insights derived from the back-end analysis functions 132, the multi-context threat assessment system 160 can generate risk quantification data 170 that more accurately detects risk levels and identifies potential threats.

The language model 135 also may leverage the aggregated data 134 and/or real-time data collected by the security application 150 to facilitate end-user interaction functions 133. In performing these end-user interaction functions 133, the language model 135 can be configured with AI chatbot functionalities and may receive prompts through the API 158 and/or GUIs (e.g., system interfaces 151) from end-users and/or other entities. The prompts received from the end-users and/or other entities can correspond to any type of security-related issue or subject mentioned in this disclosure. In some non-limiting examples, the prompts may request security threat or risk information related to specific network address identifiers 155A, network access data 155B, email identifiers 155C, telecommunications identifiers 155D, physical address identifiers 155E, entity identifiers 155F, digital content (e.g., documents, files, etc.) uploaded by the end-user, and/or other data.

In response to receiving these prompts, the language model 135 may execute one or more NLP tasks 131 for analyzing, understanding, and/or interpreting the prompts and/or one or more NLP tasks 131 for generating responses to the prompts. In generating these responses, the language model 135 may leverage the aggregated data 292 and/or a current state of data stored on the security application 150. In some scenarios, the responses can include risk quantification data 170 and/or other textual content that identify, quantify, or provide details on security threats or risks related to the prompts. The responses generated by the language model 135 can be returned, or transmitted to, the front-end of the security application 150 (e.g., for presentation on a system interface 151) and/or accessed via the API 148.

In some embodiments, the security learning network 130 also may include a computer vision system 137 as mentioned above.

The configuration of the computer vision system 137 can vary. In certain embodiments, the computer vision system 137 can include a convolutional neural network (CNN), or a plurality of convolutional neural networks. Each CNN may represent an artificial neural network, and may be configured to analyze images and to execute deep learning functions and/or machine learning functions on the images. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers can be configured to enable the CNNs to learn and execute various functions for analyzing, interpreting, and understanding the images, including any of the functions described in this disclosure.

Regardless of its configuration, the computer vision system 137 can be trained to execute various types of computer vision tasks. For example, in some cases, the computer vision system 137 can be configured to execute object detection tasks, which may include predicting or identifying locations of objects associated with one or more target classes in the images. Additionally, or alternatively, the computer vision system 137 can be configured to execute classification tasks (e.g., which may include predicting or determining whether images, or objects included in the images, belong to one or more target semantic classes and/or predicting or determining labels for the images or objects in the images). Additionally, or alternatively, the computer vision system 137 can be configured to execute instance segmentation tasks, which may include predicting or identifying precise locations of objects in the images (e.g., with pixel-level accuracy). The computer vision system 137 can be trained to perform other types of computer vision tasks as well.

In some examples, the computer vision system 137 can be configured to execute or enhance the symbology analysis functions 230 described herein. For example, the computer vision system 137 can be executed on machine-readable codes 145 to identify or classify the machine-readable codes 145 (e.g., to determine if a given code corresponds to a QR code, barcode, data matrix code, etc.) and/or to determine whether or not the machine-readable codes 145 are valid codes or compliant with corresponding specifications.

Additionally, the computer vision system 137 can execute content analysis functions 138 that are configured to detect or identify whether image and/or video content pose security threats or risks. In some examples, the content analysis functions 138 can be executed on images or videos associated with target network resources 190 identified by machine-readable codes 145, images or videos associated with visual content 155| embedded into machine-readable codes 145, images or videos that are identified in requests submitted via the API 158, and/or image or videos that are identified via interactions with the language model 135. The computer vision system 137 can be trained to analyze this image and/or video content to determine whether the content includes sensitive information 155J (e.g., PII, PHI, financial information, etc.) and/or includes images of entities known to be malicious. The computer vision system 137 can be configured to analyze image and/or video content for many other types of security threats or risks as well. In some embodiments, the outputs or results generated by the content analysis functions 138 can be utilized as inputs to the multi-content threat assessment system 160 to more comprehensively evaluate security threats or risks posed by machine-readable codes 145.

In certain embodiments, one or more training procedures may be executed to train the computer vision system 137 to perform the computer vision functions described in this disclosure. The training procedures can enable the computer vision system 137 to learn patterns or objects corresponding to sensitive information, malicious entities, etc. The specific procedures that are utilized to train the computer vision system 137 can vary. In some cases, one more supervised training procedures, one or more unsupervised training procedures, and/or one or more semi-supervised training procedures may be applied to train the computer vision system 137. In one example, a training data set comprising separate categories of text can be labeled with data identifying types of sensitive information that pertain to the text.

The security learning network 130 provides for the integration of artificial intelligence and machine learning capabilities within the security application 150. By leveraging language models 135 and computer vision systems 137, the security learning network 130 enhances the application's ability to interpret, analyze, and respond to a wide array of security-related data inputs. Additionally, the ability of the security learning network 130 to continuously learn from aggregated data 134 allows its functionalities to evolve in line with emerging security threats and user interaction patterns.

While the security learning network 130, language model 135, and computer vision system 137 are illustrated as part of the security application 150, these components may be not be directly integrated with the security application 150 in some cases. For example, in some scenarios, the security application 150 can be configured to communicate via a network 105 with a language model 135 and/or a computer vision system 137 that is provided or hosted by one or more third parties. In these scenarios, the security application 150 can send data to, or retrieve data from, an API that provides access to the language model 135 and/or computer vision system 137.

Figure 3D:
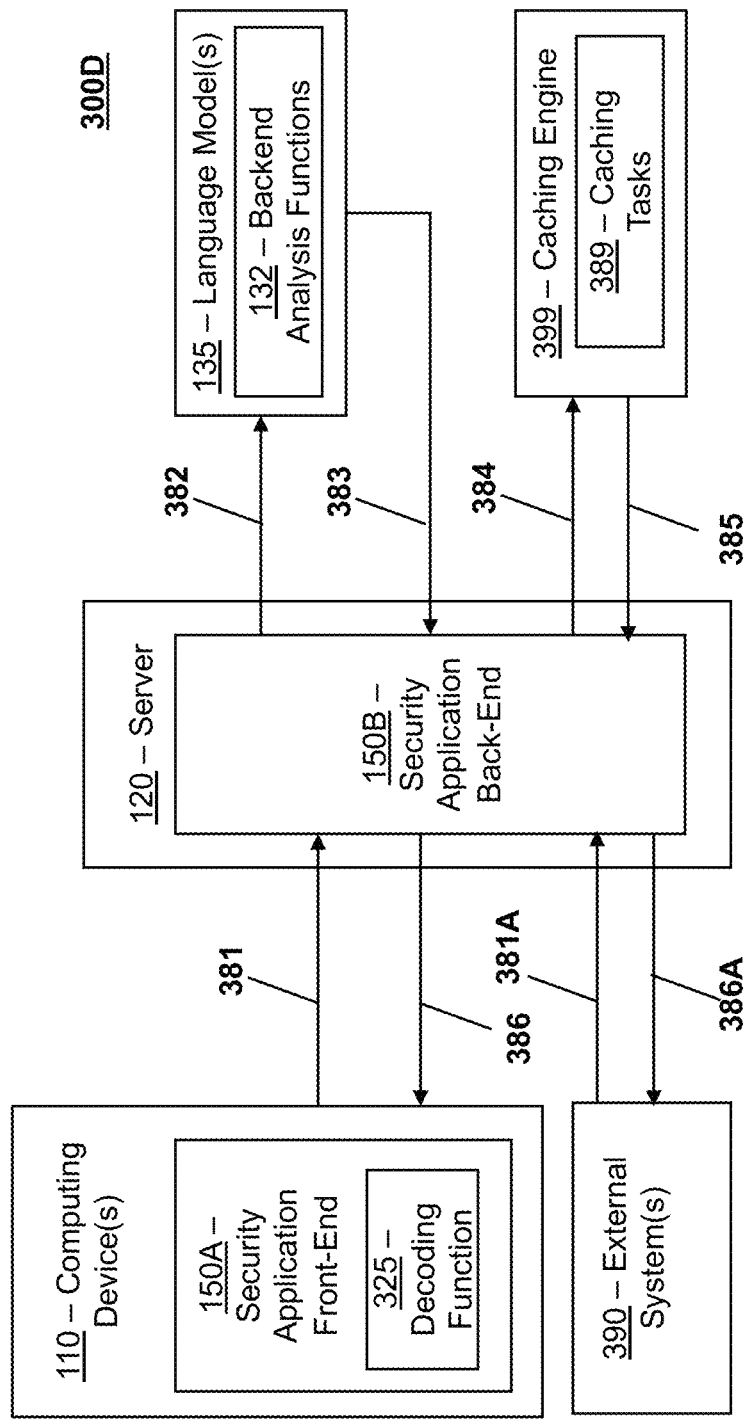
FIG. 3D illustrates another exemplary process flow according to certain embodiments.

FIG. 3D illustrates an exemplary process flow 300D for utilizing a language model 135 to generate risk quantification data 170 according to certain embodiments.

In step 381, a computing device 110 operated by an end-user transmits a query via the security application front-end 150A over a network 105 to the security application back-end 150B. In some cases, the query may correspond to a machine-readable code 145 that is captured by a camera device 115 of computing device 110 and/or accessed from a data storage device of the computing device 110. A decoding function may extract decoded data 155 from the machine-readable code 145 and transmit the decoded data 155 to the security application back-end 150B with the query. In other cases, the query may include a text-based query that is manually entered via the system interface 151 of the computing device 110. For example, the query may include natural language text that requests security information and/or requests the security application to perform a security assessment.

The query is received by the security application back-end 150B. Based on the content or subject matter included in the query, the security application back-end 150B selects a subset of analysis functions that are relevant to detecting security threats or risks associated with the query. Additionally, the security application back-end 150B may execute the various analysis functions (e.g., such as any of the functions associated with the ASM engine, DAIV engine, and/or TDR engine) to generate preliminary risk quantification data 170 associated with the query.

In step 382, the security application back-end 150B transmits the preliminary risk quantification data 170 to the language model 135. The language model 135 can execute one or more backend analysis functions 132, which may supplement and/or further evaluate the preliminary risk quantification data 170. In some examples, the language model 135 may utilize the analysis or attributes computed by security application for consistency with any threat or risk patterns identified by the language model 135, which will allow for a more accurate risk quantification.

In step 383, the language mode 135 returns its analysis outputs to the security application back-end 150B. The security application back-end 150B uses the supplemented analysis information to more accurately or precisely determine the risk profile for the query.

In step 384, the risk quantification results are then sent to the caching engine 399. The risk quantification results can be run through several caching tasks 389, which will permit similar queries received in the future to be processed more quickly (such as in step 385).

In step 386, the risk quantification results are returned to the computing device 110 (e.g., the security application front-end 150A) for display.

Steps 381A and 386A illustrate that the same or similar process flow 300D also can be applied to queries submitted by external systems 390 (e.g., security solutions used by enterprises or individuals).

In certain embodiments, a system comprises one or more processing devices and one or more non-transitory storage devices for storing instructions. In certain embodiments, computerized method implemented via execution of computing instructions stored on one or more non-transitory storage devices by one or more processing devices. Execution of the instructions by the one or more processing devices causes the one or more of the following operations:

(i) receiving, by a security application, one or more machine-readable codes; decoding the one or more machine-readable codes to derive decoded data corresponding to the one or more machine-readable codes; (ii) analyzing, by a multi-context threat detection system of the security application, a plurality of risk assessment attributes associated with the one or more machine-readable codes, wherein analyzing the plurality of risk assessment attributes includes: (a) analyzing at least one code attribute corresponding to the one or more machine-readable codes; (b) analyzing at least one decoded data attribute corresponding to the decoded data derived from the one or more machine-readable codes; (c) analyzing at least one target network resource attribute corresponding to a target network resource detected as being affiliated with the one or more machine-readable codes; (d) analyzing at least one entity attribute corresponding to an entity detected as being affiliated with the one or more machine-readable codes; and (e) analyzing at least one end-user attribute corresponding to one or more end-users that scanned or input the one or more machine-readable codes or one or more computing devices operated by the one or more end-users; and (iii) generating, by the security application, risk quantification data corresponding to the one or more machine-readable codes based, at least in part, on the at least one code attribute, the at least one decoded data attribute, the at least one target network resource attribute, and the at least one end-user attribute.

A method may be implemented via execution of computing instructions configured to run at one or more processing devices and configured to be stored on non-transitory computer-readable media, the method comprising: (i) providing access to a security application that is configured analyze a plurality of risk assessment attributes associated with the one or more machine-readable codes, including: (a) at least one code attribute corresponding to the one or more machine-readable codes; (b) at least one decoded data attribute corresponding to the decoded data derived from the one or more machine-readable codes; (c) at least one target network resource attribute corresponding to a target network resource detected as being affiliated with the one or more machine-readable codes; (d) at least one entity attribute corresponding to an entity detected as being affiliated with the one or more machine-readable codes; and (e) at least one end-user attribute corresponding to one or more end-users that scanned or input the one or more machine-readable codes or one or more computing devices operated by the one or more end-users; (ii) receiving, by a security application, decoded data derived from a machine-readable code; (iii) validating, by the security application, the machine-readable code based, at least in part, on the at least one code attribute; (iv) classifying content of the decoded data to detect one or more content types; (v) selecting a set of analysis functions corresponding to the one or more content types detected in the decoded data; (v) executing each of the analysis functions to analyze the risk assessment attributes relevant to the first machine-readable code, wherein the relevant risk assessment attributes include the at least one decoded data attribute, the at least one target network resource attribute, the at least one entity attribute, or the at least one end-user attribute; and (vi) generating risk quantification data based, at least in part, on the risk assessment attributes analyzed by the selected set of analysis functions.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random-access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system comprising one or more processing devices and one or more non-transitory storage devices for storing instructions, wherein execution of the instructions by the one or more processing devices causes the one or more processing devices to:
   receive, by a security application, one or more machine-readable codes;
   decode the one or more machine-readable codes to derive decoded data corresponding to the one or more machine-readable codes;
   analyze, by a multi-context threat detection system of the security application, a plurality of risk assessment attributes associated with the one or more machine-readable codes, wherein analyzing the plurality of risk assessment attributes includes:
   (a) analyzing at least one code attribute corresponding to the one or more machine-readable codes;
   (b) analyzing at least one decoded data attribute corresponding to the decoded data derived from the one or more machine-readable codes;
   (c) analyzing at least one target network resource attribute corresponding to a target network resource detected as being affiliated with the one or more machine-readable codes;
   (d) analyzing at least one entity attribute corresponding to an entity detected as being affiliated with the one or more machine-readable codes; and
   (e) analyzing at least one end-user attribute corresponding to one or more end-users that scanned or input the one or more machine-readable codes or one or more computing devices operated by the one or more end-users; and
   generate, by the security application, risk quantification data corresponding to the one or more machine-readable codes based, at least in part, on the at least one code attribute, the at least one decoded data attribute, the at least one target network resource attribute, and the at least one end-user attribute.

2. The system of claim 1, wherein analyzing the at least one code attribute comprises:
   identifying a code type associated with each of the one or more machine-readable codes; and
   determining whether each of the one or more machine-readable codes are compliant with a code specification corresponding to the code type.

3. The system of claim 1, wherein analyzing the at least one end-user attribute comprises at least one of the following:
   determining one or more geographic locations where the one or more machine-readable codes are scanned or input by the one or more end-users;
   analyzing one or more behavior patterns of the one or more end-users;
   detecting one or more anomalous behaviors of the one or more end-users; or
   analyzing vulnerabilities of the one or more computing devices operated by the one or more end-users.

4. The system of claim 1, wherein analyzing the at least one decoded data attribute corresponding to the decoded data associated with the one or more machine-readable codes includes classifying content of the decoded data to identify one or more content types included in the decoded data.

5. The system of claim 4, wherein:
   classifying the content of the decoded data to identify one or more content types included in the decoded data includes detecting if the content includes a network address identifier included in the decoded data; and
   in response to the security application detecting that decoded data comprises the network address identifier, the multi-context threat detection system is configured to analyze a plurality of target network resource attributes corresponding to the network address identifier, wherein analyzing the plurality of target network resource attributes includes at least three of the following:
   analyzing domain name service (DNS) data associated with the network address identifier;
   detecting a file type of a file identified by the network address identifier;
   analyzing one or more security settings of a cloud environment associated with the network address identifier;
   analyzing domain registrar data associated with the network address identifier;
   identifying a geographic location associated with the network address identifier;
   correlating the network address identifier with one or more access control lists;
   correlating the network address identifier with data retrieved from one or more compromise listing resources;
   determining if a file exists at a location identified by the network address identifier;
   determining if the network address identifier is compliant with an address specification; and
   analyzing source code or content associated with a file identified by the network address identifier.

6. The system of claim 4, wherein:
   classifying the content of the decoded data to identify one or more content types included in the decoded data includes detecting if the content includes an email identifier, a telecommunications identifier, or a physical address identifier included in the decoded data; and
   in response to the security application detecting that decoded data comprises the email identifier, the telecommunications identifier, or the physical address identifier, the multi-context threat detection system is configured to perform at least two of the following:
   determining if the email identifier, the telecommunications identifier, or the physical address identifier is associated with one or more access control lists;
   validating the email identifier, the telecommunications identifier, or the physical address identifier;
   attempting to identify an entity associated with the email identifier, the telecommunications identifier, or the physical address identifier;
   determining if the email identifier, the telecommunications identifier, or the physical address identifier exists; and
   analyzing at least two of: a sender address associated with the email identifier, a recipient address associated with the email identifier, a domain name associated with the email identifier, an email header associated with the email identifier, and an email message associated with the email identifier.

7. The system of claim 4, wherein classifying the content of the decoded data to identify one or more content types included in the decoded data includes detecting if the content includes executable code, visual content, or sensitive information and the risk quantification data is generated based, at least in part, on the detection or analysis of the executable code, the visual content, or the sensitive information.

8. The system of claim 1, wherein:
the security application includes an application programming interface (API) that enables external systems or end-users to query the multi-context threat detection system;
the API enables the external systems or the end-users to submit queries corresponding to at least two of: network address identifiers, entity identifiers, telecommunications identifiers, email identifiers, and physical address identifiers; and
in response to receiving the queries from the external systems or end-users, the multi-context threat detection system executes one or more analysis functions and generates additional risk quantification data corresponding to the queries.

9. The system of claim 1, wherein analyzing the plurality of risk assessment attributes includes analyzing at least one enterprise attribute specified by an organization associated with the one or more end-users or the one or more computing devices operated by the one or more end-users, and the at least one enterprise attribute includes at least one of: an enterprise access control policy attribute; a user authentication attribute; a role-based access control (RBAC) policy attribute; and attribute-based access control (ABAC) policy attribute.

10. The system of claim 1, wherein the security application includes, or communicates with, one or more language models that are trained or fine-tuned using security data collected by the security application, and outputs of the one or more language models are utilized to detect patterns or anomalies related to assessing or detecting security risks or to assist the multi-context threat detection system in generating the risk quantification data.

11. The system of claim 1, wherein the security application includes, or communicates with, one or more computer vision systems that are trained to analyze visual content embedded into the one or more machine-readable codes or visual content presented on the target network resource detected as being affiliated with the one or more machine-readable codes.

12. The system of claim 1, wherein, in response to inputting or scanning a first machine-readable code, the multi-context threat detection system is configured to:
validate the first machine-readable code;
decode the first machine-readable code to derive a first portion of decoded data;
detect one or more content types corresponding to the first portion of decoded data;
select a set of analysis functions corresponding to the one or more content types detected in the first portion of decoded data;
execute each of the selected analysis functions to analyze a first set of risk assessment attributes relevant to the first machine-readable code; and
generate a first portion of risk quantification data based, at least in part, on the first set of risk assessment attributes analyzed by the selected set of analysis functions.

13. A computerized method implemented via execution of computing instructions stored on one or more non-transitory storage devices by one or more processing devices, the method comprising:
receiving, by a security application, one or more machine-readable codes;
decoding the one or more machine-readable codes to derive decoded data corresponding to the one or more machine-readable codes;
analyzing, by a multi-context threat detection system of the security application, a plurality of risk assessment attributes associated with the one or more machine-readable codes, wherein analyzing the plurality of risk assessment attributes includes:
(a) analyzing at least one code attribute corresponding to the one or more machine-readable codes;
(b) analyzing at least one decoded data attribute corresponding to the decoded data derived from the one or more machine-readable codes;
(c) analyzing at least one target network resource attribute corresponding to a target network resource detected as being affiliated with the one or more machine-readable codes;
(d) analyzing at least one entity attribute corresponding to an entity detected as being affiliated with the one or more machine-readable codes; and
(e) analyzing at least one end-user attribute corresponding to one or more end-users that scanned or input the one or more machine-readable codes or one or more computing devices operated by the one or more end-users; and
generating, by the security application, risk quantification data corresponding to the one or more machine-readable codes based, at least in part, on the at least one code attribute, the at least one decoded data attribute, the at least one target network resource attribute, and the at least one end-user attribute.

14. The computerized method of claim 13, wherein:
(i) analyzing the at least one code attribute comprises:
identifying a code type associated with each of the one or more machine-readable codes; and
determining whether each of the one or more machine-readable codes are compliant with a code specification corresponding to the code type; and
(ii) analyzing the at least one end-user attribute comprises:
determining one or more geographic locations where the one or more machine-readable codes are scanned or input by the one or more end-users;
analyzing one or more behavior patterns of the one or more end-users;
detecting one or more anomalous behaviors associated with the one or more end-users; or
analyzing the one or more computing devices operated by the one or more end-users for vulnerabilities.

15. The computerized method of claim 13, wherein:
analyzing the at least one decoded data attribute corresponding to the decoded data associated with the one or more machine-readable codes includes classifying content of the decoded data to identify one or more content types included in the decoded data;
classifying the content of the decoded data to identify the one or more content types included in the decoded data includes detecting if the content includes a network address identifier included in the decoded data;
in response to the security application detecting that decoded data comprises the network address identifier, the multi-context threat detection system is configured to analyze a plurality of target network resource attributes corresponding to the network address identifier;
classifying the content of the decoded data to identify the one or more content types included in the decoded data further includes detecting if the content includes an email identifier, a telecommunications identifier, or a physical address identifier included in the decoded data;
in response to the security application detecting that decoded data comprises the email identifier, the telecommunications identifier, or the physical address identifier, the multi-context threat detection system is configured to analyze attributes corresponding to the email identifier, the telecommunications identifier, or the physical address identifier; and
classifying the content of the decoded data to identify one or more content types included in the decoded data further includes detecting if the content includes executable code, visual content, or sensitive information.

16. The computerized method of claim 13, wherein:
the security application includes an application programming interface (API) that enables external systems or end-users to query the multi-context threat detection system;
the API enables the external systems or end-users to submit queries corresponding to at least two of: network address identifiers, entity identifiers, telecommunications identifiers, email identifiers, and physical address identifiers; and
in response to receiving the queries from the external systems or end-users, the multi-context threat detection system executes one or more analysis functions and generates additional risk quantification data corresponding to the queries.

17. The computerized method of claim 13, wherein analyzing the plurality of risk assessment attributes includes analyzing at least one enterprise attribute specified by an organization associated with the one or more end-users or the one or more computing devices operated by the one or more end-users, and the at least one enterprise attribute includes at least one of: an enterprise access control policy attribute; a user authentication attribute; a role-based access control (RBAC) policy attribute; and attribute-based access control (ABAC) policy attribute.

18. The computerized method of claim 13, wherein the security application includes, or communicates with, (i) one or more language models that are trained or fine-tuned using security data collected by the security application, and outputs of the one or more language models are utilized to detect patterns or anomalies related to assessing or detecting security risks or to assist the multi-context threat detection system in generating the risk quantification data; or (ii) one or more computer vision systems that are trained to analyze visual content embedded into the one or more machine-readable codes or visual content presented on the target network resource detected as being affiliated with the one or more machine-readable codes.

19. The computerized method of claim 13, wherein, in response to inputting or scanning a first machine-readable code, the multi-context threat detection system is configured to:
validate the first machine-readable code;
decode the first machine-readable code to derive a first portion of decoded data;
detect one or more content types corresponding to the first portion of decoded data;
select a set of analysis functions corresponding to the one or more content types detected in the first portion of decoded data;
execute each of the analysis functions to analyze a first set of risk assessment attributes relevant to the first machine-readable code; and
generate a first portion of risk quantification data based, at least in part, on the first set of risk assessment attributes analyzed by the selected set of analysis functions.

20. A computerized method implemented via execution of computing instructions configured to run on one or more processing devices and configured to be stored on non-transitory computer-readable media, the method comprising:
providing access to a security application that is configured to analyze a plurality of risk assessment attributes associated with one or more machine-readable codes, including:
(a) at least one code attribute corresponding to the one or more machine-readable codes;
(b) at least one decoded data attribute associated with the one or more machine-readable codes;
(c) at least one target network resource attribute corresponding to a target network resource detected as being affiliated with the one or more machine-readable codes;
(d) at least one entity attribute corresponding to an entity detected as being affiliated with the one or more machine-readable codes; and
(e) at least one end-user attribute corresponding to one or more end-users that scanned or input the one or more machine-readable codes or one or more computing devices operated by the one or more end-users;
receiving, by the security application, decoded data derived from a machine-readable code;
validating, by the security application, the machine-readable code based, at least in part, on the at least one code attribute;
classifying content of the decoded data to detect one or more content types;
selecting a set of analysis functions corresponding to the one or more content types detected in the decoded data;
executing each of the analysis functions to analyze a set of risk assessment attributes relevant to the machine-readable code, wherein the set of risk assessment attributes relevant to the machine-readable code include the at least one decoded data attribute, the at least one target network resource attribute, the at least one entity attribute, or the at least one end-user attribute; and
generating risk quantification data based, at least in part, on the set of risk assessment attributes analyzed by the selected set of analysis functions.

* * * * *